(12) United States Patent
Iwasaki et al.

(10) Patent No.: US 7,224,874 B2
(45) Date of Patent: *May 29, 2007

(54) SHEET-TYPE OPTICAL CONDUCTOR AND COMMUNICATION SYSTEM USING THE SHEET-TYPE OPTICAL CONDUCTOR

(75) Inventors: Osamu Iwasaki, Kaisei-machi (JP); Hiroshi Hara, Fujinomiya (JP)

(73) Assignee: Fujifilm Corporation, Tokyo (JP)

( * ) Notice: Subject to any disclaimer, the term of this patent is extended or adjusted under 35 U.S.C. 154(b) by 322 days.

This patent is subject to a terminal disclaimer.

(21) Appl. No.: 10/765,281

(22) Filed: Jan. 28, 2004

(65) Prior Publication Data

US 2004/0258382 A1 Dec. 23, 2004

(30) Foreign Application Priority Data

Jan. 28, 2003 (JP) ............................. 2003/018597

(51) Int. Cl.
*G02B 6/10* (2006.01)
(52) U.S. Cl. ...................... 385/129; 385/146
(58) Field of Classification Search ........ 385/129–132, 385/146
See application file for complete search history.

(56) References Cited

U.S. PATENT DOCUMENTS

| | | | |
|---|---|---|---|
| 5,581,683 A | 12/1996 | Bertignoll et al. | |
| 5,882,475 A | 3/1999 | Vikio et al. | |
| 5,993,020 A * | 11/1999 | Koike | 362/628 |
| 6,412,968 B1 * | 7/2002 | Ohkawa | 362/26 |
| 6,907,177 B2 * | 6/2005 | Iwasaki et al. | 385/129 |
| 2005/0162863 A1 * | 7/2005 | Iwasaki | 362/551 |
| 2005/0163422 A1 * | 7/2005 | Iwasaki | 385/24 |
| 2005/0163442 A1 * | 7/2005 | Iwasaki | 385/123 |
| 2005/0163454 A1 * | 7/2005 | Iwasaki et al. | 385/146 |
| 2005/0201706 A1 * | 9/2005 | Iwasaki | 385/129 |

FOREIGN PATENT DOCUMENTS

| | | |
|---|---|---|
| EP | 1 396 744 A2 | 3/2004 |
| JP | 11-31035 A | 2/1999 |
| JP | 3162398 B2 | 2/2001 |
| JP | 3184219 B2 | 4/2001 |

OTHER PUBLICATIONS

Osamu Takanashi, et al., "High-Uniformity Star Coupler Using Diffused Light Transmission" IEICE Trans. Electron, vol. E84C, No. 3 Mar. 2001, p. 339.

* cited by examiner

*Primary Examiner*—Quyen Leung
(74) *Attorney, Agent, or Firm*—Sughrue Mion, PLLC

(57) ABSTRACT

A communication system that allows two-way communication is provided with the use of a sheet-type optical conductor capable of providing a favorable level of light-extraction efficiency and uniformly distributed optical output power. The sheet conductor includes a sheet-type optical medium containing particles for reflecting light, and propagates the optical signal injected from one edge of the medium to the other having an optical receiver by scattering the optical signal by means of the particles, which is designed such that the value of $\Phi \cdot Np \cdot L_G \cdot K_C$ is less than or equal to 0.9, where $\Phi$ is the scattering cross-sectional area of the particles, $L_G$ is the length of the optical medium in the direction in which the light is propagated, Np is the density of the particles, and $K_C$ is a correction coefficient.

22 Claims, 38 Drawing Sheets

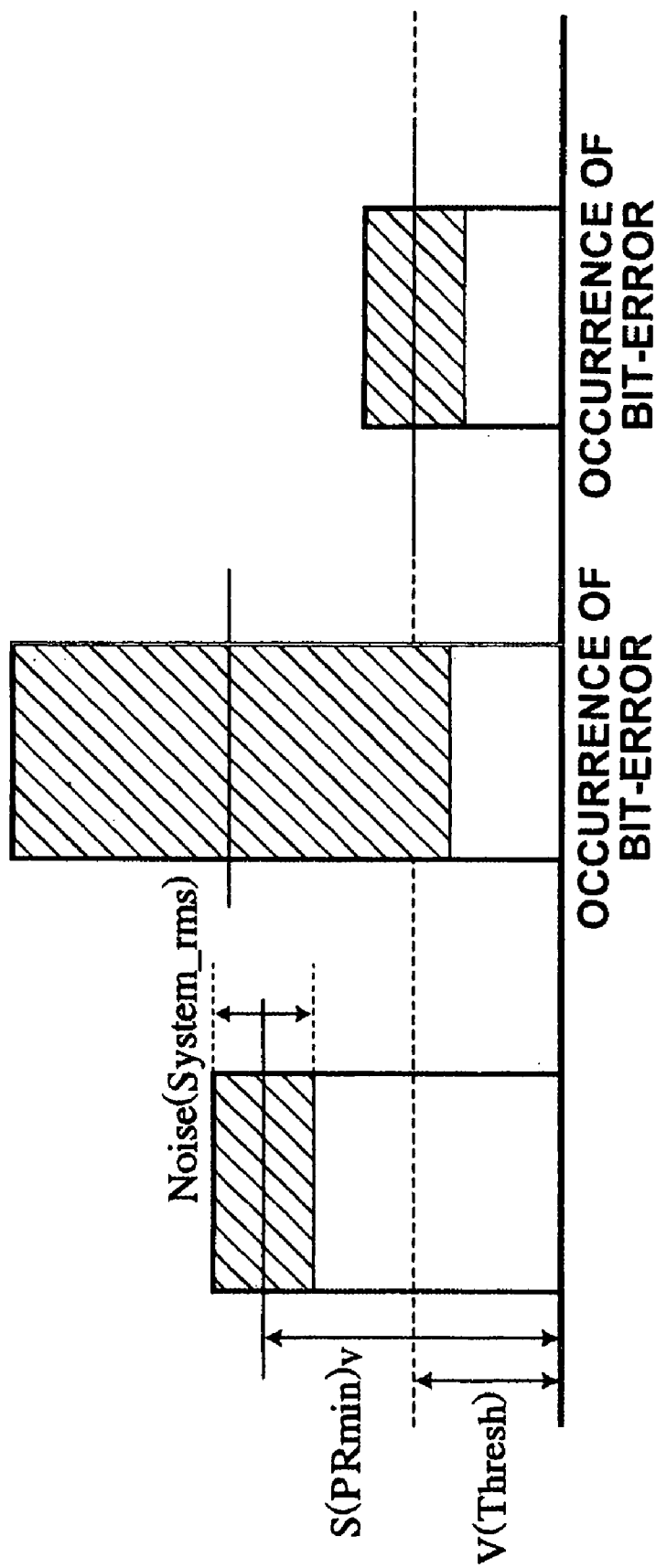

FIG. 19A
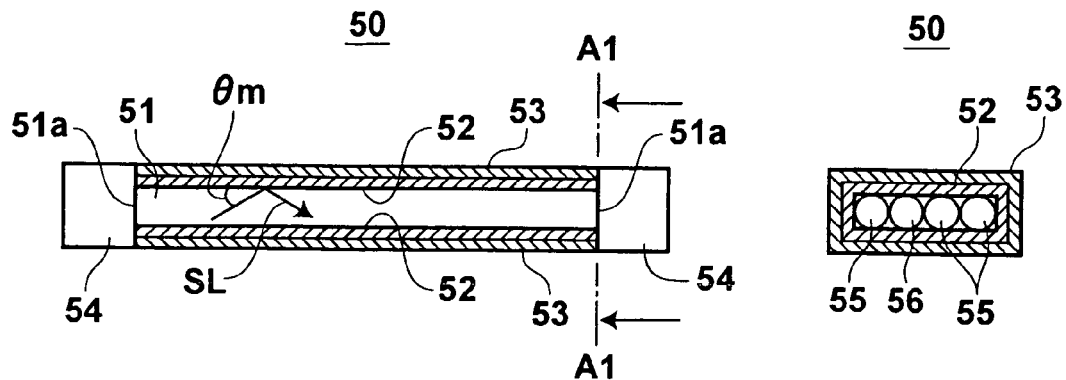
FIG. 19B
FIG. 20A
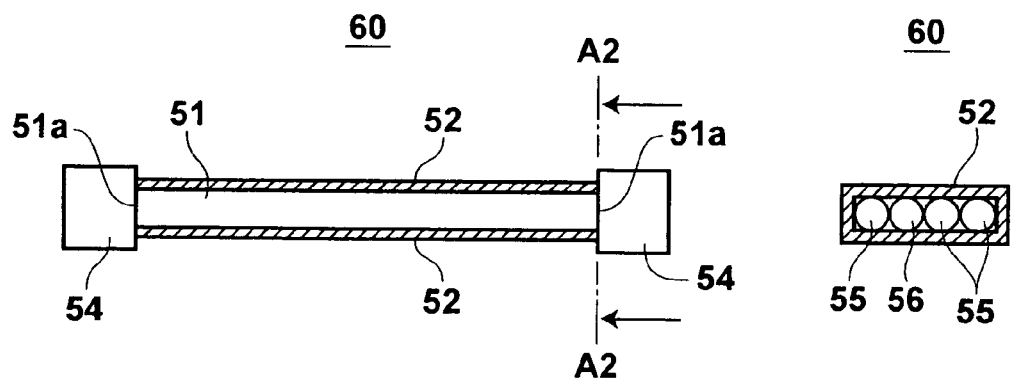
FIG. 20B
FIG. 21A
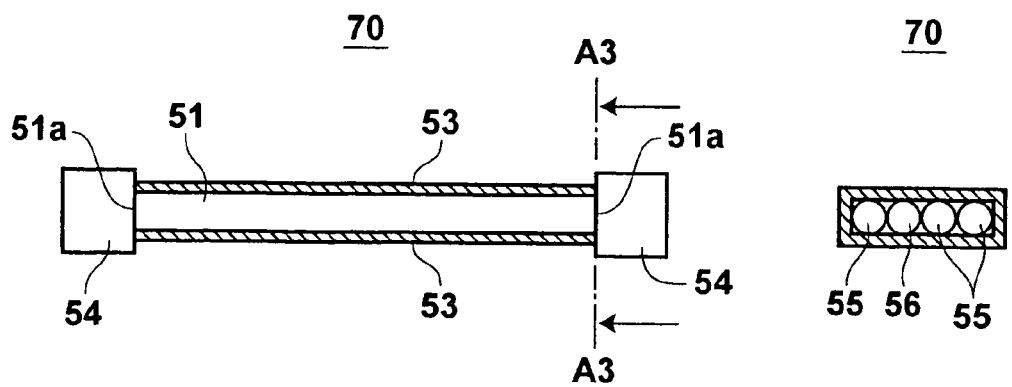
FIG. 21B

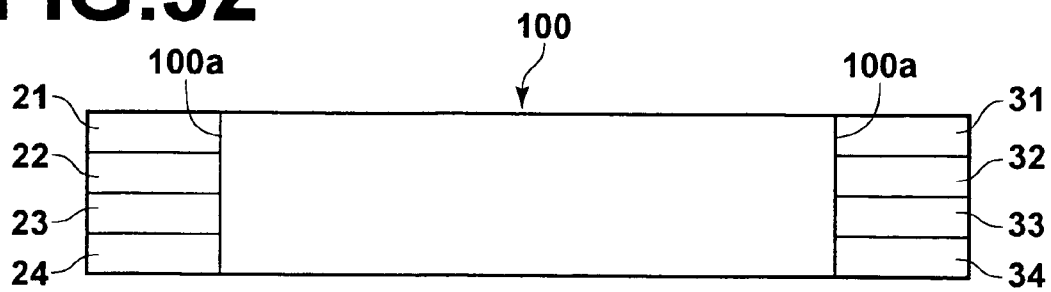
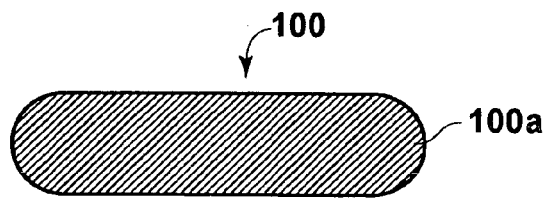
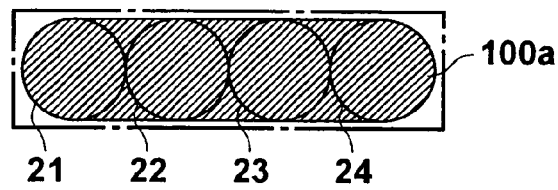
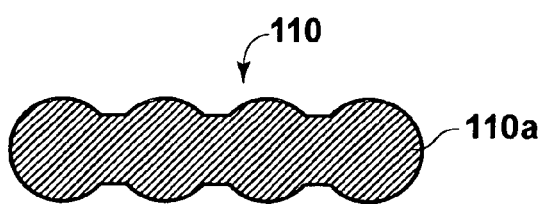
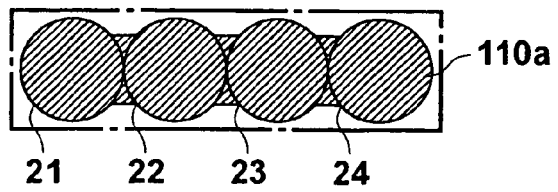

SHEET-TYPE OPTICAL CONDUCTOR AND COMMUNICATION SYSTEM USING THE SHEET-TYPE OPTICAL CONDUCTOR

BACKGROUND OF THE INVENTION

1. Field of the Invention

The present invention relates to a communication system using an optical conductor, more specifically a sheet-type optical conductor comprising a sheet-type optical medium containing particles for scattering light, and propagating the light injected from one edge of the medium to the other by scattering it by means of the particles. It also relates to the aforementioned sheet-type optical conductor.

2. Description of the Related Art

Optical conductors comprising an optical medium, such as PMMA (polymethylmethacrylate), that contains particles for scattering light, and propagates the light injected from one edge of the medium to the other by scattering it by means of the particles are known as described, for example, in Japanese Patent Nos. 3162398 and 3184219.

These optical conductors described above propagate the light by scattering it in succession by means of the particles, in addition to the mechanism of the total reflection at the interface between the side edges of the conductor and the surrounding medium (air or cladding layer), so that they have an advantage that a light beam with more uniformly distributed optical power can be obtained at the output edge compared with an optical conductor that propagates the light only by the mechanism of the total reflection. By making use of this advantage, the application of this type of optical conductor to the construction of an optical data bus (sheet bus) is contemplated, in which the optical conductor is formed using a sheet-type optical medium with an input section being attached to one edge of the medium for injecting an optical signal, and a plurality of output sections being attached to the other edge to distribute an input signal to the plurality of output sections as a common signal as described, for example, in U.S. Pat. No. 5,882,475.

Another type of optical data bus is also known as described, for example, in Japanese Unexamined Patent Publication No. 1999-31035, in which the sheet-type optical medium has light diffusing sections attached to the optical input edge of the medium, each corresponding to each of the input sections for the optical signals, and the optical signals, diffused and branched in the diffusing sections, are propagated to the output edge of the medium.

In the optical data bus described in Japanese Unexamined Patent Publication No. 1999-31035, the light diffusing section needs to be formed of a plurality of optical unit devices of 100 µm on each side, and manufacturing of such a diffusing section is regarded as extremely difficult. In addition, formation of the diffusing sections on one edge of the sheet-type optical medium makes it practically impossible to detect light on that side, so that the edge having the diffusing sections is forced to be used solely for inputting light, thus two-way communication through such a sheet-type optical medium is impossible.

The use of the sheet-type optical conductor described in U.S. Pat. No. 5,822,475 allows two-way communication. But it has been impossible heretofore to readily obtain the design parameters for obtaining a desired level of light-extraction efficiency and uniformly distributed optical output power for this type of sheet-type optical conductor. In this connection, certain techniques have been employed in order to obtain a sheet-type optical conductor having desired characteristics, such as that in which a plurality of samples are produced with varied diameters and densities of the particles contained in the optical medium, and an optical conductor having a desired level of light-extraction efficiency and uniformly distributed optical output power is selected from among them, or that in which the design parameters are obtained through large-scale simulations using computers.

SUMMARY OF THE INVENTION

The present invention has been developed in recognition of the circumstance described above, and it is an object of the present invention to provide a communication system using a sheet-type optical conductor capable of providing a favorable level of light-extraction efficiency and uniformly distributed optical output power, as well as two-way communication. It is a further object of the present invention to provide a sheet-type optical conductor which may be suitably used for such a communication system.

The communication system using the sheet-type optical conductor according to the present invention is a communication system comprising a sheet-type optical medium containing particles for scattering light, and propagating an optical signal injected from one edge of the medium to the other having an optical receiver connected thereto by scattering the optical signal by means of the particles, wherein the sheet conductor is designed such that the value of $\Phi \cdot Np \cdot L_G \cdot K_C$ is less than or equal to 0.9, where $\Phi$ is the scattering cross-sectional area of the particles, $L_G$ is the length of the optical medium in the direction in which the light is propagated, Np is the density of the particles, and $K_C$ is a correction coefficient.

Preferably, the communication system using the sheet-type optical medium according to the present invention satisfies the relationship of:

$$\Pr(\text{Noise}(\text{System\_rms}) \cdot Q) \leq \text{BER}(\text{accept})$$

where Noise (system_rms) is the rms (root mean square) noise of the system, BER (accept) is the acceptable bit error rate of the system, Pr(Noise(System_rms)) is the probability of Noise(System_rms) of the system, and Q is a proportionality constant.

Preferably, the communication system using the sheet-type optical medium according to the present invention also satisfies the relationship of:

$$\{S(PR\min)v - V(\text{Thresh})\} > \text{Noise}(\text{System\_rms}) \cdot Q$$

where Noise (System_rms) is the rms noise of the system, V (Thresh) is any threshold level in digitization, and S(PRmin)v is the signal voltage outputted from the optical receiver of the system through load resistance.

Preferably, the light injected into the sheet-type optical conductor of the present invention is reflected in succession at the edges other than the input/output edges in accordance with Snell's Law, and the sheet-type optical conductor is made of an optical medium having a shape that satisfies the relationship of $\sin \theta s > 1$, if $Nm \cdot \sin \theta m = Ns \cdot \sin \theta s$ when no particles are contained therein, where Ns is the index of refraction of the surrounding medium; and Nm, $\theta m$, and $\theta s$ are the index of refraction, angle of incidence, and angle of refraction of the base material of the optical medium respectively.

Preferably, the light beam exiting from at least one output edge of the sheet-type optical conductor described above follows Snell's Law in the reflection and refraction at the output edge, and the sheet-type optical conductor is made of an optical medium having a shape that satisfies the relationship of sin $\theta s<1$, if $Nm \cdot \sin \theta m = Ns \cdot \sin \theta s$ when no particles are contained in the medium, where Ns is the index of refraction of the surrounding medium; and Nm, $\theta m$, and $\theta s$ are the index of refraction, angle of incidence, and angle of refraction of the base material of the optical medium respectively.

Further, the particles contained in the optical medium used for the sheet-type optical conductor of the present invention may be nonmagnetic conductive particles that follow Mie scattering theory, and the optical medium may have an inclined density distribution of the particles.

Further, the sheet-type optical conductor described above may be made of a plurality of optical media which are combined together.

Also, the present invention provides a sheet-type optical conductor having a protective layer that covers the whole surface (other that the input/output edges) of the body of the sheet-type optical conductor. Such a protective layer may be formed by appropriately applying polyethylene, vinyl chloride, and the like which have been widely used, for example, as a material for coating a plastic optical fiber.

It is particularly preferable that the sheet-type optical conductor having the protective layer described above is provided with a cladding layer having a smaller index of refraction than that of the optical conductor body between the protective layer and the surface of the optical conductor body. Such a cladding layer may specifically be formed by applying or depositing a material, such as UV-cure resin, silicon resin, or the like on the optical conductor body, or by other means. Preferably, the difference in the index of refraction between the cladding layer and the optical conductor body is such that the conditions of the total reflection of the optical signal are satisfied for the maximum angle of incidence of the optical signal on the optical conductor body.

Optical guide paths for obtaining a desired optical power distribution of the output light through a structure of heterogeneous indices of refraction or by means of dielectric particles mixed and diffused in an optical medium are described in Japanese Patent Nos. 3162398 and 3184219. The Patents also describe that the intensity of the scattered light beams may be enhanced, and uniformly distributed optical power may be obtained at the output by applying Debye turbidity theory (Journal of Applied Physics Vol. 20, pp. 518 to 525(1949)). Debye quotes specifically the observation of scattering light from "Theory of Fluctuations in Dielectric Constant by Heat in Gas or Liquid" by Einstein (Annalen Der Physik 33 pp. 1275 to 1298 (1910)). The formula in the paper described above is:

$$i/Io=(RT/N) \cdot [(\in-1)^2(\in+2)^2/P] \cdot (2\pi/\lambda)^4[V/(4\pi D)^2] \cos^2\theta \quad (1)$$

where
  i: light intensity at the distance D from the scattering medium.
  Io: intensity of the input light.
  R: gas constant.
  T: absolute temperature.
  N: number of molecules contained in one gram of molecules.
  $\in$: square of index of refraction for wavelength $\lambda$ (dielectric constant).
  P: pressure exerted on fluid.
  $\lambda$: wavelength.
  V: volume of the light scattering medium.
  D: distance from the light scattering medium to the observation point.
  $\theta$: scattering angle.

The formula of Einstein described above is modified by Debye and expressed as:

$$i/I=<\eta>^2/\in^2(\pi^2 V/\lambda^4 R^2) \cdot (1+\cos^2\theta)/2 \cdot \omega \quad (2)$$

where
  i: intensity of the light at the distance D from the scattering medium.
  Io: intensity of the input light.
  $\in$: dielectric constant of the scattering medium.
  $<\eta>^2$: mean square value of the fluctuations in the dielectric constant of the scattering medium.
  R: distance from the light scattering medium to the observation point.
  $\lambda$: wavelength.
  V: total volume of the light scattering medium.
  $\theta$: scattering angle.
  $\omega$: correlation volume.

Here, $\omega$ is expressed as $$\omega=4\pi\int \sin(ksr)/ksr \cdot r^2 \gamma(r)dr \quad (3)$$

where
  k: wave number.
  s: length of the combined vector of the unit vectors of input and output light which may be expressed as, $s=2\sin(\theta/2)$.
  r: distance between the two points in which dielectric constant is fluctuated.

According to Debye, the correlation volume can be integrated, if the correlation function $\gamma(r)$ is put as:

$$\gamma(r)=\exp(-r/a) \ (a: \text{correlation distance}).$$

Thus, Formula (3) may be expressed as:

$$\omega=8\pi a^3/(1+k^2 s^2 a^2)^2 \quad (4)$$

From formulae (2) and (4), the following is obtained:

$$i/I=<\eta>^2/\in^2(\pi^2 V/\lambda^4 R^2) \cdot (1+\cos^2\theta)/2 \cdot 8\pi a^3/(1+k^2 s^2 a^2)^2$$

Here, Formula (2) may be rewritten using $s=2 \sin(\theta/2)$ as:

$$i/I=4\pi a^3<\eta>^2/\in^2(\pi^2 V/\lambda^4 R^2) \cdot (1+\cos^2\theta/(1+8\pi^2(1-\cos\theta)(a/\lambda)^2)^2 \quad (5)$$

The term of intensity vs scattering angle in Formula (4) is expressed as:

$$f(\theta)=(1+\cos^2\theta)/(1+8\pi^2(1-\cos\theta)(a/\lambda)^2)^2 \quad (6)$$

The normalized intensity vs scattering angle obtained by substituting typical $(a/\lambda)$ values to Formula (6) is shown in FIG. 1. FIG. 2 shows the results of calculation of normalized intensity vs scattering angle for typical particle diameters Dp based on Mie scattering theory.

According to Japanese Patent Nos. 3162398 and 3184219, the particle diameter may be regarded as substantially equal to the correlation distance. Therefore, from FIG. 1, it may be understood that the intensity of the forward scattering light is increased when the diameter of the particle is nearly equal to the wavelength, but if the diameter exceeds tenfold of the wavelength, the intensity of the side scattering light becomes extremely strong and no light is propagated in the forward direction any more. On the other hand, according to Mie scattering theory, as evidenced by FIG. 2, the intensity of the forward scattering light is still strong even when the diameter of the particle exceeds tenfold of the wavelength. Debye turbidity theory, when approximated by $\gamma(r)=\exp(-r/a)$, provides similar result to that of Mie scattering theory when the diameter of the particle is nearly equal to the wavelength, but greatly deviates from Mie scattering theory for the particle having a diameter that exceeds the wavelength.

Based on the discussion above, Mie scattering theory, which represents Rayleigh scattering when the particle size is far smaller than the wavelength, and Huygens-Fresnel diffraction when it is far greater than the wavelength, may be considered more appropriate as the calculation method for obtaining output light having uniformly distributed optical power from injected light by mixing particles for scattering the light into a desired optical medium. Further, Mie scattering theory is for a single particle system, so that analyses in a multi-particle system may be required.

In manufacturing the sheet-type optical conductor used in the present invention, the design parameters for obtaining a desired level of light-extraction efficiency are readily obtained. The method will be described in detail herein below.

<Scattering Cross-Sectional Area>

The scattering cross-sectional area $\Phi$ will be described first. The concept of scattering cross-sectional area is widely introduced to the domains of radiation including $\gamma$-ray and X-ray, and long wavelength including infra-red light and microwave, in addition to the domain of visible light, as well as used in Mie scattering theory. When the relation between the diameter of the particle and the wavelength is in the Rayleigh scattering region, the scattering cross-sectional area $\Phi$ is expressed as:

$$\Phi = 128 \cdot \pi^5 \cdot (a_p^6/3\lambda^4) \cdot \{(n^2-1)/(n^2+2)\}^2 \tag{7}$$

where
  $a_p$: particle radius.
  $\lambda$: wavelength of the input light.
  n: relative index of refraction.

On the other hand, the scattering cross-sectional area $\Phi$ is expressed by the following Formula (8) in Mie scattering theory.

$$\Phi = (\lambda^2/2\pi) \sum_{n=1}^{\infty} (2n+1) \cdot [|a_n|^2 + |b_n|^2] \tag{8}$$

$\lambda$: Wavelength of the input light $$a_n = \frac{\phi n(\alpha) \cdot \phi' n(\beta) - N \cdot \phi n(\beta) \cdot \phi' n(\alpha)}{\xi n(\alpha) \cdot \phi' n(\beta) - N \cdot \phi n(\beta) \cdot \xi' n(\alpha)}$$

$$b_n = \frac{N \cdot \phi n(\alpha) \cdot \phi' n(\beta) - \phi n(\beta) \cdot \phi' n(\alpha)}{N \cdot \xi n(\alpha) \cdot \phi' n(\beta) - \phi n(\beta) \cdot \xi' n(\alpha)}$$

$\Phi n(kr) = (\pi kr/2) \cdot J_n + \frac{1}{2}(kr)$ $J_n+\frac{1}{2}(kr)$: Bessel Function of the First Kind
k: Wave number $(2\pi/\lambda)$
r: Distance component of polar coordinate
$\Phi'n$: delivative of $\Phi n$ $\xi n(kr) = \phi n(kr) + i \chi n(kr)$ $\chi n(kr) = -(\pi kr/2) \cdot N_n + \frac{1}{2}(kr)$ $N_n+\frac{1}{2}(kr)$: Neumann's Bessel Function of the Second Kind
$\xi'n$: Derivative of $\xi n$ $\alpha = 2\pi a/\lambda$ $\beta = N \cdot \alpha$ At the extreme limit of $a/\lambda >> 1$ in Formula (8) above, the scattering cross-sectional area $\Phi$ is expressed as:

$$\Phi = M\pi a_p^2 \quad (M \approx 2 \text{ in the state of convergence}) \tag{9}$$

From Formula (8), it is known that M oscillates between $1 < M < 6$ in the region of $2\pi a_p/\lambda \approx 1$.

FIGS. 3A, 3B, and 3C show how M oscillates when the relative indices of refraction n are 1.1, 1.5, and 2.1 respectively. These figures show that the scattering cross-sectional area $\Phi$ in the Mie scattering region oscillates/converges as the diameter of the particle Dp increases. It is also possible to obtain the value to be multiplied by the geometrical scattering cross-sectional area $\pi a p^2$ in a wide range of the relative indices of refraction n from about 1 to 2 in the oscillating region for each diameter of the particle from FIG. 3A to 3C.

FIG. 4 shows the relationship between the diameter of the particle Dp and the scattering cross-sectional area $\Phi$ for each of the several relative indices of refraction n obtained by Formulae (7) and (9). FIG. 5 shows the results of computer simulations conducted based on Mie scattering theory, indicating the relationship between the diameter of the particle for a multi-particle system and the inverse number of the particle density multiplied by a certain numeric value.

In these computer simulations, it was assumed that light beams having certain finite spreading angles were injected into cubic optical media of varied sizes ranging from 10 to 1000 nm on each side and containing particles therein. In other words, the sizes of the input light and cube vary analogously. The diameters of the particles Dp were changed greatly ranging from those in the Rayleigh scattering region to those in the Fresnel refraction region. Further, in these computer simulations, it was assumed that the light was outputted from the place opposite to the input side in the same direction as that of the injected light, and the value of light-extraction efficiency at the output edges of the cubes was approximately 80%.

FIGS. 4 and 5 show that there is a close relationship between the scattering cross-sectional area and number of particles contained in an optical medium of a finite size.

<Lambert-Beer Law and Scattering Cross-Sectional Area>

When a parallel light beam is injected into an isotropic medium, the transmission factor T is expressed by Lambert-Beer law as:

$$T = I/Io = \exp(-\rho \cdot x) \tag{10}$$

where
  x: distance.
  Io: intensity of the input light.
  I: intensity of the output light.
  $\rho$: attenuation constant.

The attenuation constant $\rho$ above may be expressed as:

$$\rho = \Phi \cdot Np \cdot K_C \tag{11}$$

where
  $\Phi$: scattering cross-sectional area.
  Np: number of particles contained in a unit volume of the medium.

$K_C$: dimensionless correction factor for the light propagated in an optical medium of finite space obtained empirically.

The parameters generally required for designing an optical conductor are the volume V of the optical medium, number of particles $N_{PT}$ mixed into the medium, and the diameter Dp of the particle. A discussion of how the optical output power is varied with these parameters will be provided herein below.

Here, Np is expressed as:

$$N_p = N_{PT}/V. \tag{12}$$

Further, $K_c$ is determined through the comparison of and analogy from FIGS. 4 and 5, and based on some of the data not shown here. In the calculation of $K_c$ based on FIGS. 4 and 5, and some of the data not shown here, the value of $K_c=0.004$ has been obtained. The diameter of the particle $D_p$ and the scattering cross-sectional area Φ can be related with each other by Formulae (7) and (9). Hence, the light-extraction efficiency Eout is:

$$E_{out} = \exp\{-(\Phi N_p L_G K_c)\} \tag{13}$$

where $L_G$ is the length of the optical medium in the direction of the optical axis.

Formula (13) indicates that the light-extraction efficiency may be kept constant if $\Phi \cdot Np \cdot L_G$ is maintained constant ($\Phi \cdot Np \cdot L_G = $ CONST). That is, the light-extraction efficiency may be kept constant, if Np is changed in accordance with the length $L_G$ of the optical medium in the direction of the optical axis.

Further, if the total loss factor $K_L$, including Fresnel reflection loss which is dependent on the shape of the solid, optical input power distribution and incident angle of the input light when no particles are contained, inner transmission factor, and the like, is taken into account, Formula (13) above is rewritten as:

$$E_{out} = \exp\{-(\Phi \cdot Np \cdot L_G \cdot K_C)\} \cdot K_L \tag{14}$$

Thus, the light-extraction efficiency Eout may be determined by the scattering cross-sectional area Φ of the particle, particle density Np, length $L_G$ of the optical medium in the direction of optical transmission. In other words, when a desired light-extraction efficiency Eout is given, it can be obtained by satisfying Formula (14) above.

<Fresnel Reflection Loss Factor>

In considering the Fresnel reflection loss, the reflectance of the light is firstly taken into account, and a p-polarized component Rp and s-polarized component Rs may be expressed as:

$$Rp = \tan(\theta i - \theta r)/\tan(\theta i + \theta r) \tag{15a}$$

$$Rs = -\sin(\theta i - \theta r)/\sin(\theta i + \theta r) \tag{15b}$$

where

θi: angle of incidence

θr: angle of refraction

Hence, the intensity of the reflected light Ir is obtained from Formulae (15a) and (15b) as:

$$Ir = (Rp^2 + Rs^2)/2 \tag{16}$$

From Formula (16), the intensity of the transmitted light (It) is:

$$It = 1 - Ir \tag{17}$$

If the optical power distribution of the input light is taken into account, the intensity of transmitted light It' is:

$$It'(\theta i) = It(\theta i) \cdot D(\theta i) \tag{18}$$

where D(θi) is the power distribution function.

<Fresnel Loss Calculation>

When a light beam having an arbitrary spreading angle is injected into an optical medium, the Fresnel reflection loss varies with the arbitrary angle θi. The Fresnel reflection loss at the interface is expressed as:

$$\int_0^{\theta max} It(\theta i) \cdot D(\theta i) d\theta i / \int_0^{\theta max} D(\theta i) d\theta i \tag{19}$$

where θmax is the maximum angle of incidence of the light beam.

When the profile of the power distribution of the injected light is assumed to be rectangular in order to simplify the calculation, then Formula (19) above may be rewritten as:

$$\int_0^{\theta max} It(\theta i) d\theta i / \int_0^{\theta max} d\theta i \tag{20}$$

FIG. 6 shows Fresnel reflection losses calculated for various indices of refraction of the optical medium using Formula (20). In FIG. 6, the vertical scale shows the transmission factor to indicate the Fresnel reflection losses; i.e., the transmission factor of 1 corresponds to the loss of 0 (zero).

<Calculation of Light-Extraction Efficiency Including Fresnel Reflection Loss>

FIG. 6 shows that the Fresnel reflection losses are approximately the same when the angle of incidence is not greater than 30° even though the indices of refraction of the optical medium and surround medium differ greatly. Now, it may be considered that the directional cosines of the light beam are maintained in the reflection and refraction when the optical medium is a sheet-shaped rectangular solid, and the angle of incidence and exit angle of the light beam are presumed to be equal when the optical medium contains no particles. Further, when the internal transmission factor Tin can be approximated as Tin≈1, the product of the transmission factors of the input/output edges becomes the total transmission factor Ttotal. Consequently, when the index of refraction of the optical medium n=1.5, the Ttotal is 0.92.

Therefore, Formula (14) is rewritten as:

$$E_{out} = \exp\{-(\Phi \cdot Np \cdot L_G \cdot K_C)\} \cdot 0.92 \tag{14b}$$

The relationship between the diameter of the particles and the light-extraction efficiency obtained by Formula (14) is shown in FIGS. 7A to 7E. In the case where the intensity of the input light is distributed, or the angle of incidence of the light is greater than or equal to 30°, the Fresnel reflection loss may be obtained by Formula (19) or (20) and substituted in Formula (14b). Preferably, however, the spreading angle of the input light is up to about 30° in half angle taking into account the critical angle of the light at the output edge.

Each of FIGS. 7A to 7E shows the calculated values (10 mmC, 100 mmC, 1000 mmC) for respective diameters of the particle after a targeted value of averaged light-extraction efficiency has been determined, and the results (S_10 mm, S_100 mm, S_1000 mm) of detailed simulations using the diameters of the particle and the particle density employed in the calculation. The targeted values of averaged light-extraction efficiency in FIGS. 7A, 7B, 7C, 7D, and 7E are 80%, 70%, 60%, 50%, and 40% respectively. The scattering cross-sectional area Φ was obtained based on Rayleigh theory for a particle with a diameter of 20 nm, and Mie theory for a particle with a diameter greater than or equal to 200 nm. S indicates that it was obtained by the simulation and C indicates that it was obtained by the calculation, and each of the numeric values is the length $L_G$ of the optical medium in the direction in which the light is propagated.

FIGS. 7A to 7E indicate that the calculated values correspond well with the results of the detailed simulations with a deviation of less than 10% when the targeted values of averaged light-extraction efficiency are 60% and above. In other words, the deviation will fall in a range of less than 10% when the value of $\Phi \cdot Np \cdot L_G \cdot K_C$ is 0.4 or less. The figures also indicate that the deviation will fall in a range of less than 50% even if the value described above is 0.9 or less. The empirical value of 0.92 was used for $K_L$. It may not be considered to pose any problem for determining a targeted value of light-extraction efficiency for conducting simulations, or manufacturing prototype designs even if the deviation described above is as much as 50%. Of course, deviation of less than 10% means that no simulation is required, and no sample evaluation is required to narrow down the optical medium having a desired value of light-extraction efficiency, so that the development efficiency may be improved.

From the result described above, it may be possible to obtain a prospective solution for the light-extraction efficiency based on the comparatively simple results of Rayleigh region and Mie scattering and converging regions, and using Formula 14, without relying on the complicated Mie scattering theory. This method has been developed in view of this knowledge described above, and as described above, the desired value of light-extraction efficiency Eout is obtained by satisfying:

$$Eout = \exp\{-(\Phi \cdot Np \cdot L_G \cdot K_C)\} \cdot K_L$$

<Sample Calculations>

The results of calculation for a sheet-shaped rectangular solid based on Formula 14 are shown in Tables 1 to 3, and FIGS. 8A to 8C. FIG. 8A represents the graph of the values in Table 1, and FIGS. 8B and 8C correspond to Table 2 and 3 respectively. In the calculation results in these tables, the value of $\Phi \cdot Np \cdot L_G \cdot K_C$ is less than or equal to 0.9 in any table. The value of $K_L$ used is 0.92 for each table.

TABLE 1

Eout = 0.8

| Particle Diameter (nm) | Scattering Cross-Sectional Area ($m^2$) | Particle Density (Particles/ $mm^3$) | W × T × $L_G$ (mm) | Extraction Efficiency by Formula (14) (%) | Extraction Efficiency by SIM (%) |
|---|---|---|---|---|---|
| 20 | $1.1 \times 10^{-22}$ | $1.0 \times 10^{13}$ | 4 × 1 × 20 | 84 | 87 |
|  |  | $2.5 \times 10^{12}$ | 16 × 1 × 80 |  | 88 |
|  |  | $6.3 \times 10^{11}$ | 64 × 1 × 320 |  | 88 |
| 200 | $1.5 \times 10^{-14}$ | $3.0 \times 10^{7}$ | 4 × 1 × 20 | 89 | 89 |
|  |  | $7.5 \times 10^{6}$ | 16 × 1 × 80 |  | 89 |
|  |  | $1.9 \times 10^{8}$ | 64 × 1 × 320 |  | 89 |
| 2000 | $12.6 \times 10^{-12}$ | $3.0 \times 10^{5}$ | 4 × 1 × 20 | 68 | 75 |
|  |  | $7.5 \times 10^{4}$ | 16 × 1 × 80 |  | 76 |
|  |  | $1.9 \times 10^{4}$ | 64 × 1 × 320 |  | 76 |
| 20000 | $6.3 \times 10^{-10}$ | $3.0 \times 10^{3}$ | 4 × 1 × 20 | 79 | 86 |
|  |  | $7.5 \times 10^{2}$ | 16 × 1 × 80 |  | 86 |
|  |  | $1.9 \times 10^{2}$ | 64 × 1 × 320 |  | 86 |
| 200000 | $6.3 \times 10^{-8}$ | $3.0 \times 10^{1}$ | 4 × 1 × 20 | 79 | 90 |
|  |  | $7.5 \times 10^{0}$ | 16 × 1 × 80 |  | 90 |
|  |  | $1.9 \times 10^{0}$ | 64 × 1 × 320 |  | 90 |

Rectangular solid (sheet);
Note:
SIM = Simulation

TABLE 2

Eout = 0.7

| Particle Diameter (nm) | Scattering Cross-Sectional Area ($m^2$) | Particle Density (Particles/ $mm^3$) | W × T × $L_G$ (mm) | Extraction Efficiency by Formula (14) (%) | Extraction Efficiency by SIM (%) |
|---|---|---|---|---|---|
| 20 | $1.1 \times 10^{-22}$ | $2.0 \times 10^{13}$ | 4 × 1 × 20 | 78 | 82 |
|  |  | $5.0 \times 10^{13}$ | 16 × 1 × 80 |  | 83 |
|  |  | $1.3 \times 10^{12}$ | 64 × 1 × 320 |  | 83 |
| 200 | $1.5 \times 10^{-14}$ | $6.0 \times 10^{7}$ | 4 × 1 × 20 | 85 | 85 |
|  |  | $1.5 \times 10^{7}$ | 16 × 1 × 80 |  | 85 |
|  |  | $3.8 \times 10^{6}$ | 64 × 1 × 320 |  | 84 |
| 2000 | $12.6 \times 10^{-12}$ | $4.5 \times 10^{5}$ | 4 × 1 × 20 | 59 | 65 |
|  |  | $1.1 \times 10^{5}$ | 16 × 1 × 80 |  | 65 |
|  |  | $2.8 \times 10^{4}$ | 64 × 1 × 320 |  | 58 |
| 20000 | $6.3 \times 10^{-10}$ | $4.5 \times 10^{3}$ | 4 × 1 × 20 | 73 | 79 |
|  |  | $1.1 \times 10^{3}$ | 16 × 1 × 80 |  | 79 |
|  |  | $2.8 \times 10^{2}$ | 64 × 1 × 320 |  | 70 |

TABLE 2-continued

Eout = 0.7

| Particle Diameter (nm) | Scattering Cross-Sectional Area ($m^2$) | Particle Density (Particles/$mm^3$) | W × T × $L_G$ (mm) | Extraction Efficiency by Formula (14) (%) | Extraction Efficiency by SIM (%) |
|---|---|---|---|---|---|
| 200000 | $6.3 \times 10^{-8}$ | $4.5 \times 10^1$ | 4 × 1 × 20 | 73 | 86 |
|  |  | $1.1 \times 10^1$ | 16 × 1 × 80 |  | 86 |
|  |  | $2.8 \times 10^0$ | 64 × 1 × 320 |  | 78 |

Rectangular solid (sheet);
Note:
SIM = Simulation

TABLE 3

Eout = 0.6

| Particle Diameter (nm) | Scattering Cross-Sectional Area ($m^2$) | Particle Density (Particles/$mm^3$) | W × T × $L_G$ (mm) | Extraction Efficiency by Formula (14) (%) | Extraction Efficiency by SIM (%) |
|---|---|---|---|---|---|
| 20 | $1.1 \times 10^{-22}$ | $3.2 \times 10^{13}$ | 4 × 1 × 20 | 70 | 78 |
|  |  | $8.0 \times 10^{12}$ | 16 × 1 × 80 |  | 79 |
|  |  | $2.0 \times 10^{12}$ | 64 × 1 × 320 |  | 79 |
| 200 | $1.5 \times 10^{-14}$ | $1.2 \times 10^8$ | 4 × 1 × 20 | 79 | 78 |
|  |  | $3.0 \times 10^7$ | 16 × 1 × 80 |  | 78 |
|  |  | $7.5 \times 10^6$ | 64 × 1 × 320 |  | 77 |
| 2000 | $12.6 \times 10^{-12}$ | $9.0 \times 10^5$ | 4 × 1 × 20 | 37 | 41 |
|  |  | $2.3 \times 10^5$ | 16 × 1 × 80 |  | 40 |
|  |  | $5.6 \times 10^4$ | 64 × 1 × 320 |  | 36 |
| 20000 | $6.3 \times 10^{-10}$ | $9.0 \times 10^3$ | 4 × 1 × 20 | 59 | 60 |
|  |  | $2.3 \times 10^3$ | 16 × 1 × 80 |  | 60 |
|  |  | $5.6 \times 10^2$ | 64 × 1 × 320 |  | 52 |
| 200000 | $6.3 \times 10^{-8}$ | $9.0 \times 10^1$ | 4 × 1 × 20 | 59 | 73 |
|  |  | $2.3 \times 10^1$ | 16 × 1 × 80 |  | 73 |
|  |  | $5.6 \times 10^0$ | 64 × 1 × 320 |  | 64 |

Rectangular solid (sheet);
Note:
SIM = Simulation

In FIGS. 8A to 8C, (C) and (S) indicate the results of the calculation and detailed simulation respectively, and each of the numeric values is the dimensions of the optical medium (mm). The targeted value of light-extraction efficiency is defined as the averaged value in each diameter of the particle. As is clear from Table 1 to 3, and FIGS. 8A to 8C, the results of the calculation agree well with those of the simulation. In particular, the result for the particle with a diameter of 2000 nm unmistakably demonstrates that the calculation method provides the result that corresponds well with the simulation result.

<Power Distribution Characteristic of Output Light>

The optical output power distribution characteristic was evaluated through simulations, since it is influenced by the power distribution and spreading angle of the light source, and the number of light sources and their arrangement, etc. The optical output power distribution characteristic for each of the diameters of the particle obtained through simulations is shown in FIGS. 9A to 9C. Here, it was assumed that the light source was placed at the center of the input side edge, and the spreading angle was 30° in half angle. FIGS. 9A to 9C show the simulation results with the same conditions as those in Table 1 for rectangular sheets of small, medium, and large sizes respectively.

These Figures indicate that a substantially uniform optical power distribution of the output light is obtained around 90% of the light-extraction efficiency for an optical medium with a rectangular cross-section. The discussion and the computer simulation results described above indicate that it is possible to narrow down the value of light-extraction efficiency in advance by substituting the scattering cross-sectional area, particle density, size of the optical medium, and the like to Formula (14), when manufacturing an optical conductor by mixing particles for scattering light into any optical medium. Then, the optical power distribution characteristic of the output light may be obtained through detailed simulations. Further, several different samples may be produced based on the conditions narrowed down in advance, and evaluate them on a trial basis.

The sheet-type optical conductor used in the present invention is composed in such a way that it satisfies the relationship of $\Phi \cdot Np \cdot L_G \cdot K_C \leq 0.9$, so that the deviation from the simulation results falls within less than 10%, thus a favorable level of light-extraction efficiency and uniformly distributed optical power of output light may be obtained.

Further, the sheet-type optical conductor used in the present invention propagates light by scattering the light in succession by means of the particles contained in the optical medium, so that the light may be propagated from one edge of the conductor to the other, or the other way around as well. Thus, the communication system using the sheet-type optical conductor described above allows two-way communication.

<Requirement of the Communication System using Sheet-type Optical Conductor>

A typical sheet-type optical conductor used for communication is shown in FIG. 10. The sheet-type optical conductor 10, as described earlier, comprises an optical medium, such as PMMA (polymethylmethacrylate) that contains particles for scattering light, and propagates the light injected from one edge of the medium to the other by scattering the light by means of the particles. The sheet-type optical conductor 10 has a plurality of optical fibers 21, 22, and 23 connected thereto on one edge and 31, 32, and 33 on the other. As for these fibers 21 to 23 and 31 to 33, an optical fiber with a large N.A. (numerical aperture) is normally used to enable two-way communication.

The requirement of the communication system when the light is received through an optical fiber will be described herein below. According to a document entitled "High-Uniformity Star Coupler Using Diffused Light Transmission" IEICE TRANS. ELECTRON, Vol. E84C, No.3, MARCH 2001, P339 (hereinafter referred to as "non-patent document 1"), the requirement of the optical receiver in a sheet-type optical conductor system for communication is as follows.

<Optical Power of 20.5 dBm (0 dBm=1 mW) or More is Required for the Optical Receiver as the Minimum Optical Input Power>

This requirement is worked out from the bit-error-rate (BER) in a two-way transmission of a 500 Mbps signal, using an optical receiver made of a PIN photodiode. Therefore, in the case where a different optical receiver (for example, photo-multiplier, avalanche photo diode, or the like) or different transmission band is used, then this requirement does not serve as a reference. That is, there should be a minimum optical power acceptable to any optical receiver in a certain transmission band. Now, the minimum optical power acceptable to an optical receiver that satisfies the requirement described above is defined as P(Receiver)min.

First, the constraining conditions will be obtained based on the requirement described above in a case where the profile of the power distribution of the output light of the sheet-type optical conductor is flat. Even when the profile of the power distribution of the output light of the sheet-type optical conductor is flat, the area ratio ($\pi/4$) of the light guide path and cross-sectional area of the optical fiber will inevitably lead to an optical loss. In this respect, it is assumed that the core diameter of the fiber is equal to the thickness of the sheet-type optical conductor. Further, the tolerance is not taken into account at the present time.

When the number of branches (nodes) is defined as N, the optical power for each of the branches is reduced to 1/N, and if the optical loss of $\pi/4$ is accounted for, then the optical power P(Receiver) received by each of the optical receivers in an ideal case is:

$$P(\text{Receiver}) = E_{out} \cdot (1/N) \cdot \pi/4 \quad (21)$$

where it is assumed that all of the optical power outputted from the optical fiber is received by the optical receiver. When the optical power injected into the optical conductor is defined as Pin, Formula (21) is:

$$P(\text{Receiver}) = P_{in} \cdot E_{out} \cdot (1/N) \cdot \pi/4 \quad (22)$$

When the logarithm of Formula (22) is taken to express the optical power in dBm received by each of the optical receivers, then:

$$P(\text{Receiver})_{dBm} = -10\text{Log}\{P_{in} \cdot E_{out} \cdot (1/N) \cdot \pi/4\} \quad (23)$$

The relationship between the optical power received by each of the optical receivers and the number of branches when light beams having optical powers of 1 mW and 10 mW are injected into the sheet-type optical conductor is shown in FIG. 11. As FIG. 11 shows, the optical power received by each of the optical receivers is naturally proportional to the optical power outputted from the optical fiber. Here, it has been assumed that the profile of the power distribution of the output light from the sheet-type optical conductor is flat, but in practice, it varies according to the location of the light source, which means that the optical powers received by the optical receivers fluctuate, and it is presumed that the optical power received by the optical receiver connected to the region of the conductor where the output light is minimal also becomes minimal.

Here, when an optical power Pin injected into the optical conductor is given, the power distribution profile of the output light when the light source is placed at any location is expressed by the normalized power distribution function D(x, y) with the direction corresponding to the longer side of the distribution profile being designated as x and the direction corresponding to the shorter side thereof being designated as y. In addition, one unit at the input and output sections divided by the number of branches (number of nodes) is hereinafter referred to as "segment", and it is assumed that the center of the optical fiber (optical axis) is ideally positioned at the center of each of the segments.

Hence, the normalized average value NPi of the optical output power from the $i^{th}$ segment is given by:

$$Npi = \int_{Seg_i} D(x,y) dxdy / \int_{Seg_{max}} D(x,y) dxdy \quad (24)$$

where Segi is the integrated region of the $i^{th}$ segment, and Segmax is the segment having the maximum optical power of all the segments.

NPi of the segment having the minimum optical power is given by:

$$Npi(min) = \int_{Seg_{min}} D(x,y) dxdy / \int_{Seg_{max}} D(x,y) dxdy \quad (25)$$

In Formula (23), the total optical output power Pout is given by:

$$P_{out} = P_{in} \cdot E_{out} \quad (26)$$

From this, the optical power in the $i^{th}$ segment is given by:

$$PSeg_i = P_{out} \cdot \left\{ NPi \Big/ \sum_{i=1}^{n} NPi \right\} \quad (27)$$

because the number of branches=the number of segments=the number of nodes. In this specification, $$\sum_{i=1}^{n} NPi$$

included in Formula (27) above is expressed as ΣNPi for convenience.

When Formulae (23) and (27) are combined together to replace 1/N used in the case where the profile of the power distribution of the output light is assumed to be flat in Formula (23), then:

$$P(\text{Receiver})_{dBm} = -10\text{Log}\{P_{in} \cdot E_{out} \cdot (NPi/\Sigma NPi) \cdot \pi/4\}$$

The value needed here is the minimum optical power outputted from the optical fiber, which is given by Formula (25). That is, the minimum optical power received by the optical receiver $P(\text{Receiver\_min})_{dBm}$ is obtained by the formula described above:

$$P(\text{Receiver\_min})_{dBm} = -10\text{Log}\{Pin \cdot Eout \cdot (NPi(\text{min})/\Sigma NPi) \cdot \pi/4\} \quad (28)$$

where Pin is the optical input power, Eout is the light-extraction efficiency, NPi(min) is the optical power of the segment having the minimum optical power, and $\Sigma NPi$ is the sum of the optical powers of the segments.

The minimum optical power $PRmin_{dBm}$ required for the optical receiver to satisfy a certain BER is:

$$PRmin_{dBm} \leq P(\text{Receiver\_min})_{dBm}$$

Further, when the coupling losses between the light-emitting device and the optical fiber $K_E$, between the optical fiber and the sheet-type optical conductor $K_F$, between the optical fiber and optical receiver $K_R$, and the internal loss of the optical fiber $K_{FI}$ are taken into account, then:

$$PRmin_{dBm} \leq P(\text{Receiver\_min})_{dBm} \cdot K_E \cdot K_F \cdot K_R \cdot K_{FI} \quad (29)$$

Formula (29) represents the requirement of the communication system using the sheet-type optical conductor.

<BER (Bit-Error-Rate)>

BER is an index for indicating the level of disagreement between a digital signal received by the receiver and the original digital signal when a random digital signal is transmitted through a certain communication medium, and is expressed as:

$$BER = Biter/Bits \quad (30)$$

where, Bits is the number of bits transmitted, and Biter is the number of bit errors.

The mechanism of the bit error will be discussed. First of all, the distortion of an analog waveform to be converted into a digital signal is considered to be the primary factor. Also, S/N needs to be taken into account, since the bit error increases when the signal level is decreased. Even when the digital signal level is decreased due to the wave form distortion, if the level of the digital signal steadily exceeds a threshold level that distinguishes a signal of 0 from a signal of 1, the bit error should not occur. It is presumed that the noise coming from outside, or the noise generated internally fluctuates the level of the already distorted waveform to cause bit errors (see FIG. 12).

The primary factors of the waveform distortion in a communication system using a sheet-type optical conductor are presumed to be the signal distortion itself between any input and output segments, and the waveform distortion caused by the phase difference in the signal components contained in the mixing signals transmitted from each of the input segments to any output segment, which results from the difference in the optical paths. In the communication system using the optical fiber and sheet-type optical conductor, the elements that cause the difference in optical paths are the sheet-type optical conductor itself and the fiber. That is, the bit error is presumed to occur when the signal level drops below a predetermined threshold level due to the waveform distortion when an analog signal is converted to a digital signal. Further, in transmitting a digital signal, a reference signal (reference clock) is usually accompanied as the reference for receiving the digital signal, the bit error is presumed to occur when the phase difference (jitter) between the reference signal and the digitized signal is increased. In addition, the analog signal near the threshold level fluctuates above and below the threshold level due to the noise and is converted to an incorrect digital signal. In other words, the bit error is presumed to occur due to the combined factors of difference in optical paths and the noise.

<Relationship Between Difference in Optical Paths and BER (Bit-Error-Rate)>

The waveform distortion of the communication systems, each using the sheet-type optical conductor of 4, 8, or 16 nodes are shown in FIGS. 13A and 13B (4 nodes), FIGS. 14A and 14B (8 nodes), and FIGS. 15A and 15B (16 nodes) respectively. The outer diameter of all the optical fibers is 1 mm with lengths of 1 m that does not cause any significant difference in optical paths, and the optical fibers are closely arranged in parallel on the optical input/output edges.

The numerical values of "IN" and "OUT" in the figures indicate the distance (mm) of the optical input and output positions from the center of the sheet-type optical conductor in the direction in which the optical fibers are arranged in parallel (the side where the input optical fiber is located is indicated with minus (−) sign, and the opposite side of the center are indicated with plus (+) sign in the figures). That is, FIG. 13A shows the waveform distortion in the case where the light is injected into the optical fiber having its center at the position −1.5 mm away from the center of the sheet conductor, i.e., the second fiber in the minus (−) direction from the center (for example, optical fiber 21 in FIG. 18, which will be described later), and outputted from the optical fiber having its center at the same position as that of the input fiber (optical fiber 31 in FIG. 18), and FIG. 13B shows the waveform distortion in the case where the light is injected into the optical fiber having its center at the same position as that described above (optical fiber 21 in FIG. 18), and outputted from the optical fiber having its center at the position +1.5 mm away from the center of the sheet conductor, i.e., the second optical fiber in the plus (+) direction (optical fiber 34 in FIG. 18). The FIG. 14A shows the waveform distortion in the case where the light is injected into the optical fiber having its center at the position −3.5 mm away from the center of the sheet conductor, i.e., the fourth optical fiber in the minus (−) direction, and outputted from the optical fiber having its center at the same position as that of the input fiber, and FIG. 14B shows the waveform distortion in the case where the light is injected into the optical fiber located at the same position as that described above, and outputted from the optical fiber having its center at the position +3.5 mm away from the center of the sheet conductor, i.e., the fourth optical fiber in the plus (+) direction. FIG. 15A shows the waveform distortion in the case where the light is injected into the optical fiber having its center at the position −7.5 mm away from the center of the sheet conductor, i.e., eighth optical fiber in the minus (−) direction from the center, and outputted from the optical fiber having its center at the same position as that of the input fiber. FIG. 15B shows the waveform distortion in the case where the light is injected into the optical fiber located at the same position as that described above, and outputted from the optical fiber having its center at the position +7.5 mm away from the center of the sheet conductor, i.e., eighth optical fiber in the plus (+) direction.

These figures show that the variations in the level of the signal due to the waveform distortions are negligible when an input signal of 1 Gbps is injected.

<Relationship Between S/N and BER>

The reading error (bit error) is also presumed to be related to the signal quality, i.e., signal-to-noise ratio (S/N). That is, even if the major components of the adjacent signal spectra other than the higher harmonics may be separated clearly, when the higher harmonic components (noise components) are large enough, then the major signal components cannot be distinguished as different signals. In the extreme case, the signal buried in the noise is normally presumed to be impossible to be detected unless it is passed through an additional filter.

The noise components include external noise, such as radiation and inductive noise, in addition to the noise generated within the system including thermal noise (Johnson Noise), quantum noise (Shot Noise), and 1/f noise peculiar to the semiconductor device used for the light-emitting device and optical receiver. Here, only the noise generated within the system is considered without taking into account the external noise, in order to evaluate the performance of the system itself. The impact of the 1/f noise is also disregarded.

The power of the noise components Noise(Total) is expressed as:

$$\text{Noise(Total)} = \text{Noise (thermal)} + \text{Noise (quantum)} \tag{31}$$

Each of the noise components expressed in terms of power for a light receiving element is:

$$\text{Noise(thermal)} = (4kT/R) \cdot \Delta\upsilon \tag{31a}$$

Where
K: Planck constant.
T: equivalent temperature (determined by the noise figure).
R: load resistance of the optical receiver.
$\Delta\upsilon$: bandwidth of the light receiving element.

$$\text{Noise(quantum)} = 3e^2 \cdot (P+PB) \cdot \eta \cdot \Delta\upsilon/(h\upsilon) + 2ei_d \Delta\upsilon \tag{31b}$$

where
e: electric charge of an electron.
P: optical signal power.
PB: optical power of the background light.
$\eta$: quantum efficiency.
h: Planck constant.
$\upsilon$: frequency of the optical signal.
$i_d$: dark current.
$\Delta\upsilon$: bandwidth of the optical receiver.

Here, it is assumed that a signal having a bandwidth of 0.25 GHz without any power drop is rectified to produce a 0.5 Gbps signal. That is, the bandwidth of the photodiode is 0.25 GHz. In this case, noise components of a Si photodiode, S5973 ($P=8.9\times10^{-6}$W (20.5 dBm), $\eta=0.4$, $R=50\Omega$, $T=300K$) manufactured by Hamamatsu Photonics K. K. are calculated in terms of current values:

$$\text{Noise (thermal\_rms)} = 2.88\times10^{-7} \, (A)$$

$$\text{Noise (quantum\_rms)} = 8.19\times10^{-8} \, (A)$$

The total noise component Noise(total_rms) is:

$$\text{Noise(total\_rms)} = 3.70\times10^{-7} \, (A) \tag{32}$$

Meanwhile, the signal current Sc produced by the minimum optical power received by the optical receiver is given by:

$$Sc = P \cdot e \cdot \eta/(h\upsilon) \tag{33}$$

so that the signal current S(min)c produced by the minimum optical power received by the optical receiver is:

$$S(\min)c = 2.46\times10^{-6} \, (A)$$

Thus, the signal-to-noise ratio (S/N) in this case is $$S/N(P\min) = 6.65$$

Since the thermal noise is predominant, the noise distribution is approximated by the Gaussian distribution. Then, the probability of the case Pr(S/N=1) where the system noise reaches 6.65 times of the rms noise at certain timing, i.e., the case where the signal current level=noise current level is given by:

$$Pr(S/N=1) \approx 3.47\times10^{-11}$$

which is close to BER$\approx 1\times10^{-11}$, and also close to the probability of BER described in the non-patent document 1 described earlier. In addition, if a high-pass filter of about 20 MHz having no impact on the digital signal transmission is used, then:

$$S/N(P\min) = 6.81$$

$$Pr(S/N=1) \approx 1.31\times10^{-11}$$

which corresponds substantially to the value described in the non-patent document 1. That is, the result described above is the basis that the presumptions on BER employed heretofore may be justified. The relationship between the magnitude and probability of the rms (root mean square) noise is shown in FIG. 16.

A more practical method will be examined, advancing the presumption on BER one step further. Typical rms noise (in voltage value) for the communication system using the sheet-type optical conductor is measured and defined as Noise(System_rms). When the BER acceptable to the system is defined as BER(accept), and the optical signal power received when the BER corresponding to BER(accept) is defined as PRmin, the signal voltage S(Prmin)v is:

$$S(P\text{rmin})v = P\text{Rmin} \cdot e \cdot \eta/(h \cdot \upsilon) \cdot R \tag{34}$$

where R is load resistance. The threshold level of the signals of 0 and 1 is defined as V(Thresh), and S/N(Thresh) that takes into account the threshold level is defined as:

$$S/N(\text{Thresh}) = \{S(P R\min)v - V(\text{Thresh})\}/\text{Noise(System\_rms)} \tag{35}$$

Assuming that the value of Formula (35) reaches a certain value, a bit error occurs with a certain probability, which is defined as S/Naccept, then the probability of Noise(System_rms) may be presumed to be equal to the BER based on the consideration above. The relationship between the BER and optical power received by the optical receiver calculated based on the consideration described above is shown in FIG. 17. This relationship is very close to the actual measurement described in the non-patent document 1 and also their profiles look alike.

Examining V(Thresh), a bit error occurs when the remaining value of signal component less noise component falls below V(Thresh), or the value of "0" level plus noise component exceeds V(Thresh). Thus, it is presumed to be desirable that the V(Thresh) is set at the level of half the averaged signal voltage.

From the discussion above, a communication system using a sheet-type optical conductor with an internal noise level of Noise (System_rms), input signal level of PRmin, and an output signal voltage of S(PRmin)v may be defined. Here, the internal noise level Noise(System_rms) satisfies the following in the bandwidth that needs to take no account of the waveform distortion:

$$Pr(\text{Noise(System\_rms)} \cdot Q) \leq \text{BER(accept)} \tag{36}$$

where BER(accept) is the BER acceptable to the system, Pr(Noise(System_rms)) is the probability of Noise(System_rms), and Q is a proportionality constant, and the input signal level PRmin satisfies:

$$\{S(PR\text{min})v - V(\text{Thresh})\} > \text{Noise(System\_rms)} \cdot Q \qquad (37)$$

where V(Thresh) is any predetermined threshold level for digitization, and Q is a proportionality constant, and the output signal voltage S(PRmin)v is outputted from the optical receiver that satisfies the Formula (37) through load resistance.

Formula (37) described above may also be defined as follows for the aforementioned reason:

$$S(PR\text{min})v/2 > \text{Noise(Systm\_rms)} \cdot Q \qquad (38)$$

Further, the system may be designed to satisfy Formulae (37) and (38) by providing circuitry capable of measuring BER internally for adjusting the output power PRmin of the light source to satisfy the BER(accept). In this case, the system may handle external noise, as well as the noise Noise(System_rms) generated by the system itself by providing a digital circuit to feed back the BER information to the light source, which is designed to control the optical power of the light source in accordance with the table determined by BER(accept).

In particular, employment of the sheet-type optical conductor having a protective layer that covers the whole surface of the optical conductor body described above as the sheet-type optical conductor for the communication system of the present invention may protect the optical conductor body from destruction or damage caused by external shocks and pressures, resulting in an increased reliability of the communication system.

In that case, if a cladding layer is formed between the protective layer and the surface of the optical conductor body, most of the optical signal components reached the surface of the optical conductor body are totally reflected at the interface between the surface and the cladding layer, and prevented from being absorbed in the protective layer, so that high optical transmission efficiency may be realized.

Further, when the difference in the index of refraction between the cladding layer and optical conductor body is such that the conditions of the total reflection of the optical signal are satisfied for the maximum angle of incidence of the optical signal on the optical conductor body, then even if the sheet-type optical conductor is bent to a certain degree, high optical transmission efficiency corresponding to that obtained when the optical conductor is kept flat may be ensured. Thus, the communication system of the present invention using such a sheet-type optical conductor described above may be widely applied to replace, for example, the communication systems using flexible substrates or flat cables which have conventionally been used for the internal wiring of a machine where only a small space is available. Further, the communication system of the present invention using the sheet-type optical conductor is not only capable of just replacing the conventional communication systems but also has a high tolerance to electromagnetic noise, since it provides communication by way of an optical signal. At the same time, it may be manufactured at a lower price compared with the system that provides communication by way of an optical signal using optical fibers.

BRIEF DESCRIPTION OF THE DRAWINGS

FIG. 12 is a schematic diagram illustrating the cause of bit errors.

FIG. 19A is a partially broken side view of a sheet-type optical conductor illustrating another example of the sheet-type optical conductor used for the communication system of the present invention.

FIG. 19B is a sectional elevational view of a sheet-type optical conductor illustrating another example of the sheet-type optical conductor used for the communication system of the present invention.

FIG. 20A is a partially broken side view of a sheet-type optical conductor illustrating still another example of the sheet-type optical conductor used for the communication system of the present invention.

FIG. 20B is a sectional elevational view of a sheet-type optical conductor illustrating still another example of the sheet-type optical conductor used for the communication system of the present invention.

FIG. 21A is a partially broken side view of a sheet-type optical conductor illustrating still another example of the sheet-type optical conductor used for the communication system of the present invention.

FIG. 21B is a sectional elevational view of a sheet-type optical conductor illustrating still another example of the sheet-type optical conductor used for the communication system of the present invention.

FIG. 32 is a plan view of a sheet-type optical conductor according to another embodiment of the present invention.

FIG. 33A is an elevational view of the sheet-type optical conductor shown in FIG. 32 illustrating the shape of the input/output edges thereof.

FIG. 33B is a schematic diagram illustrating the physical relationship between the input/output edges and optical fibers.

FIG. 34A is an elevational view of a sheet-type optical conductor according to another embodiment of the present invention.

FIG. 34B is a schematic diagram illustrating the physical relationship between the input/output edges and optical fibers.

DESCRIPTION OF THE PREFERRED EMBODIMENTS

Hereinafter, the preferred embodiments of the present invention will be described with reference to the accompanying drawings.

Figure 1:
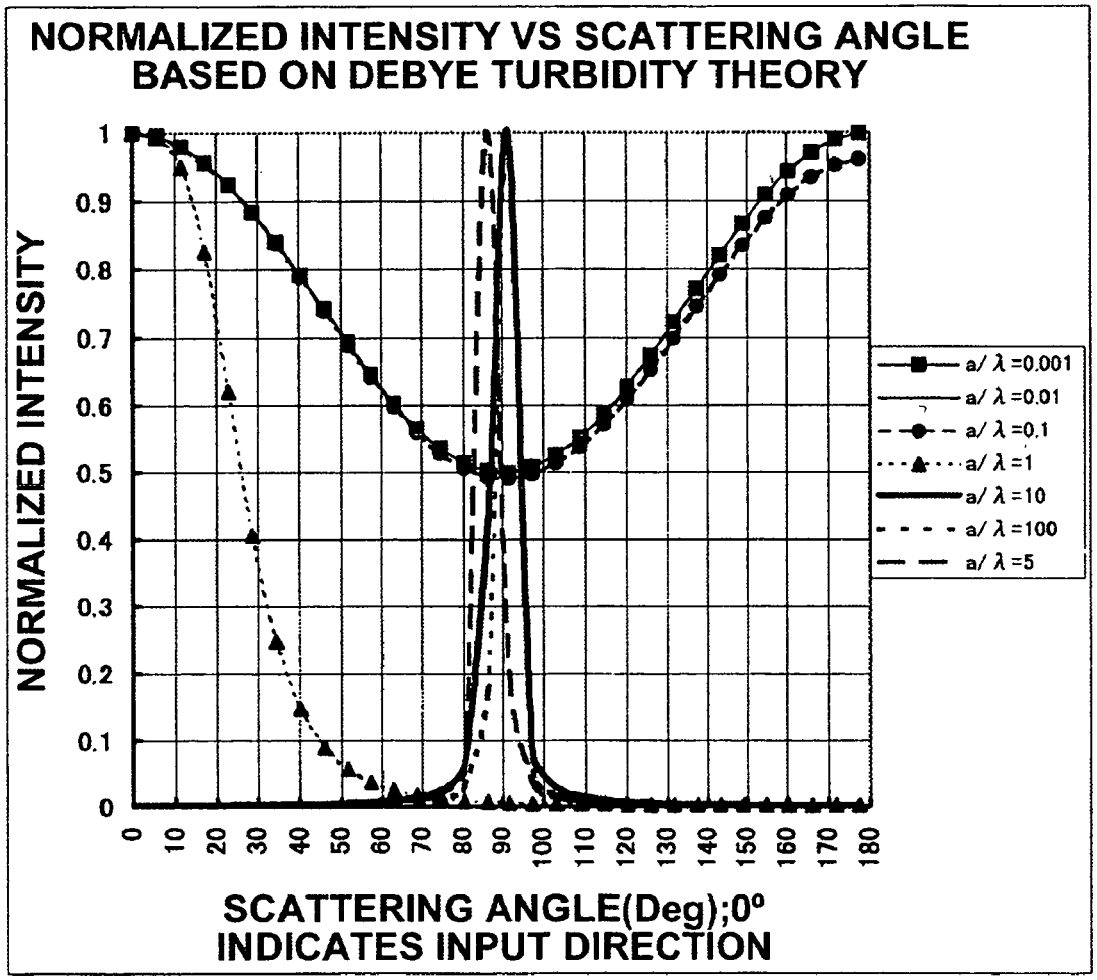
FIG. 1 is a graph showing normalized intensity vs scattering angle based on Debye turbidity theory.
Figure 2:
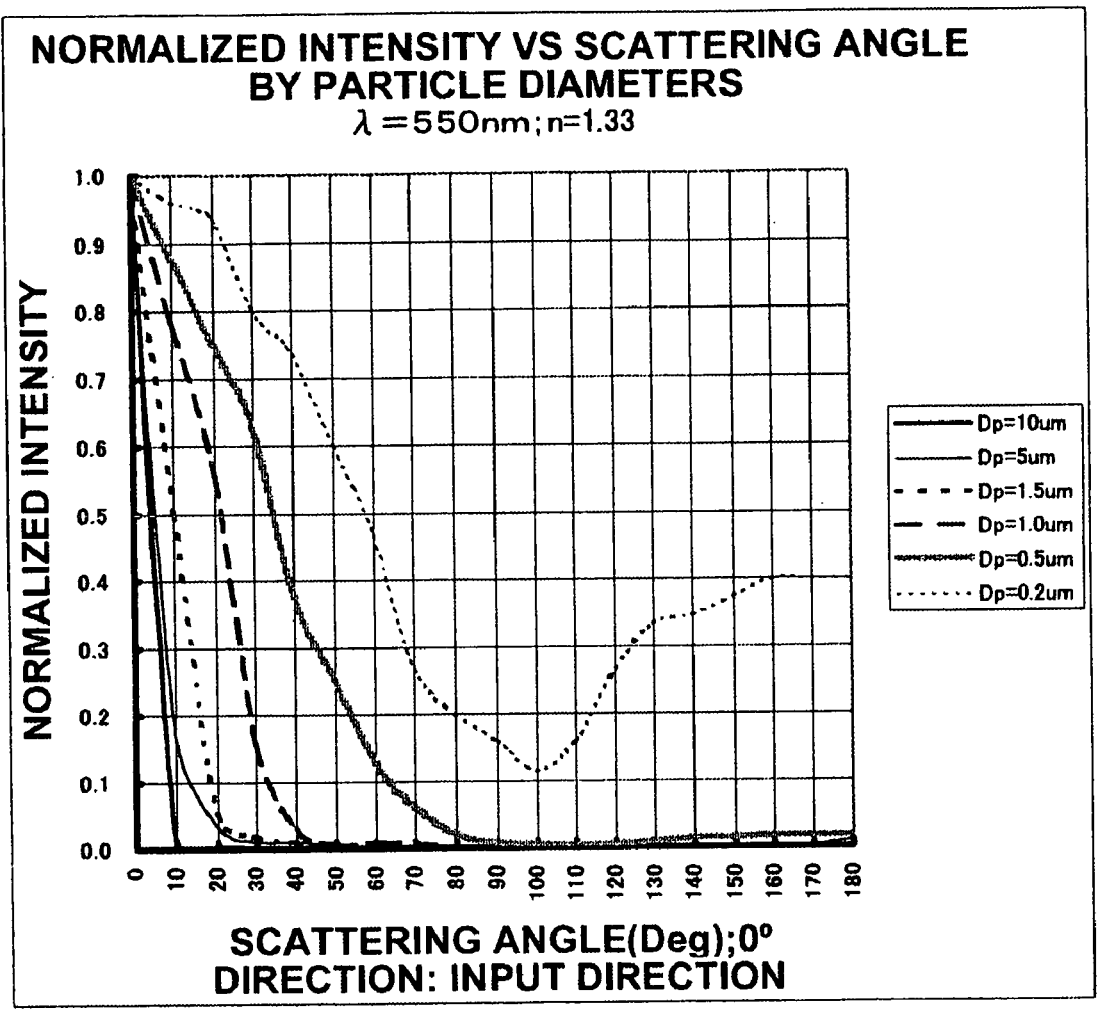
FIG. 2 is a graph showing normalized intensity vs scattering angle based on Mie scattering theory.
Figure 3A:
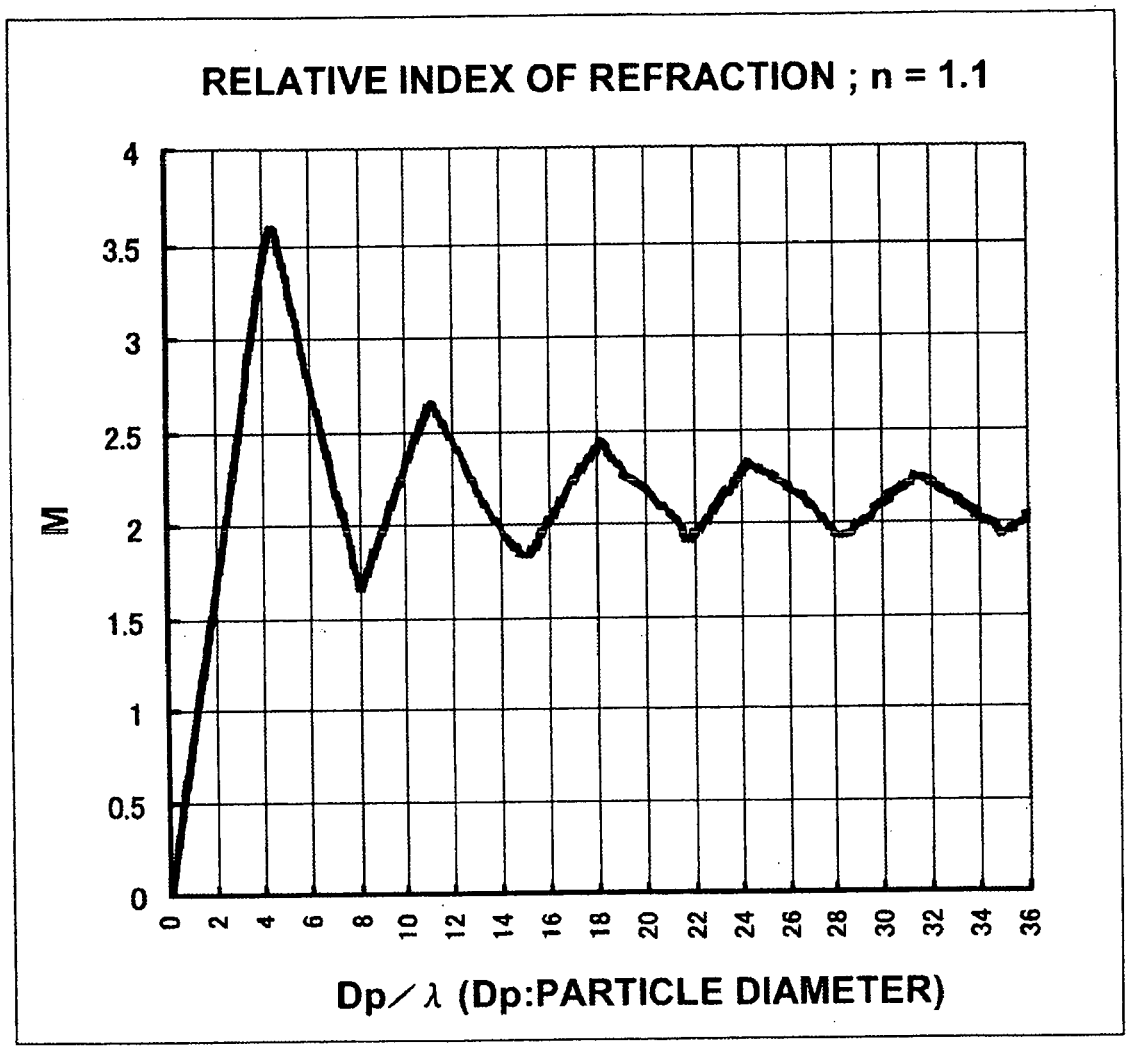
FIG. 3A is a graph showing oscillation of the scattering cross-sectional area when the relative index of refraction is 1.1 in Mie scattering theory.
Figure 3B:
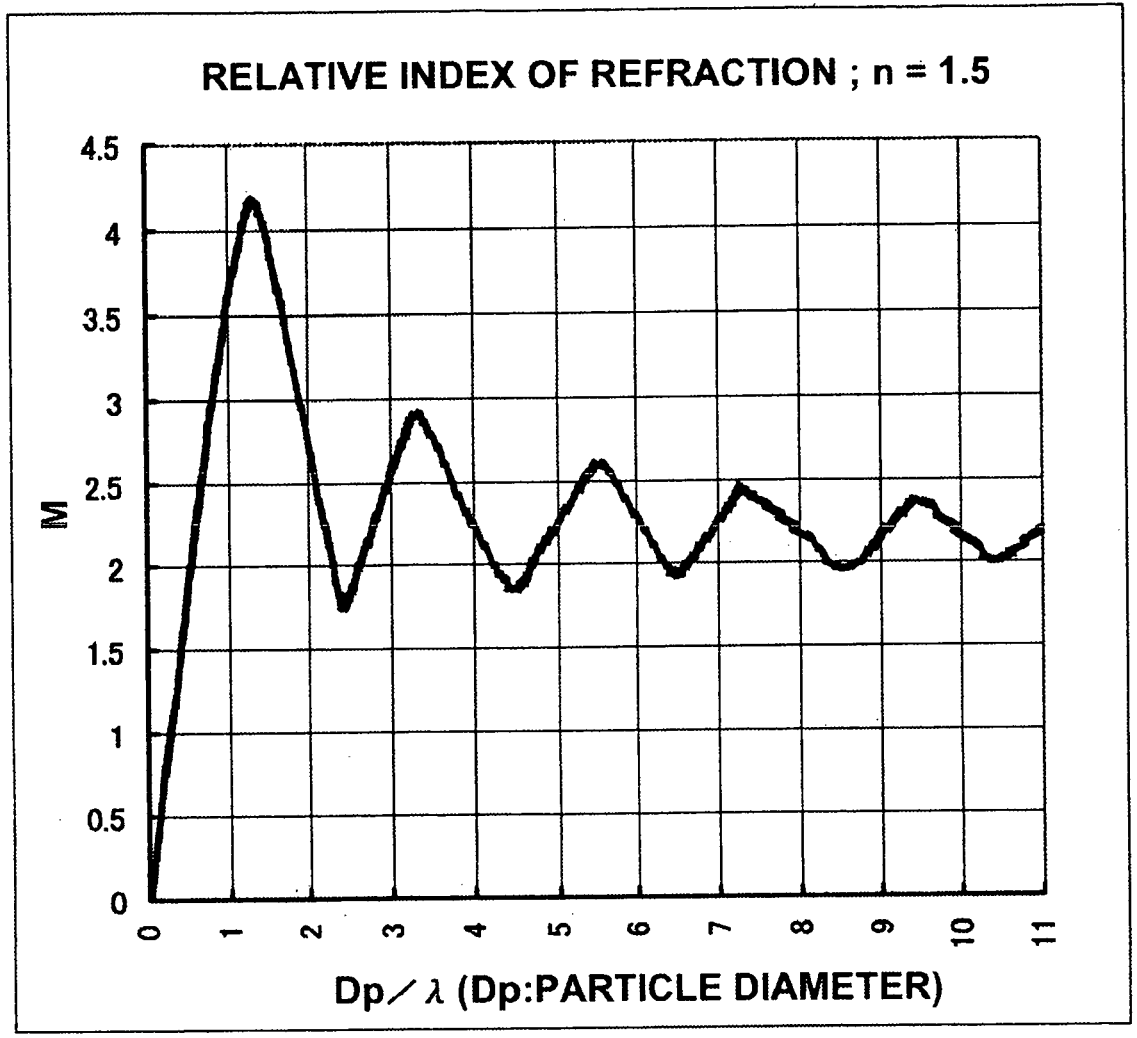
FIG. 3B is a graph showing oscillation of the scattering cross-sectional area when the relative index of refraction is 1.5 in Mie scattering theory.
Figure 3C:
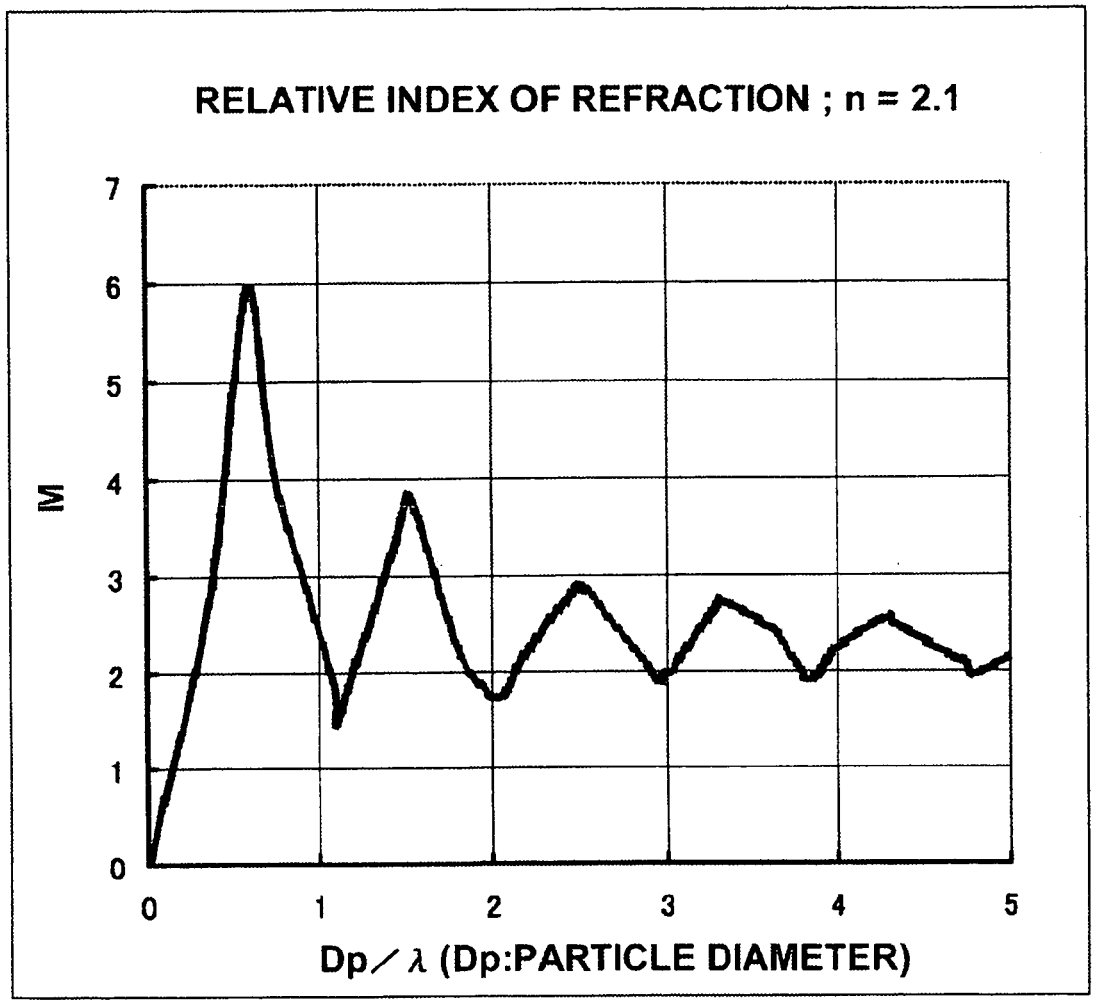
FIG. 3C is a graph showing oscillation of the scattering cross-sectional area when the relative index of refraction is 2.1 in Mie scattering theory.
Figure 4:
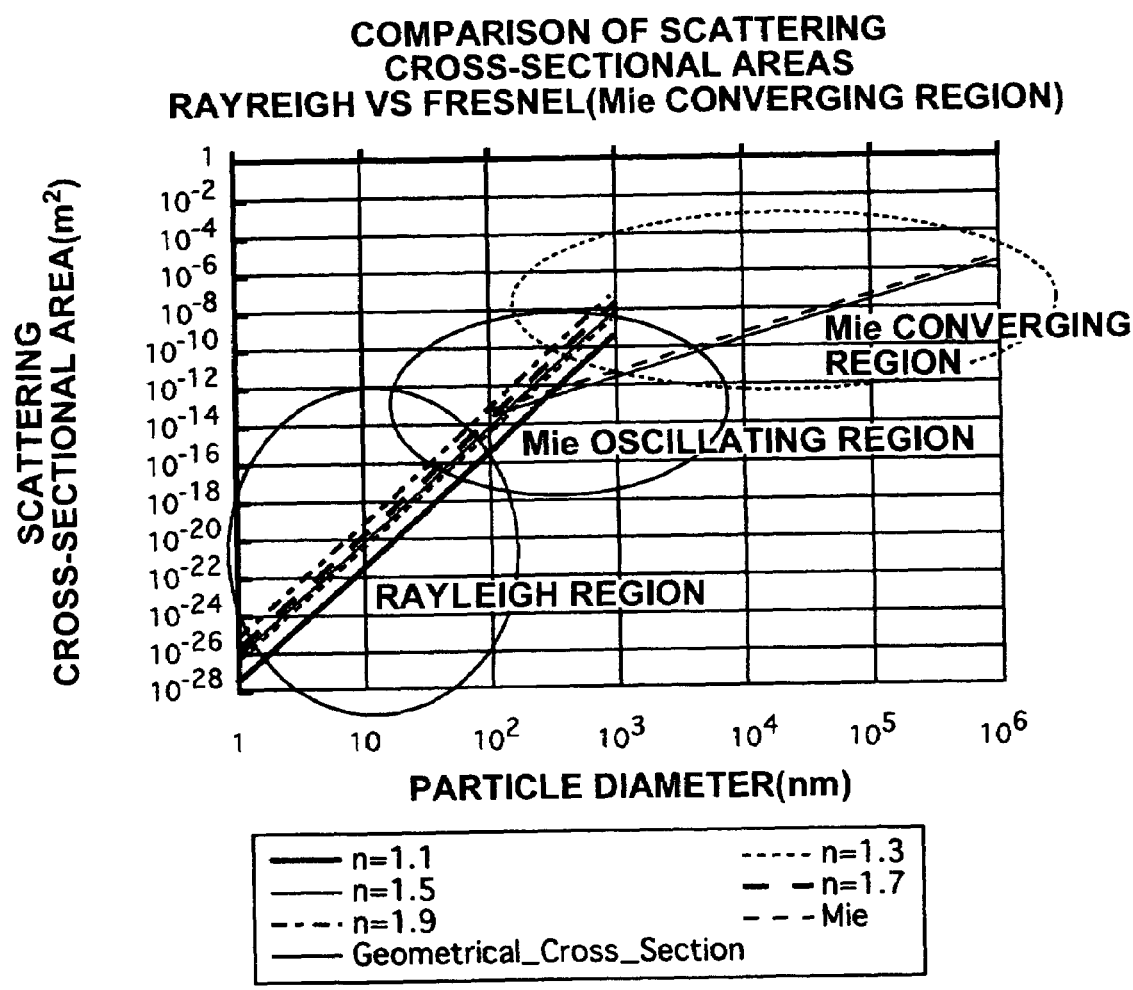
FIG. 4 is a graph showing computer simulation results indicating the relationship between the diameter of the particle and the scattering cross-sectional area for each of the several relative indices of refraction.
Figure 5:
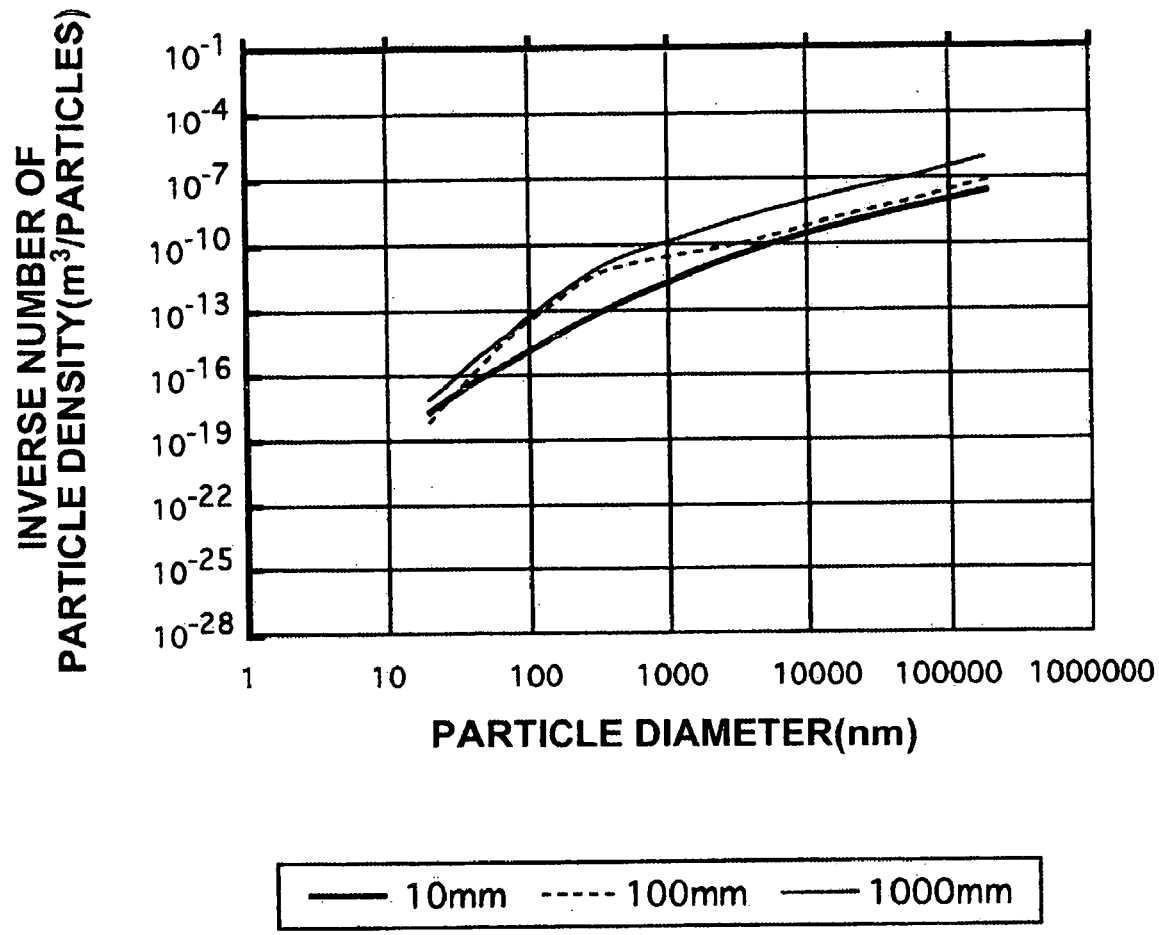
FIG. 5 is a graph showing computer simulation results indicating the relationship between the diameter of the particle for a multi-particle system and the inverse number of the particle density.
Figure 6:
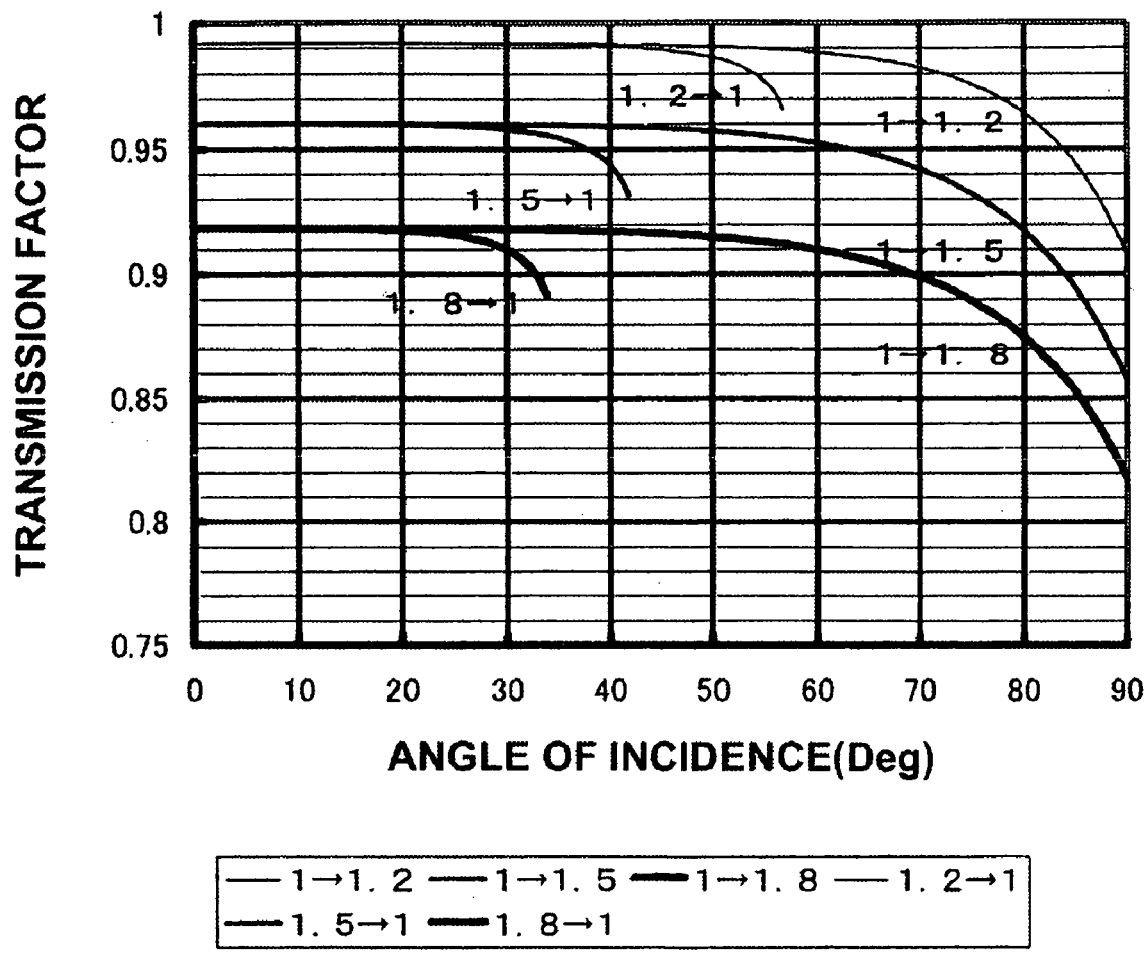
FIG. 6 is a graph showing Fresnel reflection losses calculated for various indices of refraction of the optical medium.
Figure 7A:
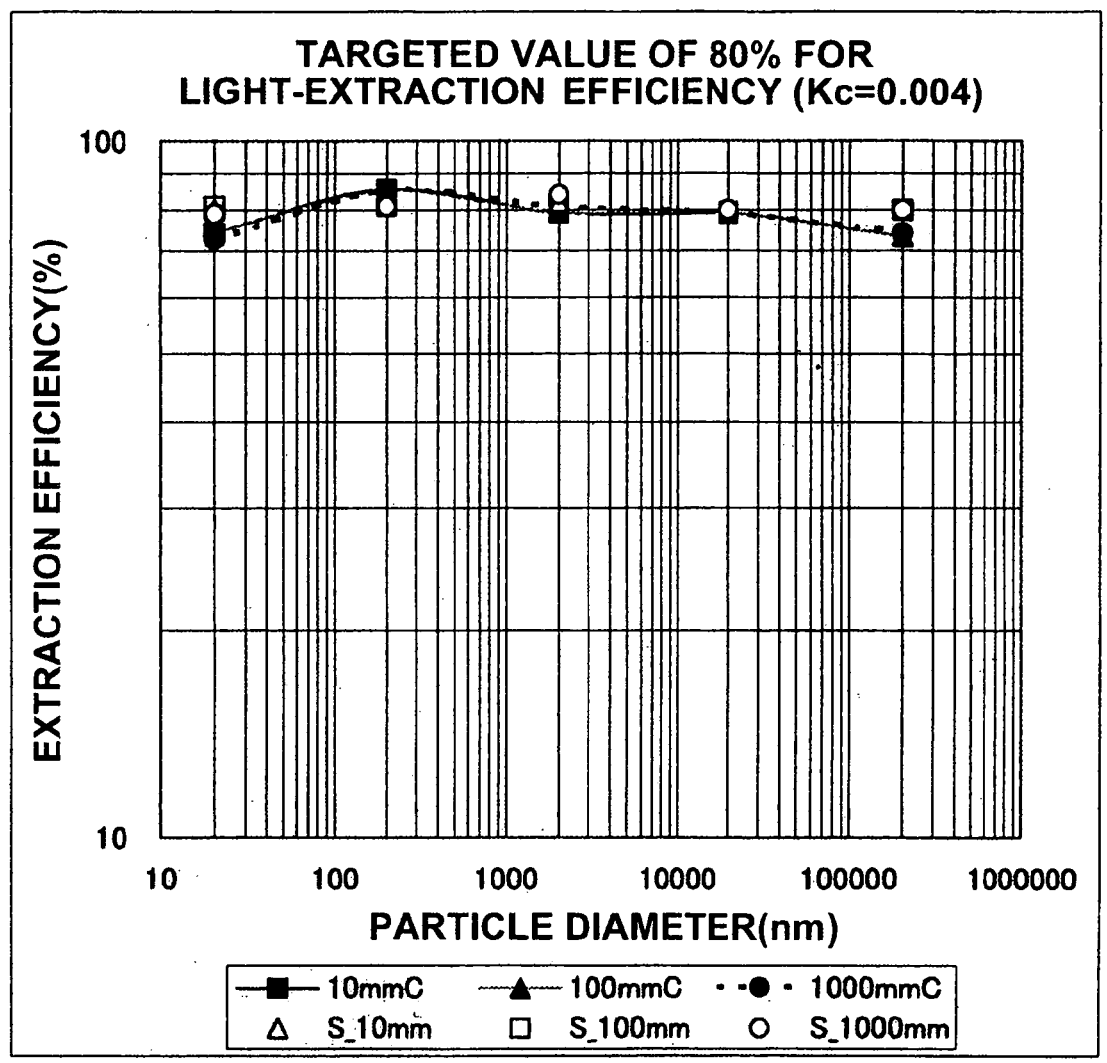
FIG. 7A is a graph comparing two results of the relationship between the diameter of the particle and light-extraction efficiency obtained by the method of the present invention and computer simulations (targeted value of light-extraction efficiency of 80%).
Figure 7B:
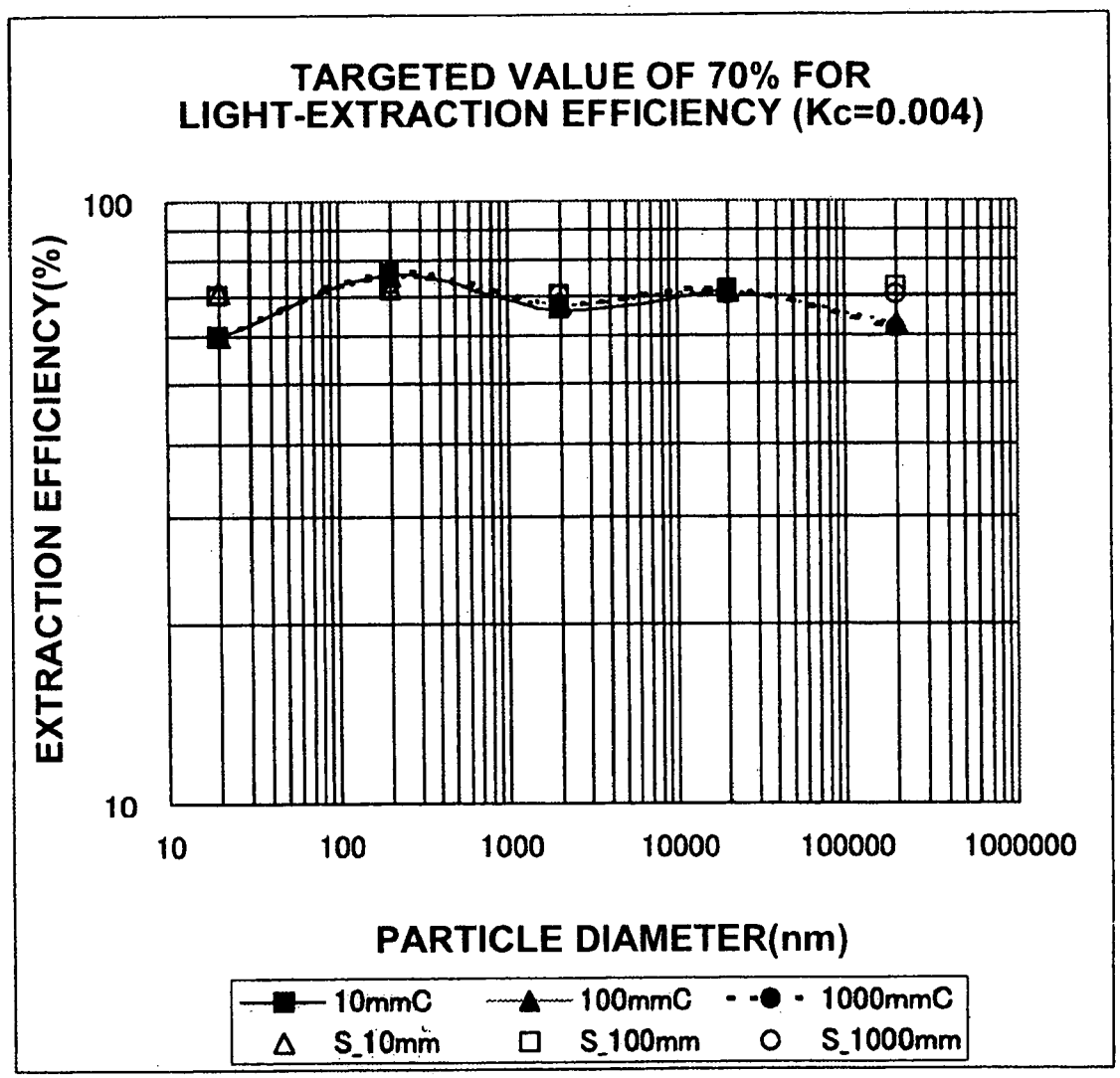
FIG. 7B is a graph comparing two results of the relationship between the diameter of the particle and light-extraction efficiency obtained by the method of the present invention and computer simulation (targeted value of light-extraction efficiency of 70%).
Figure 7C:
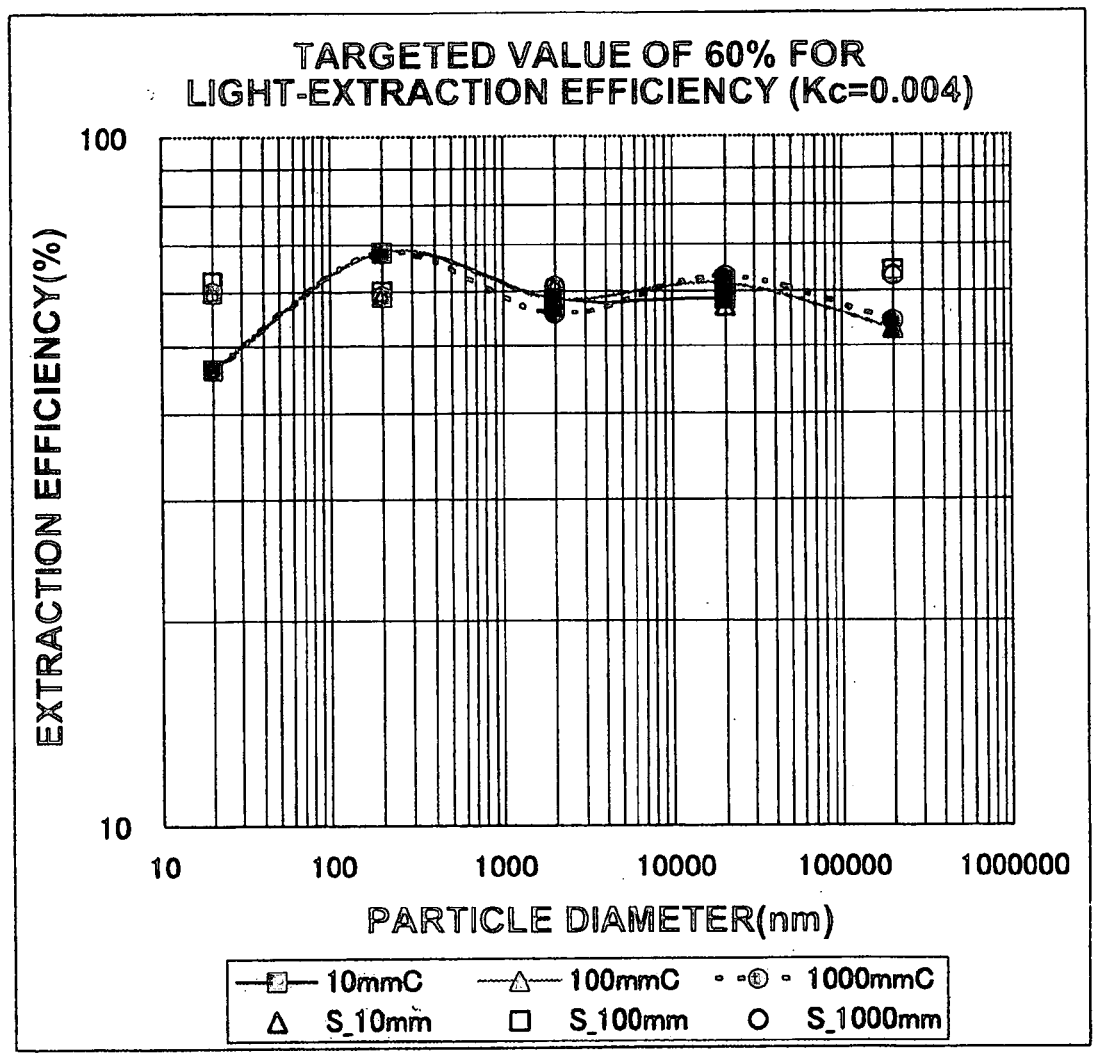
FIG. 7C is a graph comparing two results of the relationship between the diameter of the particle and light-extraction efficiency obtained by the method of the present invention and computer simulation (targeted value of light-extraction efficiency of 60%).
Figure 7D:
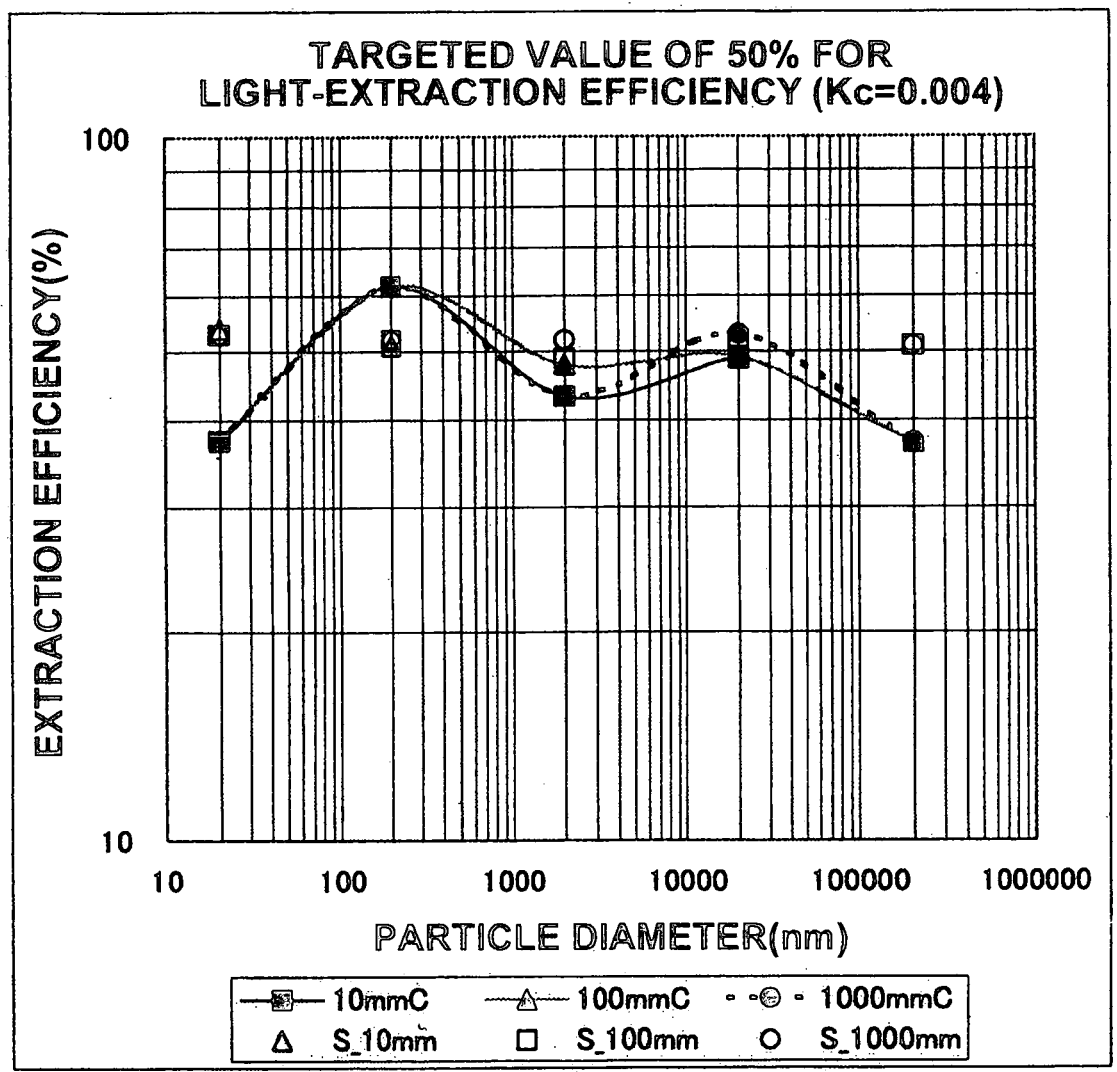
FIG. 7D is a graph comparing two results of the relationship between the diameter of the particle and light-extraction efficiency obtained by the method of the present invention and computer simulation (targeted value of light-extraction efficiency of 50%).
Figure 7E:
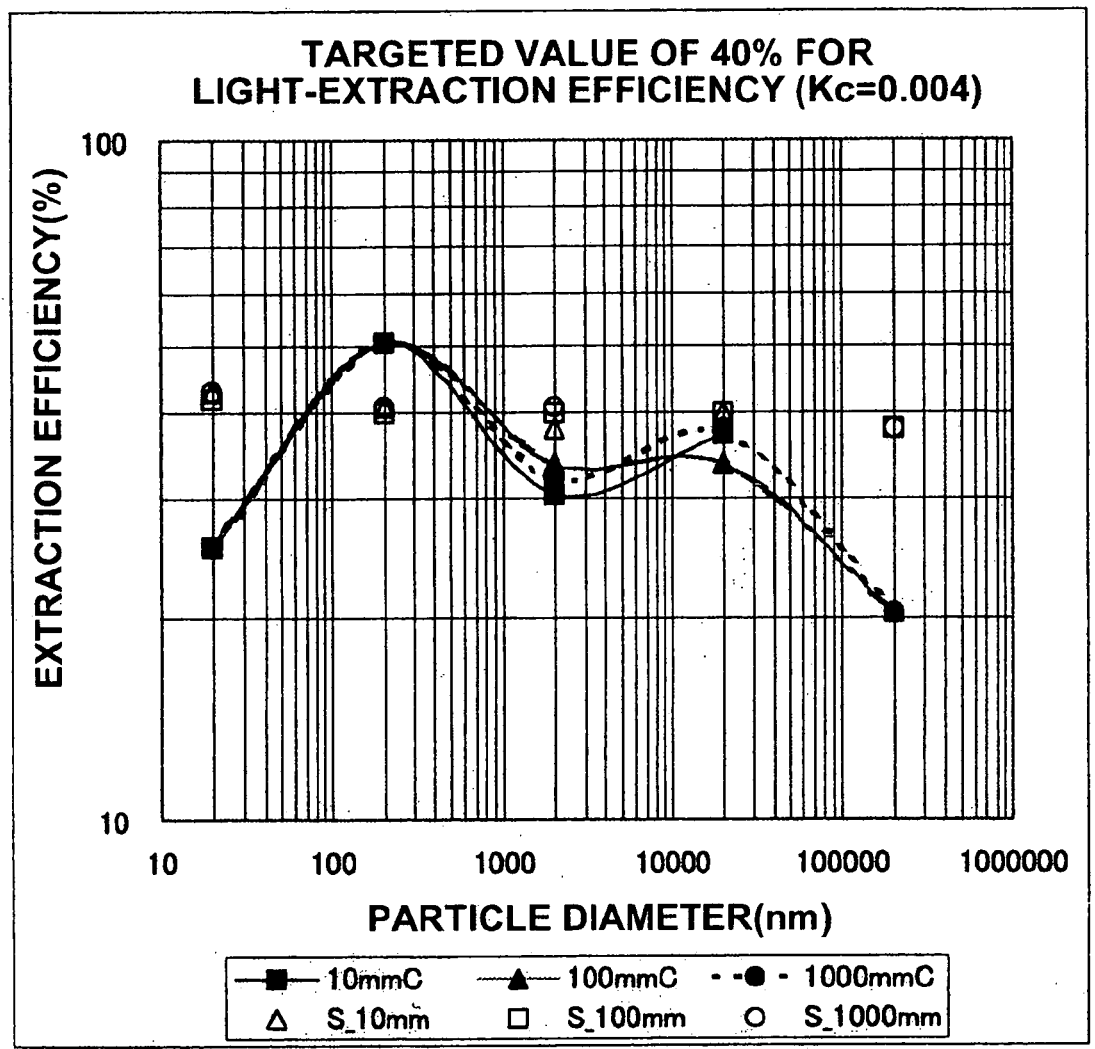
FIG. 7E is a graph comparing two results of the relationship between the diameter of the particle and light-extraction efficiency obtained by the method of the present invention and computer simulation (targeted value of light-extraction efficiency of 40%).
Figure 8A:
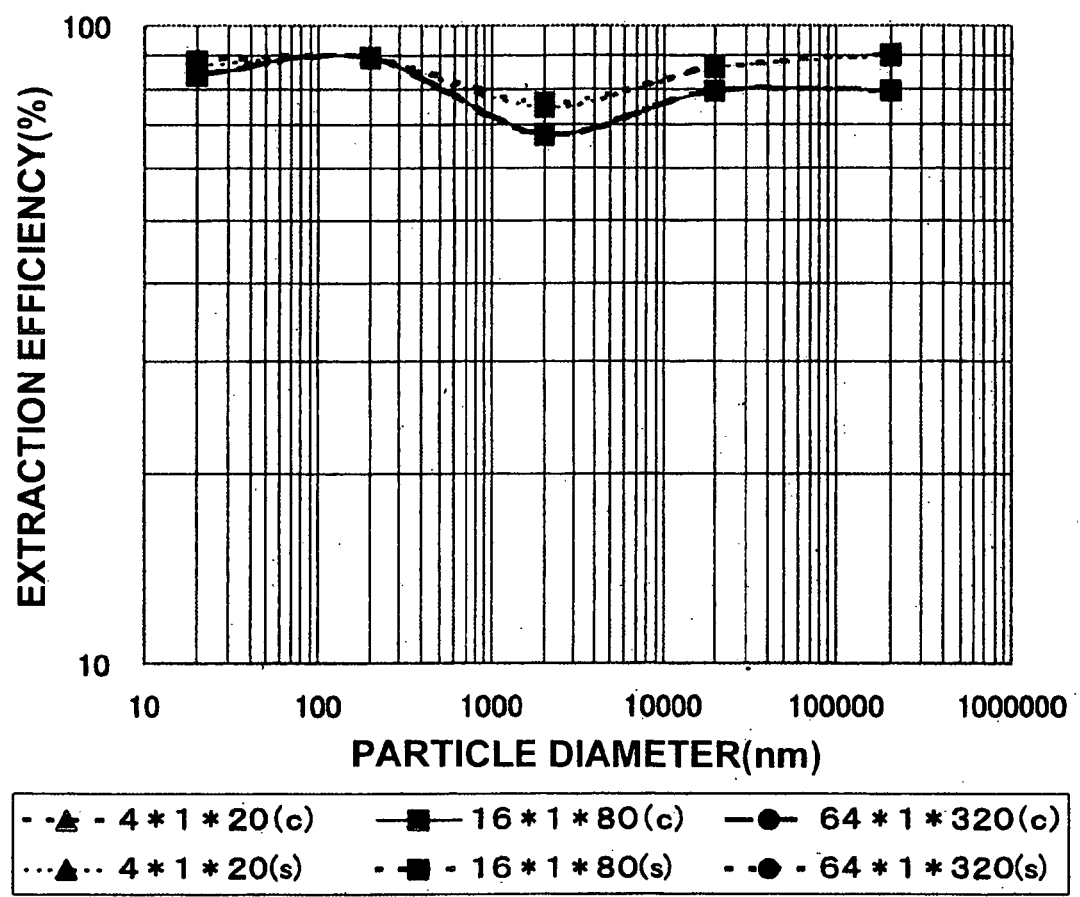
FIG. 8A is a graph comparing two results of the relationship between the diameter of the particle in a sheet-type optical conductor and the light-extraction efficiency obtained by the calculation and simulation (targeted value of light-extraction efficiency of 80%).
Figure 8B:
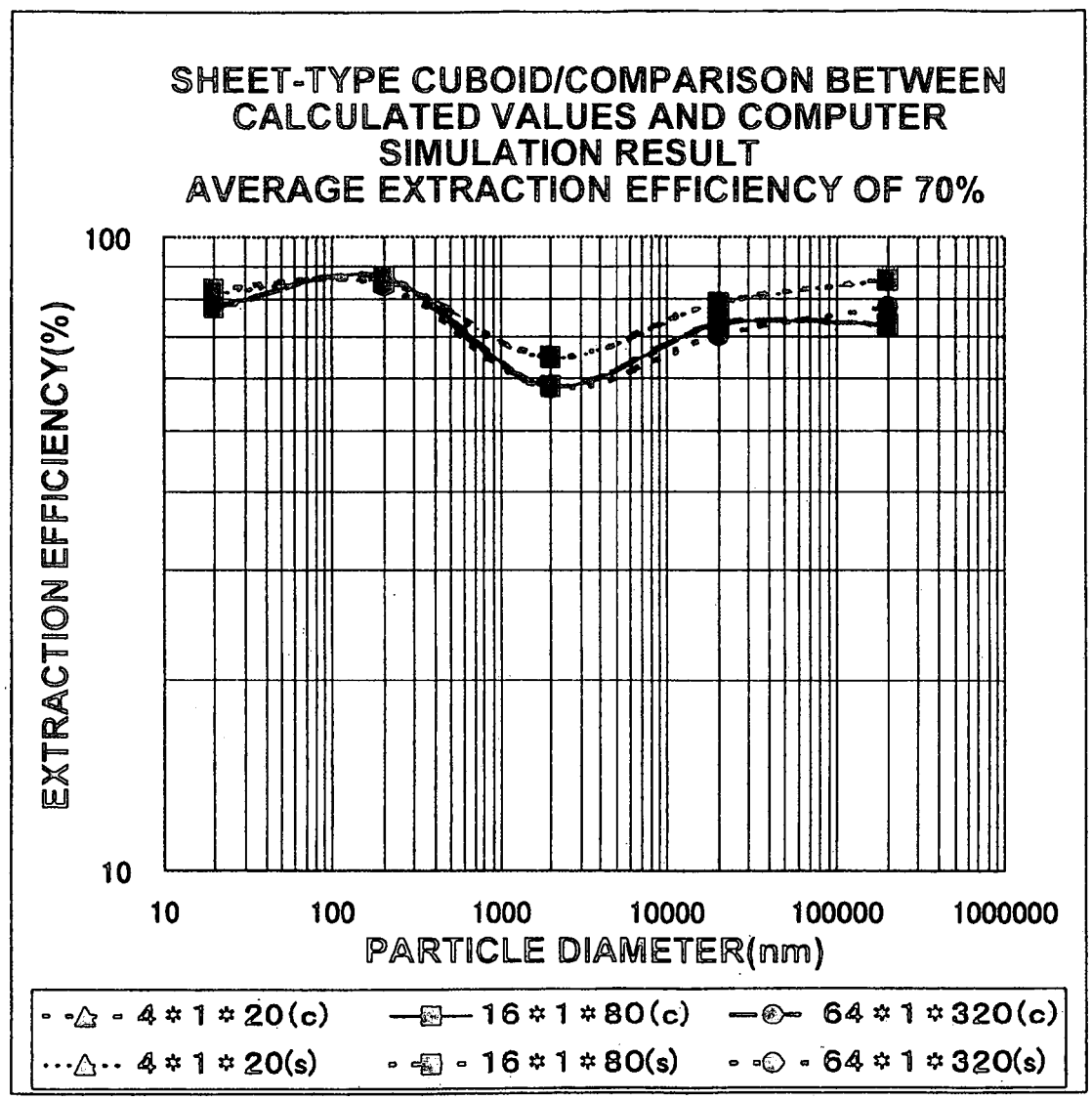
FIG. 8B is a graph comparing two results of the relationship between the diameter of the particle in a sheet-type optical conductor and the light-extraction efficiency obtained by the calculation and simulation (targeted value of light-extraction efficiency of 70%).
Figure 8C:
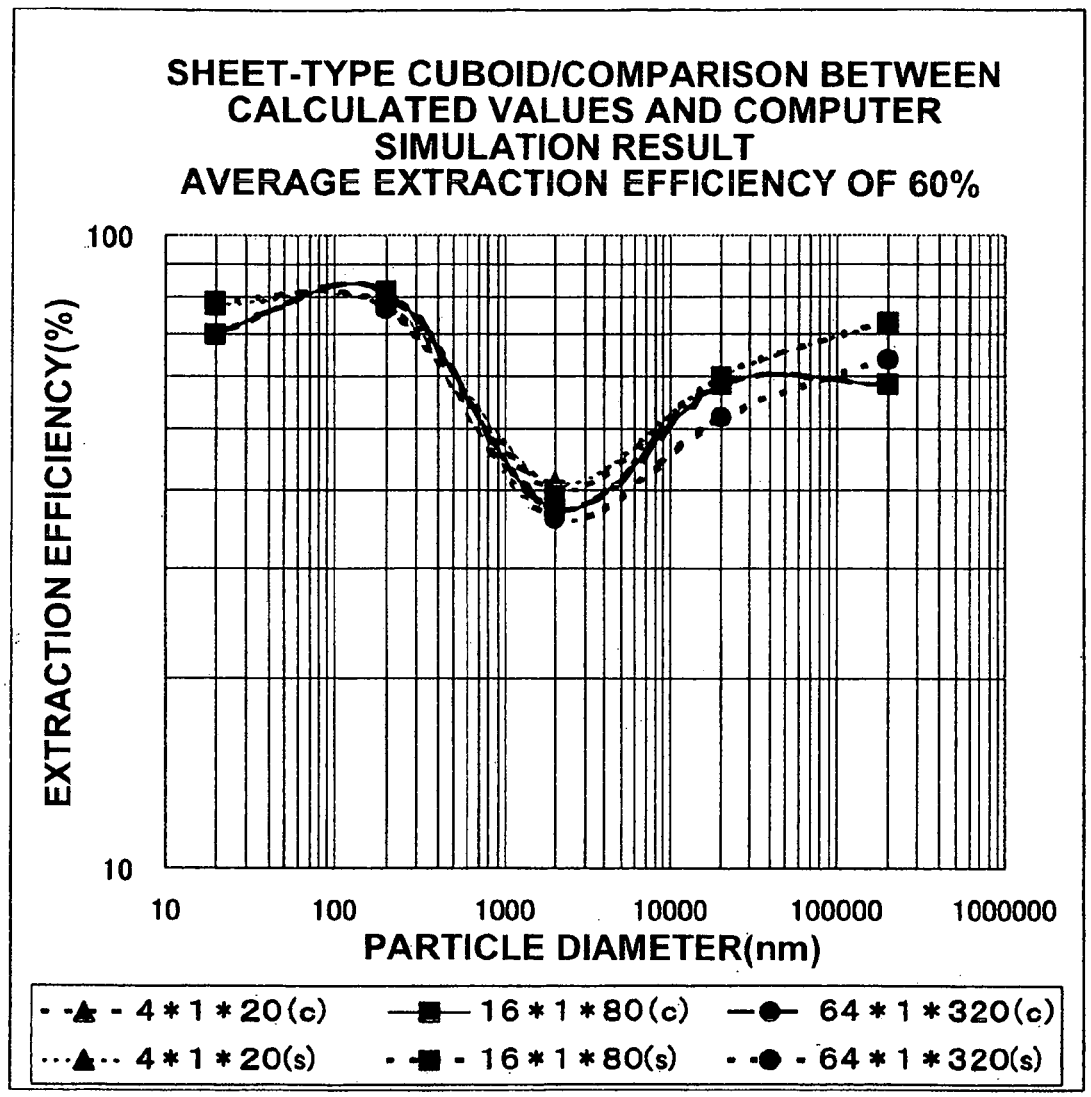
FIG. 8C is a graph comparing two results of the relationship between the diameter of the particle in a sheet-type optical conductor and the light-extraction efficiency obtained by the calculation and simulation (targeted value of light-extraction efficiency of 60%).
Figure 9A:
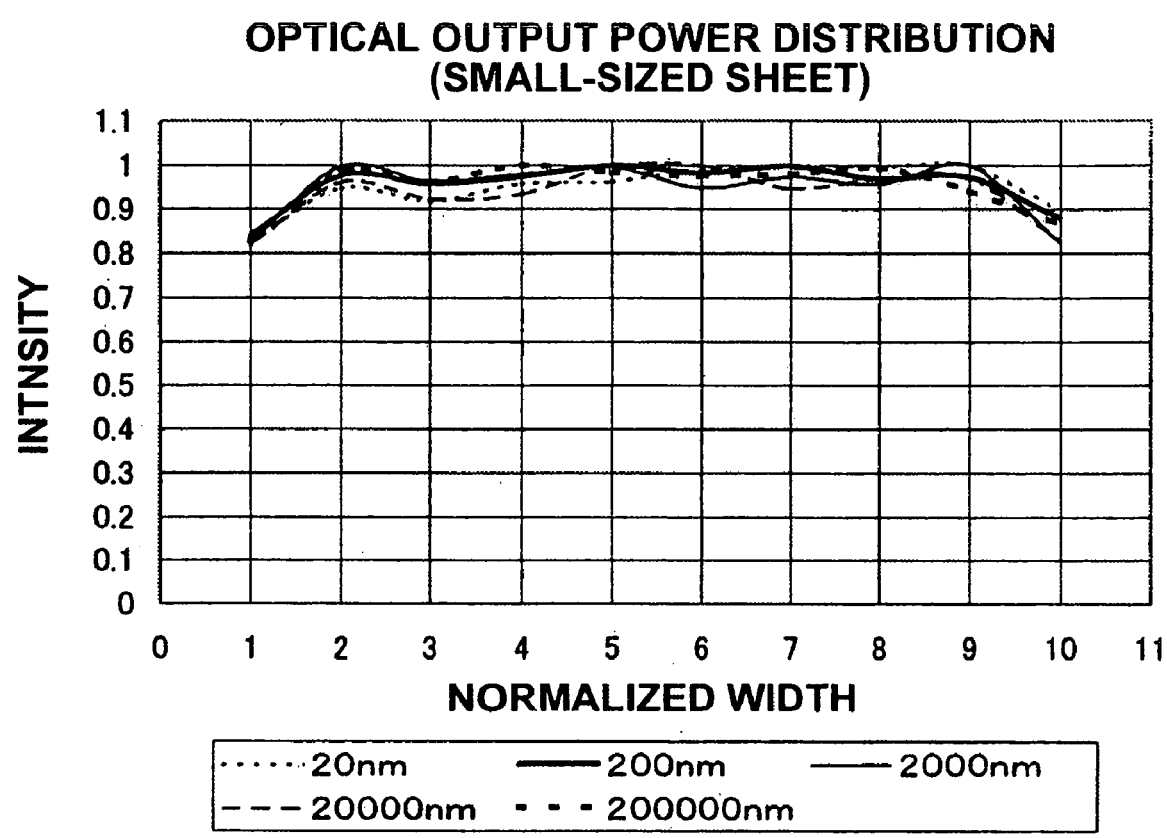
FIG. 9A is a graph showing an optical power distribution characteristic of the output light for a small-sized sheet-type optical conductor.
Figure 9B:
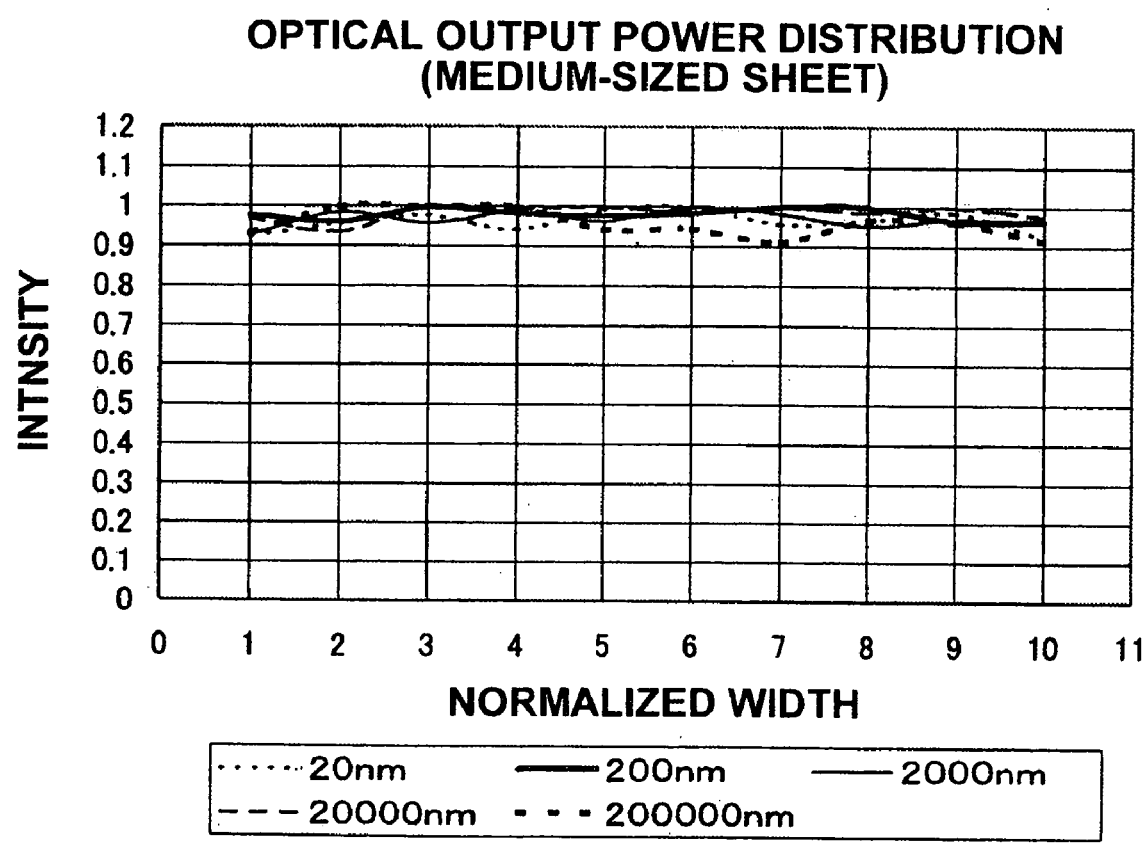
FIG. 9B is a graph showing an optical power distribution characteristic of the output light for a medium-sized sheet-type optical conductor.
Figure 9C:
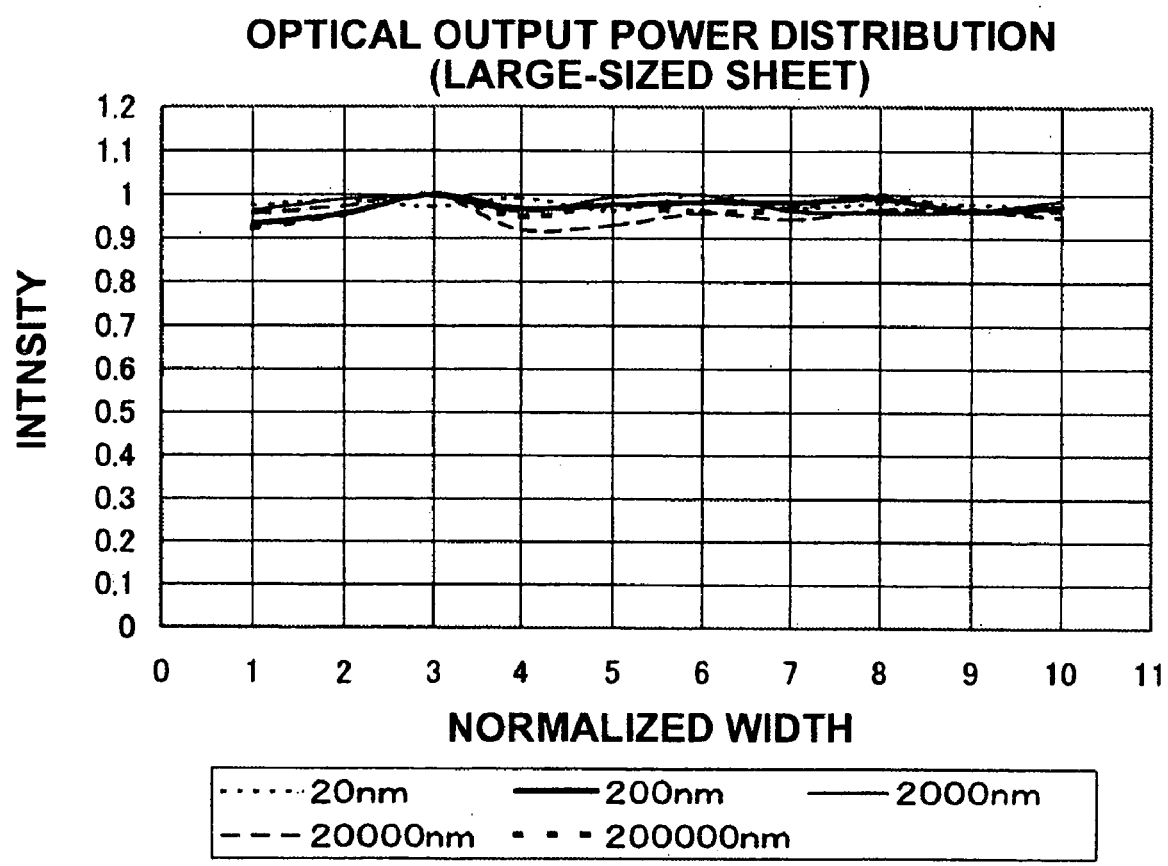
FIG. 9C is a graph showing an optical power distribution characteristic of the output light for a large-sized sheet-type optical conductor.
Figure 10:
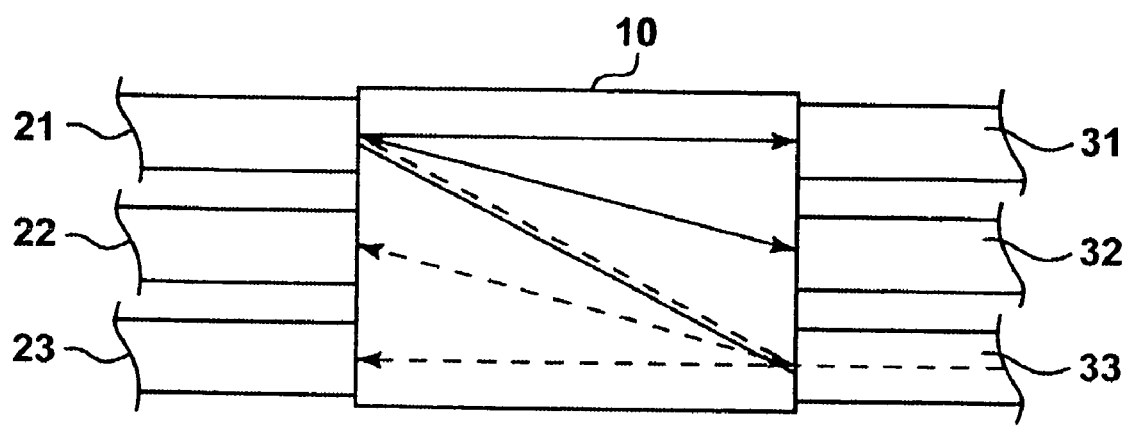
FIG. 10 is a plan view illustrating an overview of a sheet-type optical conductor.
Figure 11:
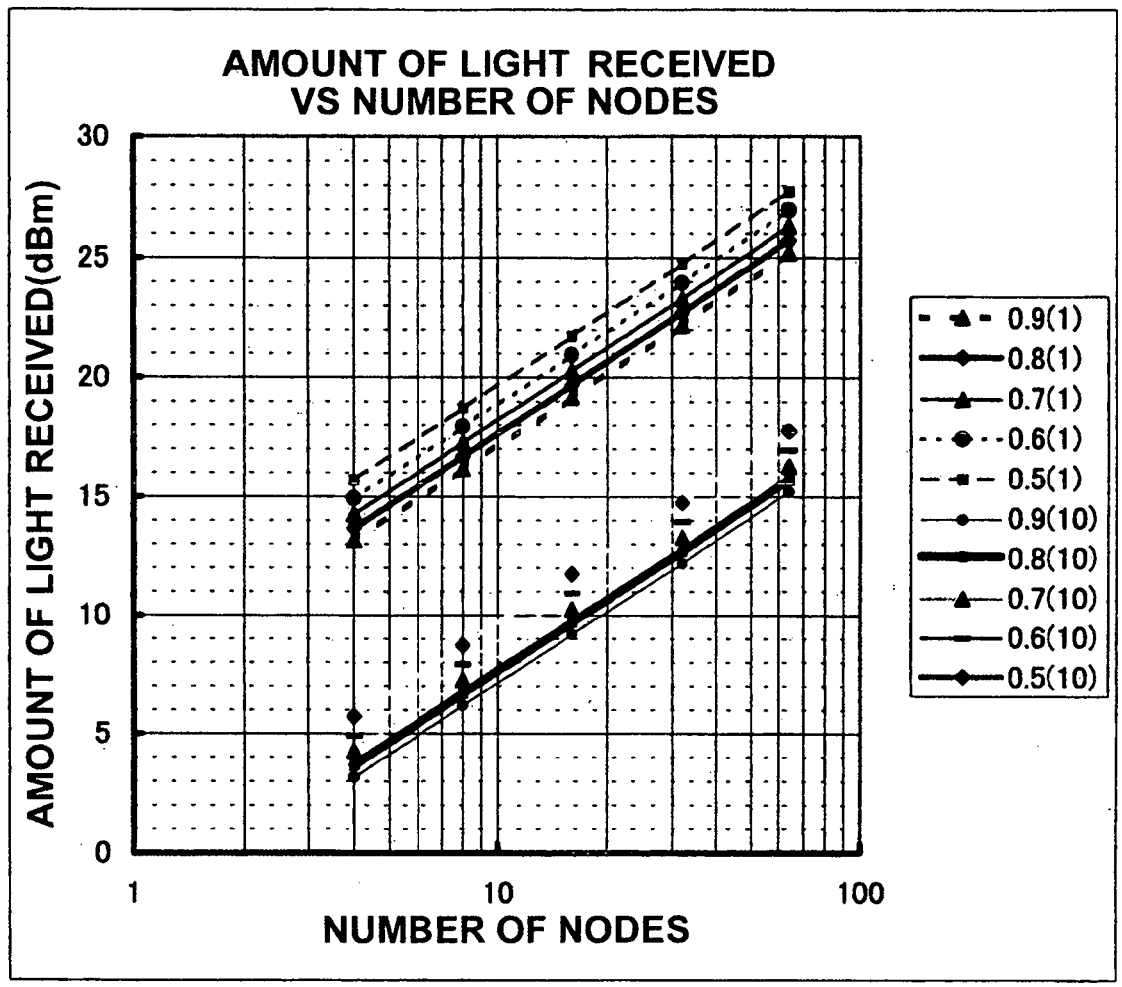
FIG. 11 is a graph showing an example of the relationship between the optical power received and the number of nodes for a communication system using a sheet-type optical conductor.
Figure 13A:
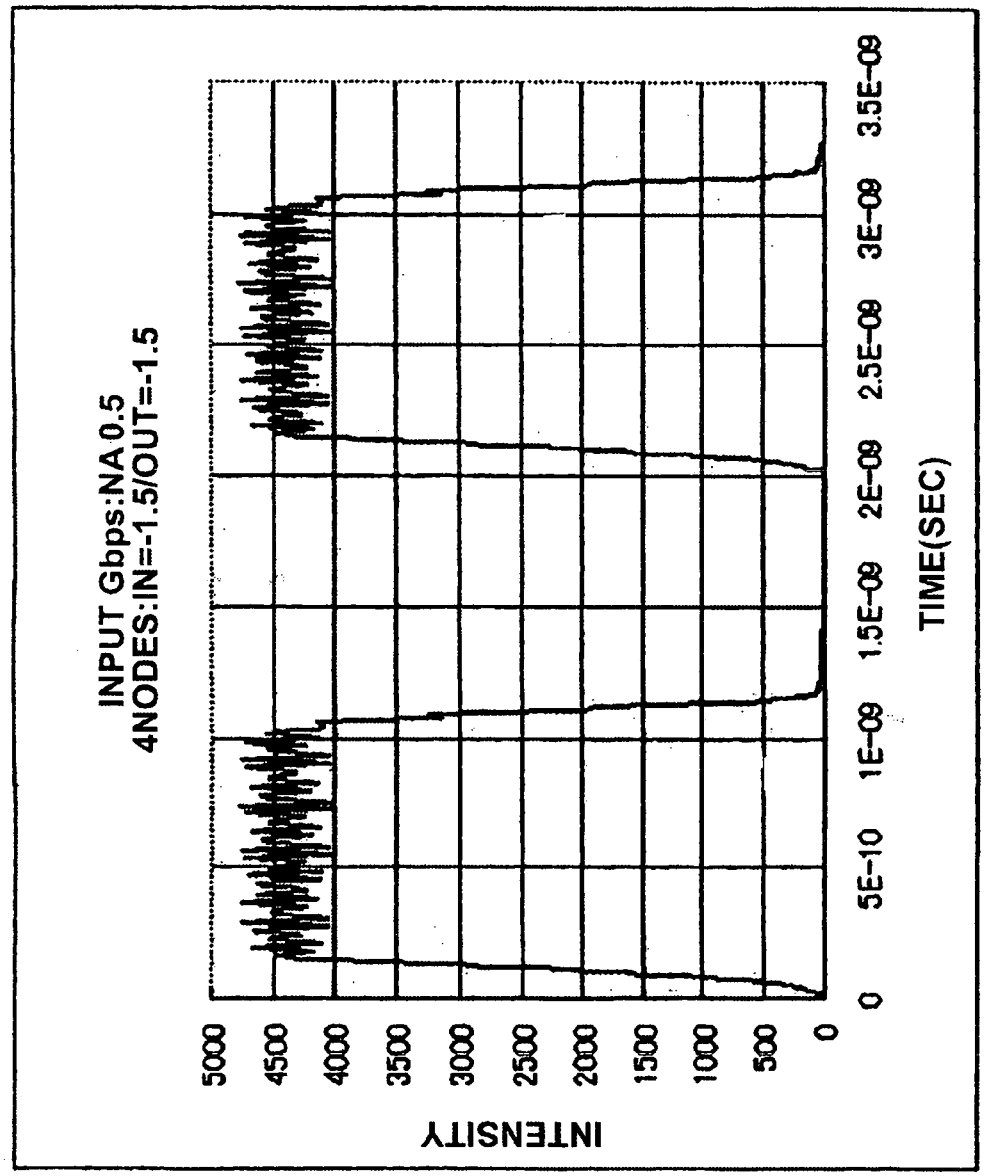
FIG. 13A is a graph showing an example of a waveform distortion of an optical signal in a communication system using a sheet-type optical conductor having 4 nodes.
Figure 13B:
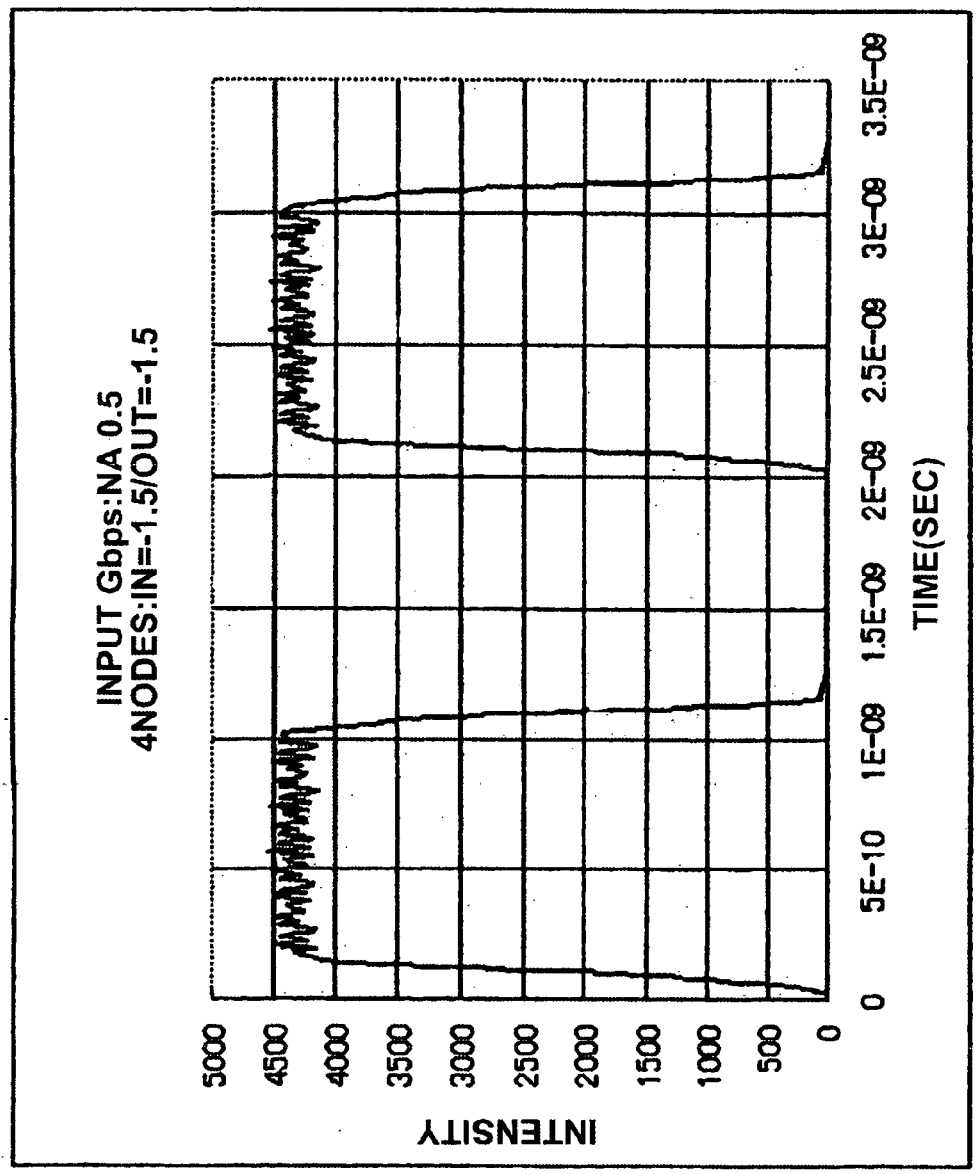
FIG. 13B is a graph showing another example of a waveform distortion of an optical signal in a communication system using a sheet-type optical conductor having 4 nodes.
Figure 14A:
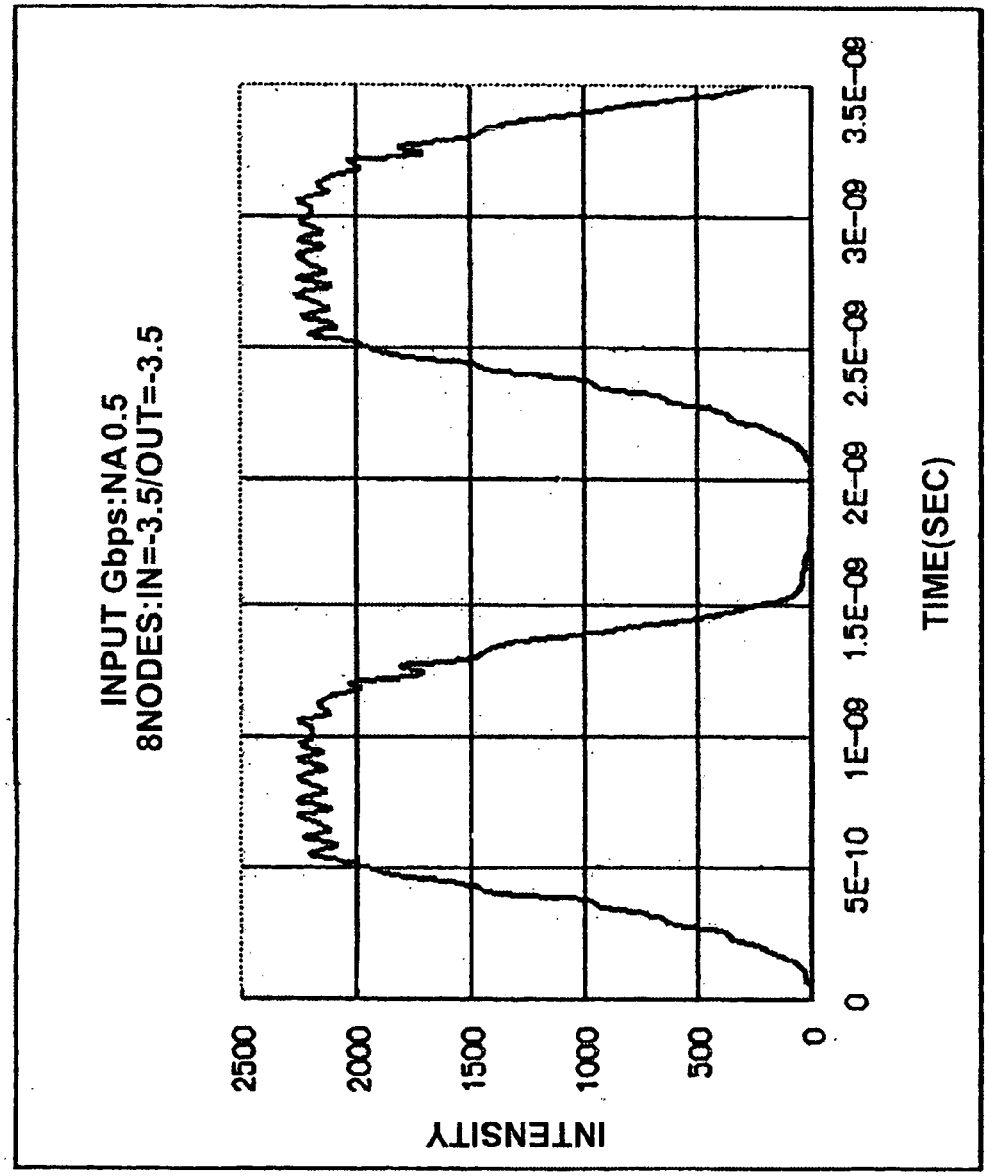
FIG. 14A is a graph showing an example of a waveform distortion of an optical signal in a communication system using a sheet-type optical conductor having 8 nodes.
Figure 14B:
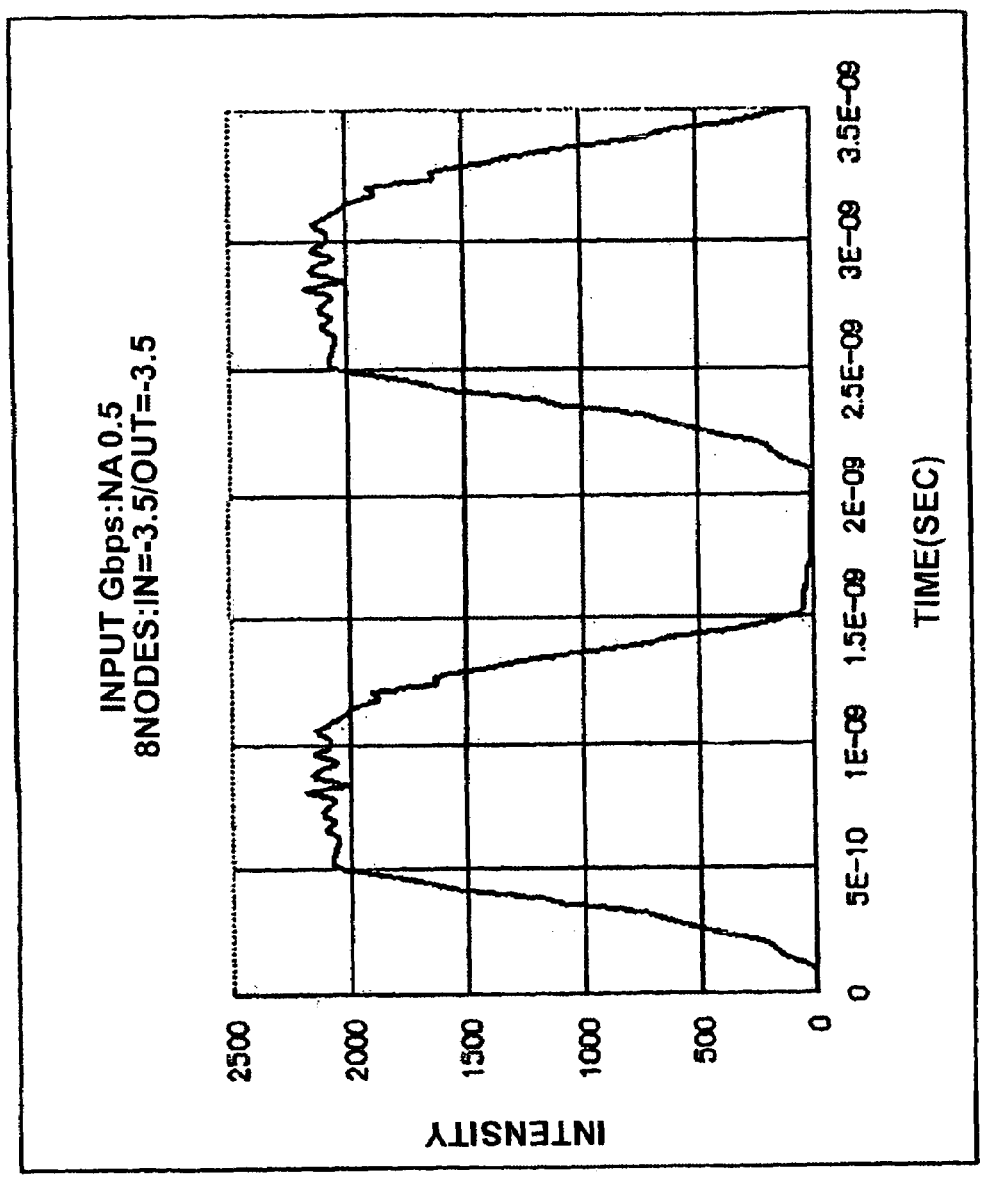
FIG. 14B is a graph showing another example of a waveform distortion of an optical signal in a communication system using a sheet-type optical conductor having 8 nodes.
Figure 15A:
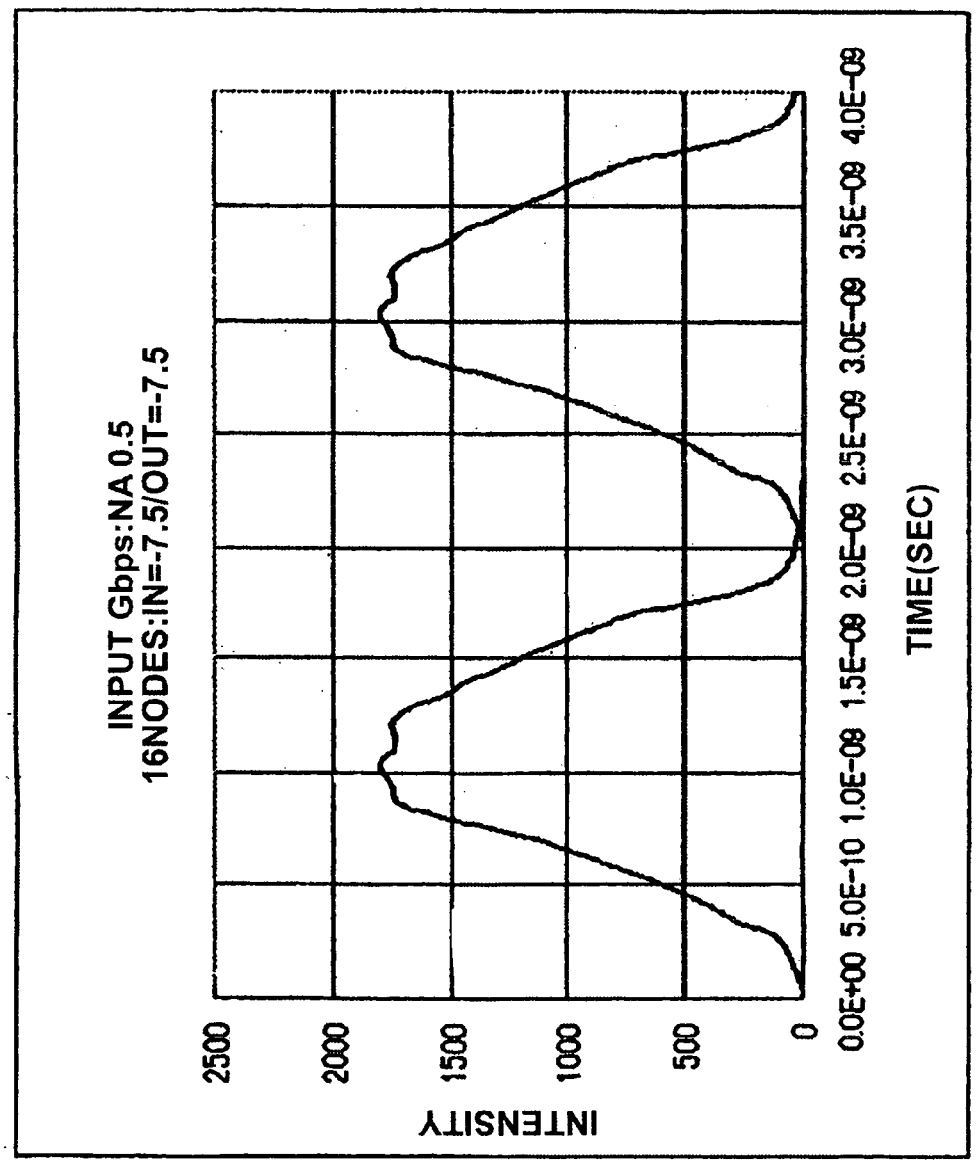
FIG. 15A is a graph showing an example of a waveform distortion of an optical signal in a communication system using a sheet-type optical conductor having 16 nodes.
Figure 15B:
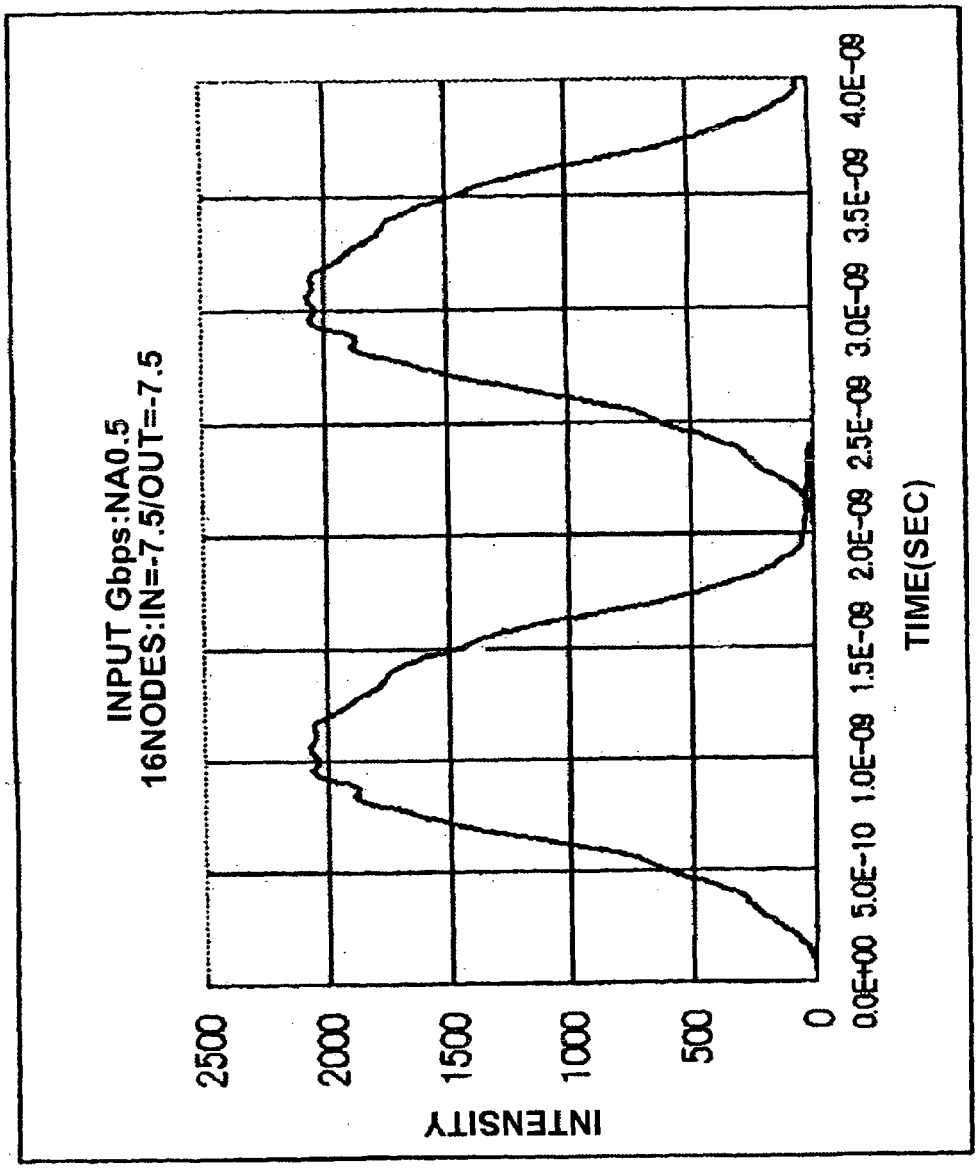
FIG. 15B is a graph showing another example of a waveform distortion of an optical signal in a communication system using a sheet-type optical conductor having 16 nodes.
Figure 16:
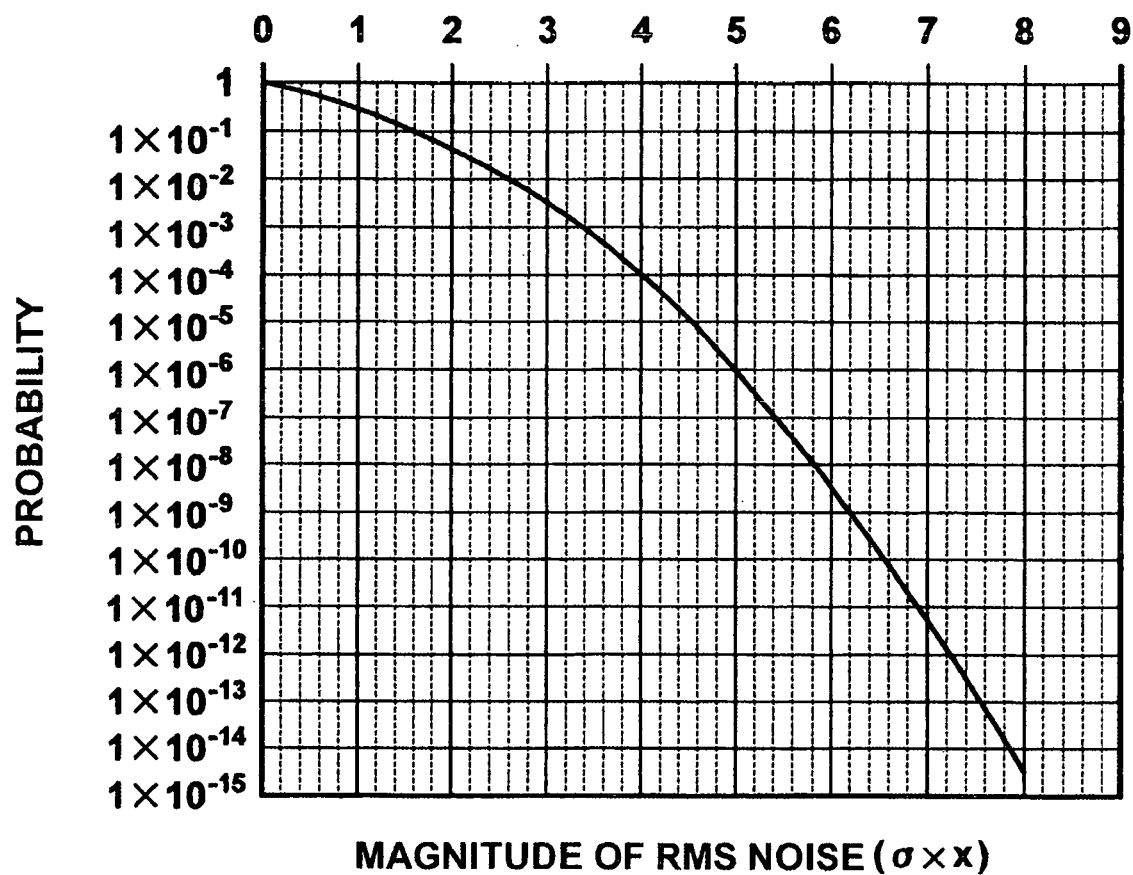
FIG. 16 is a graph showing the relationship between the magnitude and probability of rms (root mean square) noise.
Figure 17:
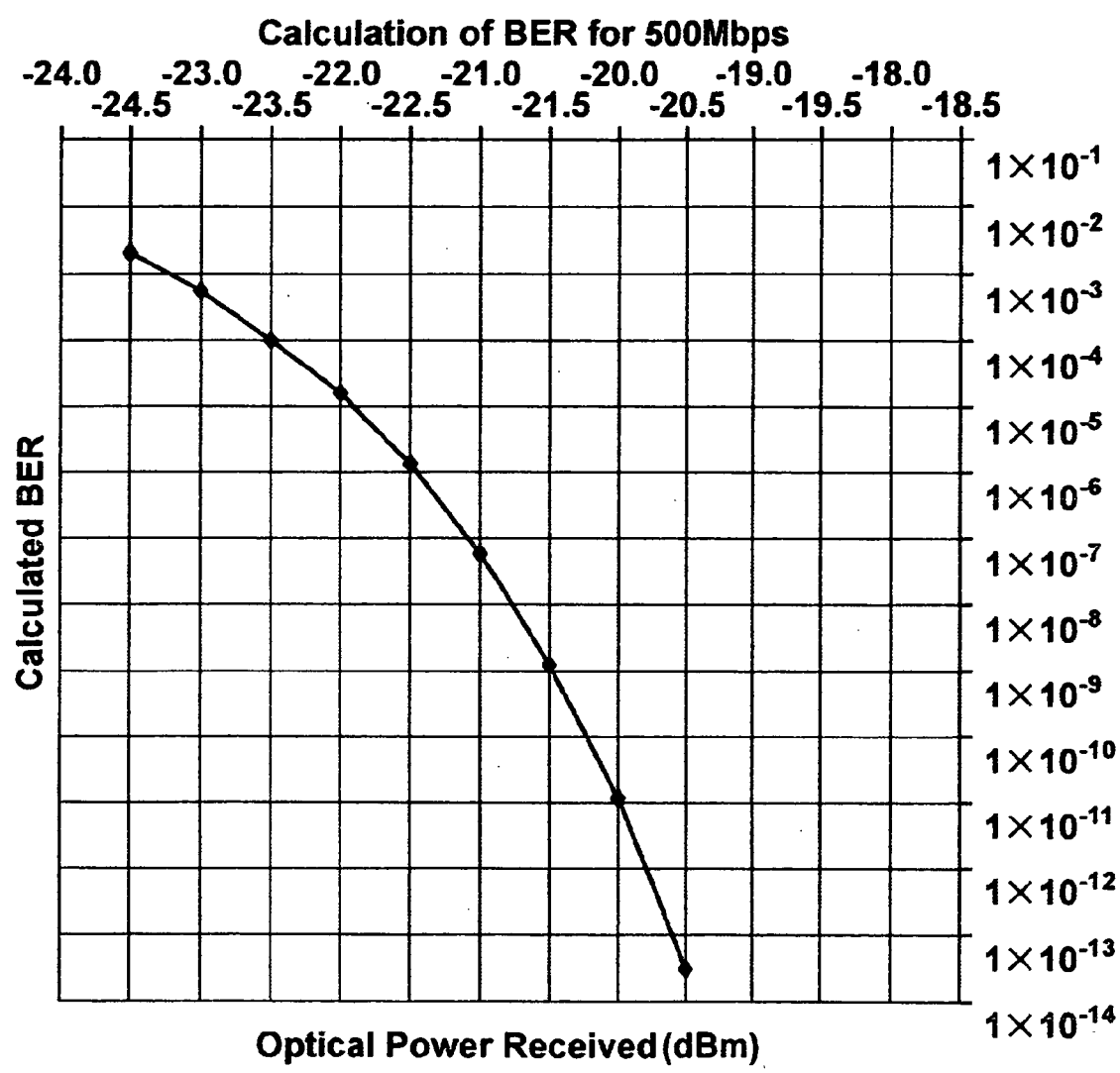
FIG. 17 is a graph showing the relationship between the BER (Bit-Error-Rate) and optical power received.
Figure 18:
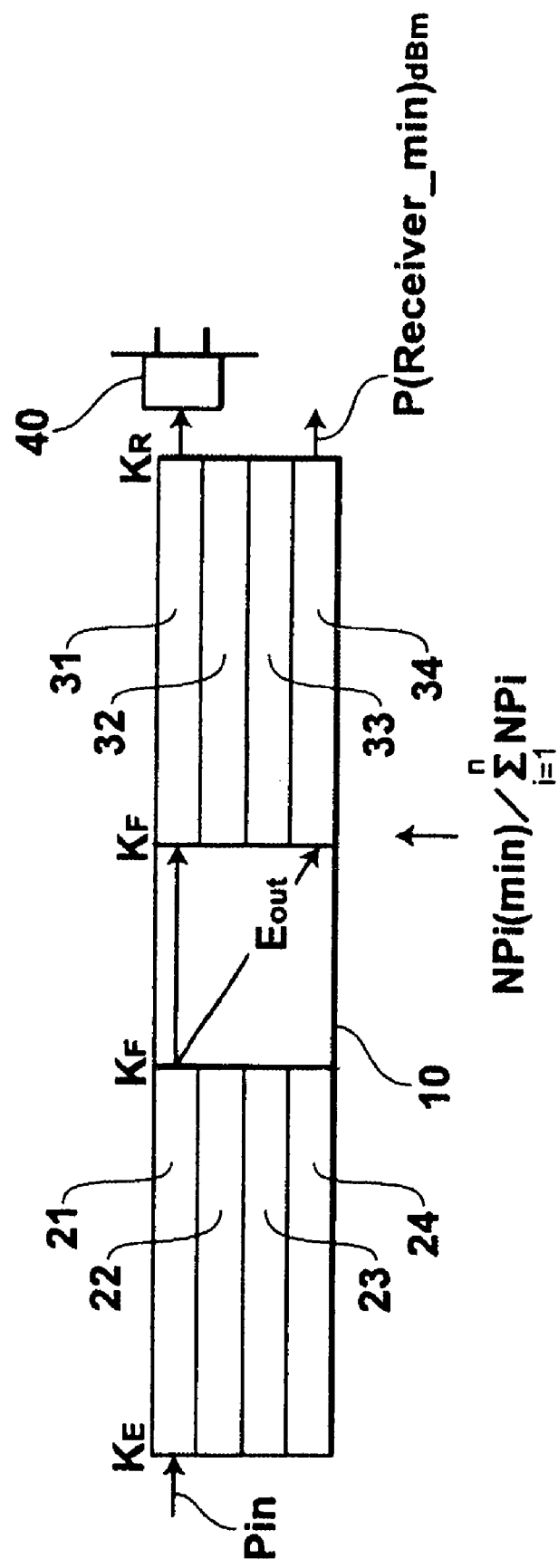
FIG. 18 is a plan view illustrating a communication system according to an embodiment of the present invention.

FIG. 18 shows a plan view of a communication system using a sheet-type optical conductor according to an embodiment of the present invention. As shown in the figure, the system is a 4-node system, comprising a single sheet-type optical conductor 10 with 4 optical fibers 21, 22, 23, and 24 being connected to one edge of the conductor, and 4 optical fibers 31, 32, 33, and 34 being connected to the other edge as an example. The sheet-type optical conductor has a thickness of 1 mm, width of 4 mm, and length of 30 mm.

Here, in this embodiment, the acceptable bit-error-rate BER(accept) is defined as $1\times10^{-11}$, which is generally regarded as the lower limit of error-free transmission, and the value of light-extraction efficiency Eout of the sheet-type optical conductor 10 is assumed to be 0.9. In this case, when the diameter of the particle is 7 μm, the particle density $Np=0.93\times10^{-4}$ (particles/mm$^3$) which is obtained by Formula (14) described above. That is, if these values are selected for the diameter of the particle and the particle density, Formula (14) is satisfied.

The signal-to-noise ratio (S/N) of the system will be calculated. According to the simulation based on Formula (28) described above, the minimum optical power P(Receiver_min)$_{dBm}$ received by an optical receiver 40 is 10.5 (dBm), where Pin=1.0 mW, Eout=0.9, and NPi(min)/ΣNPi≈0.15.

Further, it is assumed that Formulae (28) and (29) are satisfied by any of the nodes having a minimum optical power P(Receiver_min) dBm. Here, it has been known from the empirical fact and tolerance analysis that each of the coupling losses between the light-emitting device and optical fiber $K^E$, between the optical fiber and sheet-type optical conductor $K^F$, and between the optical fiber and optical receiver $K^R$ in Formula (29) is approximately 1 dB.

The internal loss of the optical fiber $K_{FI}$ will be calculated. Here, it is assumed that a plastic optical fiber with a core of PMMA, and having a propagation loss in the range approximately from 0.15 to 0.2 dB/m is used. When interconnections within the apparatus in which the communication system is placed is taken into account, which is assumed to amount to around 10 m of fiber in total for both sides of the sheet-type optical conductor 10, the internal loss of the optical fiber $K_{FI}$ amounts to up to around 2 dB. When this internal loss $K_{FI}$ and other coupling losses are substituted in Formula (29), the minimum optical power PRmin required for the optical receiver is, PRmin=15.5 (dBm), which is equal to 0.028 (mW).

Thus, the signal current Sc when the bandwidth is assumed to be 500 MHz (which needs to take no account of the waveform distortion) is calculated by Formula (33) described above as: Sc=$8.01\times10^{-6}$ (A). While, the noise component Noise (System_rms) is calculated by Formulae (31a) and (31b) as, Noise(System_rms)=$5.28\times10^{-7}$ (A). Hence, the signal-to-noise ratio (S/N) in this case is 15.2.

When the result obtained is substituted to Formula (37), with the assumption that V(Thresh)=S(PRmin)v/2, the result is 15.2/2=7.6. Therefore, if the probability of noise having an amplitude of Noise (System_rms)·7.6 is smaller than the desired BER, the condition of Formula (36) described above is satisfied. In this case, the probability of Noise(System_rms)·Q is $4\times10^{-15}$. Since the acceptable bit-error-rate BER (accept) is defined as, BER(accept)=$1\times10^{-11}$, the condition of Formula (36) is satisfied.

Hereinafter, a communication system using the sheet-type optical conductor according to another embodiment of the present invention will be described with reference to FIGS. 19A and 19B. FIG. 19A is a partially broken side view of a sheet-conductor 50 used in the embodiment, and FIG. 19B is a cross sectional elevational view of the sheet-type optical conductor taken along the line A1—A1 of FIG. 19A illustrating the profile thereof. The sheet-type optical conductor 50 has an optical conductor body 51 formed of a sheet-type optical medium containing particles for scattering light, as is the case with the sheet-type optical conductor 10 shown in FIG. 18. In addition, the optical conductor body 51 has a cladding layer 52 covering the whole surface (other than the input/output edges) of the body, and a protective layer 53 covering over the cladding layer.

The sheet-type optical conductor body 51 is formed of PMMA shaped in a sheet containing particles for scattering light, and propagates the light injected from one input/output edge 51a to the other input/output edge 51a by scattering it by means of the particles. Specifically, the cladding layer 52 is formed by applying or depositing a material, such as UV-cure resin, silicon resin, or the like having a smaller index of refraction than that of PMMA on the surface of the optical conductor body 51. The difference in the index of refraction between the cladding layer 52 and the sheet-type optical conductor body 51 is such that the conditions of the total reflection of the optical signal SL is satisfied for the maximum angle in the angle of incidence θm of the optical signal SL on the sheet-type optical conductor body 51.

The sheet-type optical conductor body 51 has two optical transmitter/receiver units 54 attached to the respective input/output edges 51a. Each of the transmitter/receiver units 54 has three optical receivers 55 and one optical transmitter 56 optically coupled thereto through direct coupling. That is, the communication system according to this embodiment is a four-node system. The optical transmitter/receiver unit 54 may be coupled to the input/output edge through optical fibers, instead of being coupled thereto directly as described above.

In this preferred embodiment, for example, the optically modulated signal SL is transmitted from the optical transmitter 56 of the optical transmitter/receiver unit 54 located on the left side of the sheet-type optical conductor body 51 in FIG. 19A, propagated through the optical conductor body 51, and received by the three optical receivers 55 of the optical transmitter/receiver unit 54 located on the right side thereof. Conversely, the optical signal SL may also be transmitted from the transmitter/receiver unit 54 on the right side of the optical conductor body 51 to the transmitter/receiver unit 54 located on the left side thereof in FIG. 19A, thereby two-way communication may be realized.

In this preferred embodiment, the communication system uses an optical conductor having a protective layer 53 that covers the whole surface of the optical conductor body 51 as the sheet-type optical conductor 50, so that the optical conductor body 51 may be protected from destruction or damage caused by external shocks and pressures, resulting in an increased reliability of the communication system.

In addition, the sheet-type optical conductor 50 has a cladding layer 52 of a low index of refraction between the protective layer 53 and optical conductor body 51, so that most of the optical components of the optical signal SL reached the surface of the conductor body 51 are totally reflected at the interface between the surface of the optical conductor body 51 and cladding layer 52. Therefore, the optical signal SL is prevented from being absorbed in the protective layer 53 and the communication system according to this embodiment may ensure high optical transmission efficiency.

Further, the difference in the index of refraction between the cladding layer 52 and optical conductor body 51 is such that the conditions of the total reflection of the optical signal SL are satisfied for the maximum angle in the angle of incidence θm of the optical signal SL on the optical conductor body 51, so that even if the sheet-type optical conductor 50 is bent to a certain degree, high optical transmission efficiency corresponding to that obtained when the optical conductor 50 is kept flat may be ensured. Thus, the communication system according to this embodiment may widely be applied to replace, for example, communication systems using flexible substrates or flat cables which have conventionally been used for the internal wiring of a machine where only a small space is available.

Further, the communication system according to this embodiment is not only capable of just replacing the conventional communication systems but also has a high tolerance to electromagnetic noise since it provides communication by way of an optical signal. At the same time, it may be manufactured at a lower price compared with the system that provides communication by way of an optical signal using optical fibers.

FIG. 20A is a partially broken side view of still, another sheet-type optical conductor 60 used for the communication system of the present invention, and FIG. 20B shows a cross sectional elevational view of the optical conductor taken along the line A2—A2 of FIG. 20A illustrating the profile thereof. In FIGS. 20A and 20B, elements identical to those shown in FIGS. 19A and 19B are given the same numerical symbols and will not be elaborated upon further here (the same applies hereinafter).

The sheet-type optical conductor 60 shown in the Figures differs from the sheet-type optical conductor 50 in FIGS. 19A and 19B in that it is not provided with the protective layer 53. The reliability of the communication system using the sheet-type optical conductor 60 formed without the protective layer 52 may still be increased, because the cladding layer 52 may also serve as the protective layer covering the optical conductor body 51, and it may be protected from destruction or damage caused by external shocks and pressures.

FIG. 21A is a partially broken side view of still another sheet-type optical conductor 70 used for the communication system of the present invention, and FIG. 21B shows a cross sectional elevational view of the optical conductor taken along the line A3—A3 of FIG. 21A illustrating the profile thereof. The sheet-type optical conductor 70 shown in the Figures differs from the sheet-type optical conductor 50 in FIGS. 19A and 19B in that it is not provided with the cladding-layer 52. The reliability of the communication system using the sheet-type optical conductor 70 may still be increased, because the optical conductor body 51 may be protected from destruction or damage caused by external shocks and pressures by the protective layer 53 covering the conductor body 51. Here, the optical signal propagating through the sheet-type optical conductor 70 may be prevented from being absorbed in the protective layer 53 by forming it with a light reflective material.

Figure 22A:
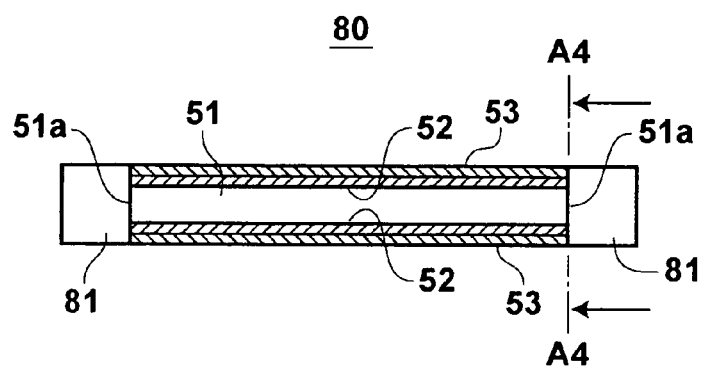
FIG. 22A is a partially broken side view of a sheet-type optical conductor illustrating still another example of the sheet-type optical conductor used for the communication system of the present invention.
Figure 22B:
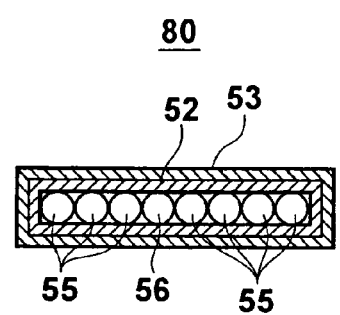
FIG. 22B is a sectional elevational view of a sheet-type optical conductor illustrating still another example of the sheet-type optical conductor used for the communication system of the present invention.

FIG. 22A is a partially broken side view of still another sheet-type optical conductor 80 used for the communication system of the present invention, and FIG. 22B shows a cross sectional elevational view of the optical conductor taken along the line A4—A4 of FIG. 22A illustrating the profile thereof. The sheet-type optical conductor 80 shown in the Figures differs in the number of nodes from the sheet-type optical conductor 50 in FIGS. 19A and 19B. That is, in this example, each of the transmitter/receiver units has seven optical receivers 55 and one optical transmitter 56, forming an eight-node communication system. Since the sheet-type optical conductor 80 has the cladding and protective layers, the use of the optical conductor 80 provides the identical effects to those obtained by the sheet-type optical conductor 50 shown in FIGS. 19A and 19B.

Hereinafter, a two-way communication system according to another embodiment of the present invention will be described with reference to FIG. 23. In this preferred embodiment, a sheet-type optical conductor 10 having basically the same configuration as that shown in FIG. 18 is used. Each of the input/output edges of the sheet-type optical conductor 10 has three optical receivers 55 and one transmitter 56 optically coupled thereto through direct coupling. That is, in this preferred embodiment, a four-node communication system capable of providing two-way communication is also constructed.

A demultiplexer 84 is connected to each of the optical receiver 55. As for the optical transmitter 56, for example, a semiconductor laser capable of providing a high-speed direct modulation is used, and the optical transmitter 56 is driven by an LD driver 83. The operation of the LD driver 83 and the demultiplexer described above is controlled by a controller 85.

Hereinafter, the operation of the communication system of this embodiment will be described when an optical signal is transmitted from the left to right in FIG. 23 as an example. A signal SQ that carries information of four channels created by time-division multiplexing is inputted to the controller 85. Based on the inputted signal SQ, the controller controls the operation of the LD driver 83 to drive the semiconductor laser comprising the optical transmitter 56 for direct modulation. The optical signal that carries information of four channels transmitted from the optical transmitter 56 is propagated through the sheet-type optical conductor 10, and received by the three optical receivers 55 on the right in FIG. 23. The electrical signal obtained through the opto-electrical conversion and outputted from each of the optical receivers 55 is inputted to each of the demultiplexers 84. Each of the demultiplexers 84 separates the electrical signals of four channels serially inputted therein into individual signals to output them to respective systems.

Thus, in this embodiment, each of the signals of four channels is outputted in parallel to three different systems. Implementation of this signal separation by the sheet-type optical conductor 10 alone requires 13 nodes in total, including one node for optical signal transmission. The increase in the number of nodes of the sheet-type optical conductor 10 may degrade the S/N of the transmitted signal. Employment of the demultiplexer 84 for electrically separating the signals requires less number of nodes, thereby degradation in the S/N of the transmitted signal may be prevented.

The communication system using the demultiplexer described above may also employ the sheet-type optical conductor having the protective layer illustrated in FIGS. 19 to 22.

Hereinafter, a communication system according to still another embodiment of the present invention will be described with reference to FIG. 24. In this embodiment, a communication system is constructed using an optical conductor 88 having a bend section. The optical conductor 88 comprises two sheet-type optical conductors 10 having essentially the same configuration as that shown in FIG. 18, and a changed angle optical conductor 90 to which the two sheet-type optical conductors 10 are optically coupled. The changed angle optical conductor 90 has such a cross-section profile like the ¼ of a circular ring is cut out, and the angle between the two edges for coupling respective sheet-type optical conductors 10 is 90°. The changed angle optical conductor 90 is formed, for example, of injection molded PMMA, and maintains the shape described above unless significant external force is exerted.

Thus, the direction of the optical signal propagation transmitted from the optical transmitter/receiver unit 54 coupled to one of the sheet-type optical conductor 10 to the optical transmitter/receiver unit 10 coupled to the other optical conductor 10 is changed by 90° at the changed angle optical conductor 90.

When the communication system using the sheet-type optical conductor is used in various devices, it is often the case that the sheet-type optical conductor needs to be bent. Generally, the sheet-type optical conductor has a certain thickness and is not flexible enough, so that the bent installation of the sheet-type conductor within a device may sometimes be impossible especially when only a small space is available. This poses a significant problem in replacing a hard-wired communication system in a device with the communication system using the sheet-type optical conductor.

The communication system using the optical conductor 88 described above, however, is readily applied to a small space within a device by providing the changed angle optical conductor 90 to bend the optical path even though the sheet-type optical conductor 10 is difficult to be bent to such an extent. Thus, the communication system according to this embodiment may be widely applied to replace, for example, communication systems using flexible substrates or flat cables which have conventionally been used for the internal wiring of a machine where only a small space is available. Further, this communication system is not only capable of just replacing the conventional communication systems but also has a high tolerance to electromagnetic noise since it provides communication by way of an optical signal. At the same time, it may be manufactured at a lower price compared with the system that provides communication by way of an optical signal using optical fibers.

The changed angle optical conductor 90 is not necessary be formed of the same material as that of the sheet-type optical conductor 10; and it may be formed of different materials. The changed angle optical conductor 90 may be formed integrally with the sheet-type optical conductors 10 from the beginning by the injection molding or the like, in addition to be separately formed and coupled to the sheet-type optical conductors 10 at a later time. Further, the changed angle optical conductor may or may not contain particles for scattering light, but it is of course desirable that the particles be contained therein from the standpoint of uniform power distribution of the output light.

Figure 25:
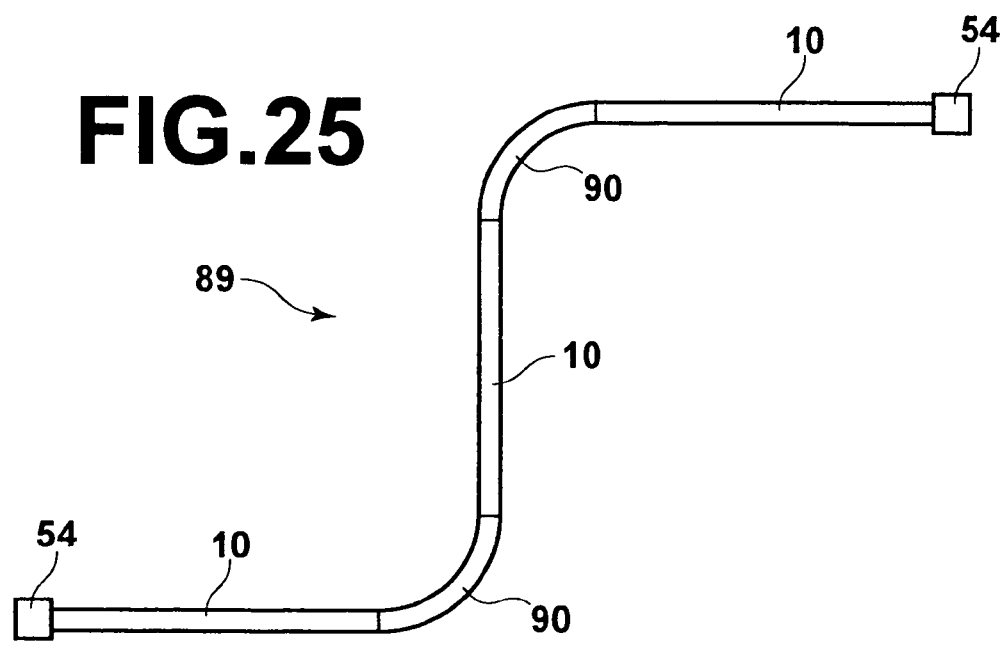
FIG. 25 is a side view of an optical conductor illustrating another example of the optical conductor comprising a changed angle optical conductor.

Still further, a plurality of changed angle optical conductors 90 may be used to construct a more complicated optical conductor 89 having a plurality of bend sections shown in FIG. 25.

Figure 26A:
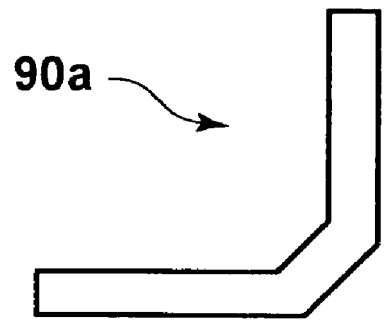
FIG. 26A is a side view of an optical conductor illustrating still another example of the optical conductor comprising a changed angle optical conductor.
Figure 26B:
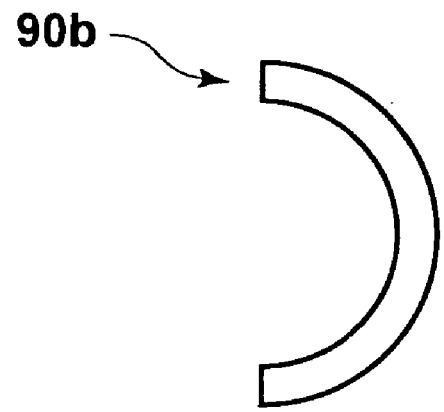
FIG. 26B is a side view of an optical conductor illustrating still another example of the optical conductor comprising a changed angle optical conductor.
Figure 26C:
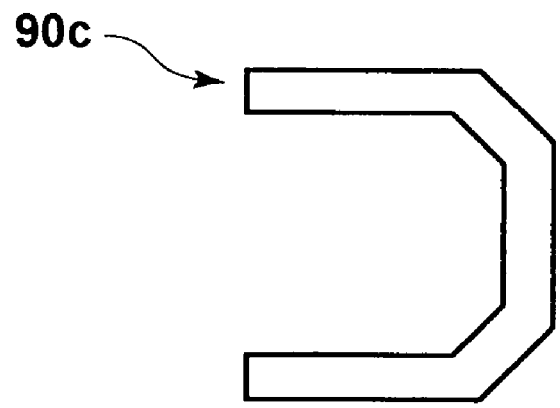
FIG. 26C is a side view of an optical conductor showing still another example of the optical conductor comprising a changed angle optical conductor.

The profile of the changed angle optical conductor 90 is not limited to that described above; and any profile such as those illustrated in FIG. 26A to 26C as sample examples may be adopted as appropriate. Each of FIGS. 26A to 26C illustrates the cross-sectional profile of the changed angle optical conductor in a plane which is perpendicular to the width direction of the optical conductor. The changed angle optical conductor 90a illustrated in FIG. 26A changes the propagation angle of the light by 90° as is the case with the changed angle optical conductor 90 described above, but it has a cross-sectional profile of a linear section having an angled portion instead of circular arc. The changed angle optical conductor 90b illustrated in FIG. 26B changes the propagation angle of the light by 180° and has a cross-sectional profile of circular arc. The changed angle optical conductor 90c changes the propagation angle of the light by 180° as is the case with the changed angle optical conductor 90b, but it has a cross-sectional profile of linear section having angled portions.

In the communication system using the changed angle optical conductor described above, the demultiplexers illustrated in FIG. 23 may be employed. Further, the sheet-type optical conductors having the protective layers illustrated in FIGS. 19 to 22 may also be applied to the communication system described above.

Figure 27A:
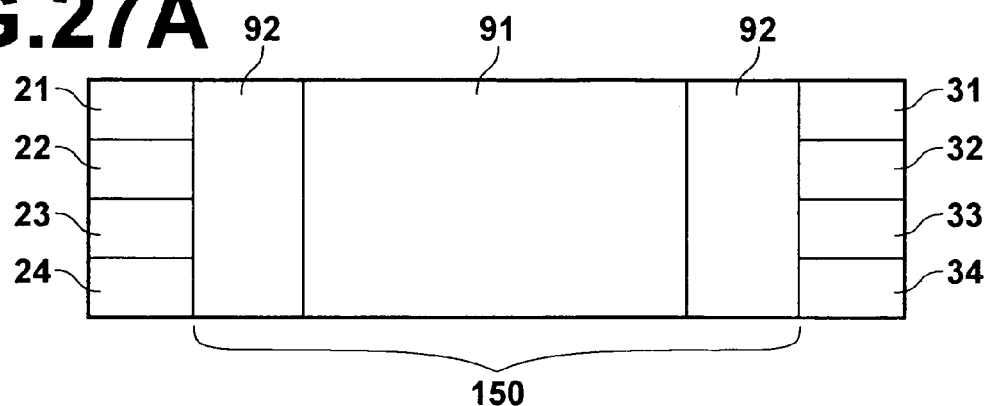
FIG. 27A is a plan view of an optical conductor illustrating an example of the optical conductor comprising a tapered optical conductor.
Figure 27B:
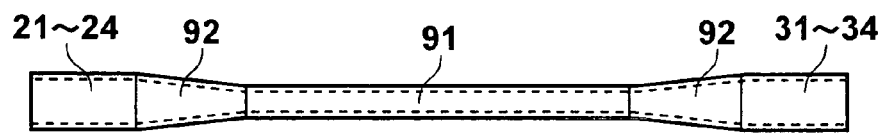
FIG. 27B is a side view of an optical conductor illustrating an example of the optical conductor comprising a tapered optical conductor.

Hereinafter, a communication system according to still another embodiment of the present invention will be described with reference to FIGS. 27A and 27B. FIGS. 27A and 27B illustrate respectively the plan view and side view of an optical conductor 150 used in this embodiment and its peripheral area. As illustrated in the Figures, this embodiment uses an optical conductor 150 comprising a sheet-type optical conductor 91 having basically the same configuration as that shown in FIG. 18, and two tapered optical conductors 92, each being joined to each of the edges of the sheet-type optical conductor 91. One of the tapered optical conductors has four optical fibers 21, 22, 23, and 24 coupled thereto, and the other has four optical fibers 31, 32, 33, and 34 coupled thereto.

Although not specifically shown in the Figures, the sheet-type optical conductor 91 and the tapered optical conductors 92 have cladding and protective layers which are identical to the cladding layer 52 and protective layer 53 illustrated in FIG. 19. FIG. 27B illustrates the contour of the conductor body inside of those layers. Also, the contour of the core section of the optical fibers 21 to 24 and 31 to 34 is indicated by the dotted line in FIG. 27B. As shown in FIG. 27B, the thickness of the conductor body of the tapered optical conductor 92 is substantially equal to the outer diameter of the fiber core on the side of the optical fibers 21 to 24 and 31 to 34, and substantially equal to that of the conductor body of the sheet-type optical conductor 91 on its side.

The optical fibers 21 to 24 and 31 to 34 have a core which is larger in core diameter than the thickness of the sheet-type optical conductor 91. In coupling these optical fibers 21 to 24 and 31 to 34 to the sheet-type optical conductor 91, it is desirable that the thickness of the sheet-type optical conductor 91 corresponds with the core diameter by making it thicker in order to ensure high coupling efficiency. The thicker sheet-type optical conductor 91, however, is difficult to be bent so that it is difficult to install it in the small space available within a device.

In contrast, the communication system according to this embodiment may ensure high coupling efficiency of the optical fibers 21 to 24 and 31 to 34 and the sheet-type optical conductor 91 without making the optical conductor 91 thicker by providing tapered optical conductors 92 described above. In this way, the sheet-type optical conductor 91 maybe formed comparatively thinner having flexibility to a certain extent, so that it may be readily installed in a small space within a device.

Thus, the communication system according to this embodiment may be widely applied to replace, for example, the communication systems using flexible substrates or flat cables which have been used for the internal wiring of a machine where only a small space is available. Further, this communication system is not only capable of just replacing the conventional communication systems but also has a high tolerance to electromagnetic noise since it provides communication by way of an optical signal.

The tapered optical conductor 92 may be formed in essentially the same configuration except that its contour has a taper angle. Preferably, the taper angle is limited such that the entrance numerical aperture of the optical fibers to be coupled is satisfied.

Figure 28A:
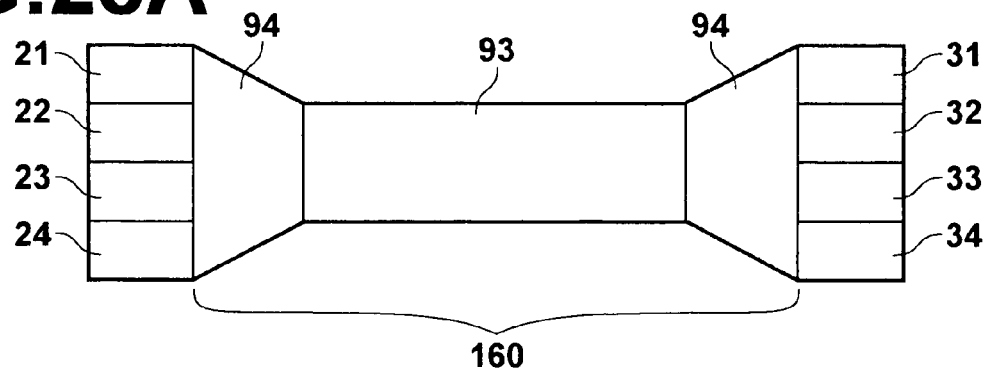
FIG. 28A is a plan view of an optical conductor illustrating another example of the optical conductor comprising a tapered optical conductor.
Figure 28B:
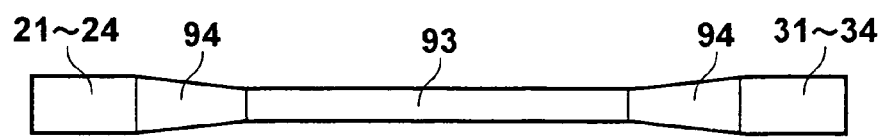
FIG. 28B is a side view of an optical conductor illustrating another example of the optical conductor comprising a tapered optical conductor.

Hereinafter, a communication system according to still another embodiment of the present invention will be described with reference to FIGS. 28A and 28B. FIGS. 28A and 28B illustrate respectively the plan view and side view of an optical conductor 160 used in this embodiment and its peripheral area. As illustrated in the Figures, this embodiment uses the optical conductor 160 comprising a sheet-type optical conductor and tapered optical conductors which are different in shape from those shown in FIGS. 27A and 27B.

More specifically, this embodiment uses a comparatively narrow sheet-type optical conductor 93, and tapered optical conductors 94 are tapered not only in the thickness direction but also in the width direction to be adapted to the optical conductor 93. The communication system configured in this way may provide the identical effect to that provided by the communication system shown in FIGS. 27A and 27B. In addition, this configuration has an advantage that more nodes are readily provided even when a comparatively narrow sheet-type optical conductor and optical fibers with a comparatively large core diameter are used.

Figure 23:
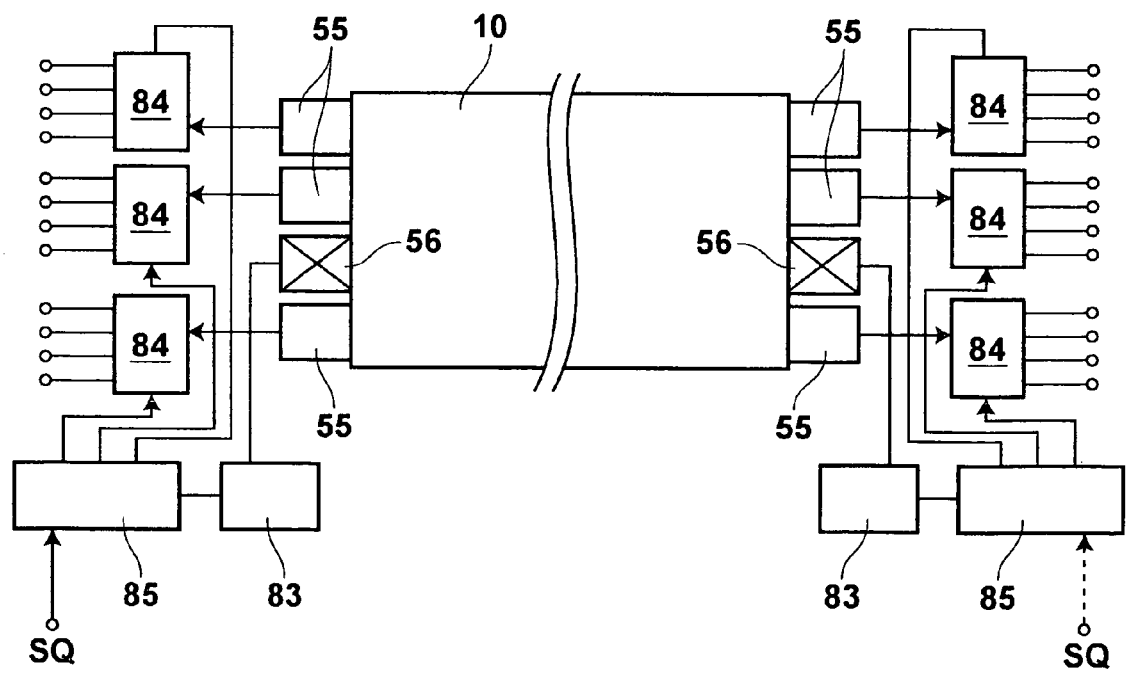
FIG. 23 is a schematic plan view of a communication system according to another embodiment of the present invention.
Figure 24:
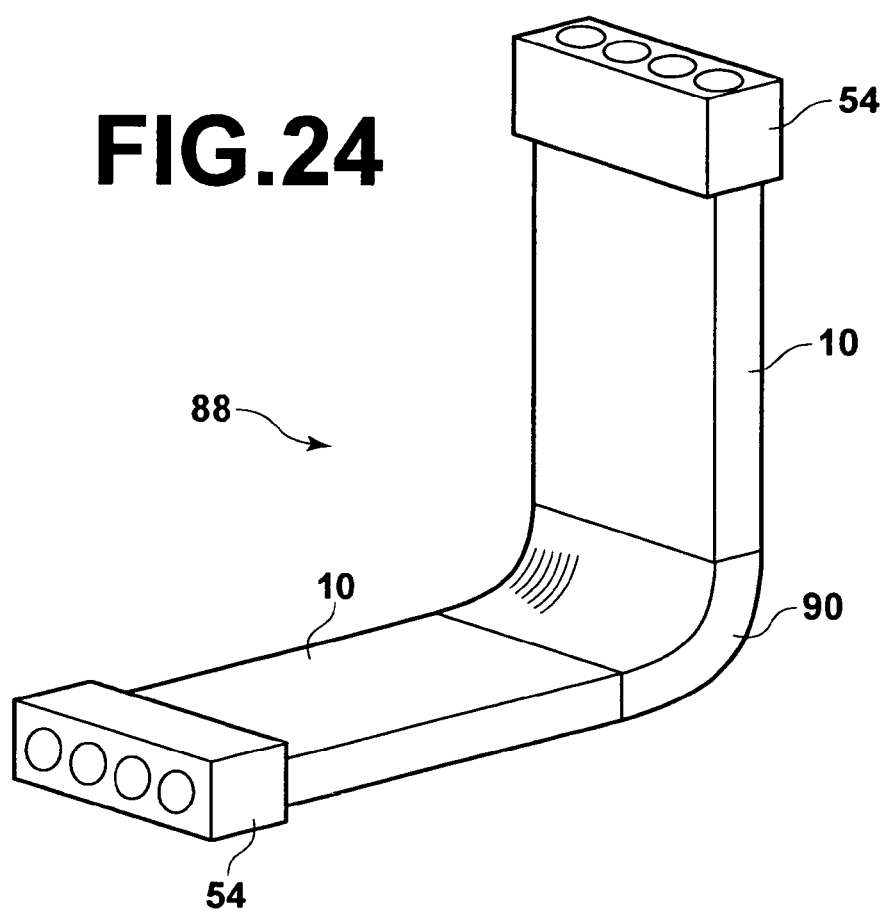
FIG. 24 is a perspective view of an optical conductor illustrating an example of the optical conductor comprising a changed angle optical conductor.

The communication system using the tapered optical conductors described above may employ the changed angle optical conductors shown in FIGS. 24 to 26. In addition, it may also employ the demultiplexer shown in FIG. 23.

Figure 29:
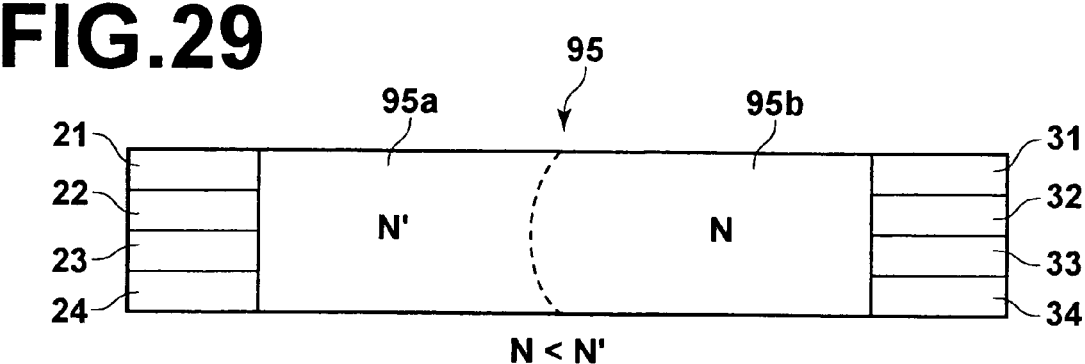
FIG. 29 is a plan view of a sheet-type optical conductor illustrating an example of the sheet-type optical conductor having a lens function.

Hereinafter, a communication system according to still another embodiment of the present invention will be described with reference to FIG. 29. FIG. 29 is a plan view of a sheet-type optical conductor 95 used in this embodiment and its peripheral area. As shown in the Figure, the sheet-type optical conductor 95 comprises a sheet-type optical medium containing particles for scattering light, as is the case with the sheet-type optical conductor 10 shown in FIG. 18, but has two sections which have different indices N and N' (N<N') of refraction of the optical medium: a section 95a of a high index of refraction and a section 95b of a low index of refraction. The interface between the section 95a of a high index of refraction and the section 95b of a low index of refraction forms a circular arc with the former being concaved in the plane parallel to the surface of the sheet. Thus, the sheet-type optical conductor 95 has the effect of concave lens to diverge the transmitted light at the interface described above.

The use of the sheet-type optical conductor 95 having the lens effect described above may further equalize the optical power distribution of the light outputted therefrom. Thus, the variance in the amount of light among a plurality of nodes may be reduced to a minimum resulting in a substantially equal bit-error-rate among the nodes.

Figure 30:
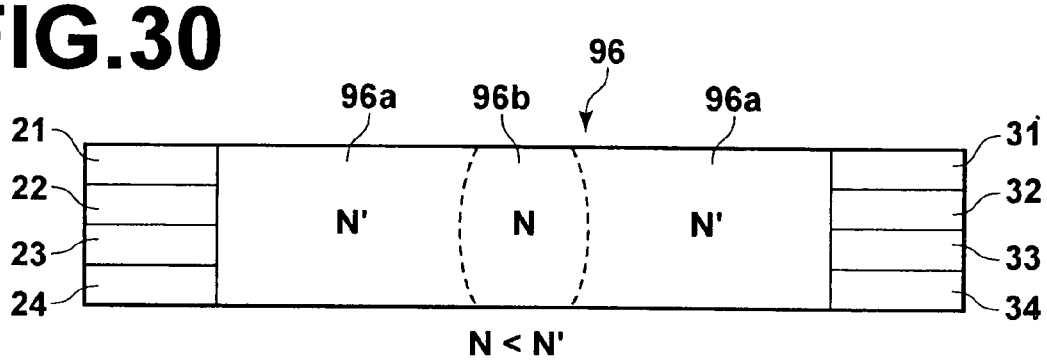
FIG. 30 is a plan view of a sheet-type optical conductor illustrating an example of the sheet-type optical conductor having a lens function.

The form of the lens of the sheet-type optical conductor is not limited to that shown in FIG. 29; and other forms, such as that shown in FIG. 30 may be employed. That is, the sheet-type optical conductor 96 comprises a section 96b of a low index of refraction (index of refraction=N) having two sections 96a of a high index of refraction (index of refraction=N', N<N') disposed on both sides with the sections 96a being concaved with respect to the section 96b. This configuration also may provide the effect of concave lens.

Figure 31:
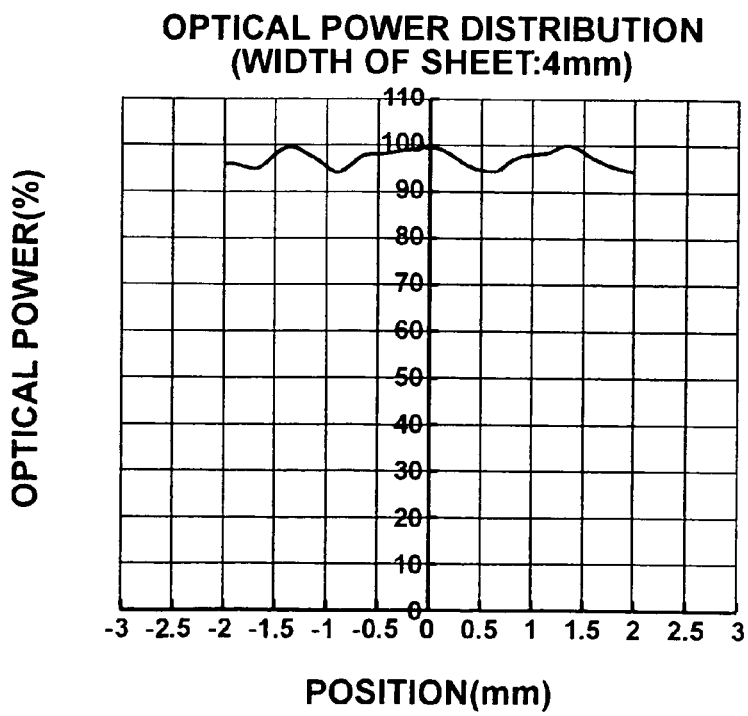
FIG. 31 is a graph indicating the effect of the sheet-type optical conductor having a lens function.

Here, one example of computer simulation results on the optical power distribution of the output light in the width direction of the sheet outputted from the sheet-type optical conductor 96 which is configured in the manner as shown in FIG. 30 is shown in FIG. 31. In the simulation, the width of the sheet was fixed at 4 mm, and the numerical value in the horizontal axis indicates the distance from the center position in the width direction of the sheet. FIG. 31 clearly shows that the optical power distribution of the output light may be highly equalized.

The communication system using the sheet-type optical conductor having the lens portion or portions described above may employ the tapered optical conductors illustrated in FIGS. 27 and 28, changed angle optical conductors illustrated in FIGS. 24 to 26, and demultiplexer illustrated in FIG. 23. Further, the protective layers illustrated in FIGS. 19 to 22 may be applied to the sheet-type optical conductor having the lens portion or portions described above.

Hereinafter, a communication system according to still another embodiment of the present invention will be described with reference to FIG. 32. FIG. 32 is a plan view of a sheet-type optical conductor 100 used in this embodiment and its peripheral area. The sheet-type optical conductor 100 comprises a sheet-type optical medium containing particles for scattering light, as is the case with the sheet-type optical conductor 10 shown in FIG. 18. Four optical fibers 21, 22, 23, and 24 are coupled to one of the two input/output edges 100a of the optical conductor 100, and four optical fibers 31, 32, 33, and 34 are coupled to the other edge.

FIG. 33A shows a front view of an input/output edge 100a, and FIG. 33B illustrates the arrangement of four optical fibers 21, 22, 23, and 24 for the input/output edge 100a. As shown in the Figures, the height of the input/output edge 100a of the sheet-type optical conductor 100 is substantially equal to the outer diameter of the optical fibers 21 to 24, and the end portion on both sides of the input/output edge is formed in semicircle to adapt to the contour of the optical fibers 21 and 24 located in the outermost positions. Formation of the input/output edge 100a in this way results in less optical signal leakage when it is injected into the optical fibers 21 to 24 from the sheet-type optical conductor 100 compared with the case in which the input/output edge is formed in a common rectangular form (indicated by double-dashed line in FIG. 33B), thereby the optical coupling efficiency of the optical fibers 21 to 24 and sheet-type optical conductor 100 is increased. This may lead to a communication system with a higher signal-to-noise ratio and a lower bit-error-rate.

Other forms may be adopted for the input/output edge to increase the optical coupling efficiency described above. FIG. 34A shows a front view of an input/output edge 110a of another sheet-type optical conductor 110, and FIG. 34B illustrates the arrangement of four optical fibers 21, 22, 23, and 24 for the input/output edge 110a. As shown in the Figures, the input/output edge 110a of the sheet-type optical conductor 110 is formed based on the projected contour of the optical fibers linearly arranged in the horizontal direction with the areas between the two optical fibers being made slightly thicker. Formation of the input/output edge 110a in this way results in less optical signal leakage when it is injected into the optical fibers 21 to 24 from the sheet-type optical conductor 110 compared with the case in which the input/output edge is formed in a common rectangular form (indicated by double-dashed line in FIG. 33B), thereby the optical coupling efficiency of the optical fibers 21 to 24 and sheet-type optical conductor 110 is increased. This may lead to a communication system with a higher signal-to-noise ratio and a lower bit-error-rate.

The comparison of the optical coupling efficiency with the optical fibers 21 to 24 for the sheet-type optical conductors

100, 110 shown in FIGS. 33, 34 respectively, and an optical conductor having the input/output edge formed in a common rectangular form (comparative example) is described below.

In each case, the optical signal propagated through the sheet-type optical conductor is coupled to the four optical fibers 21 to 24, and the ratio of the coupled output power from one of the fibers 21 to 24 to the total output power from the sheet-type optical conductor is defined as Output of that fiber, which, in turn, is used to define the attenuation level in the optical coupling of that fiber expressed as, Attenuation Level=−10×log(Output) dB. If the optical coupling takes place ideally, then the Output may be 0.25, which corresponds to the attenuation level of 6 dB. In actuality, the attenuation levels of the comparative example, sheet-type optical conductor 100, and sheet-type optical conductor 110 were 7.0 to 7.2 dB, 6.6 to 6.8 dB, and 6.6 dB or less respectively. This result confirms that the sheet-type optical conductors 100, 110 have higher optical coupling efficiency than that of the comparative sample.

The sheet-type optical conductors 100 and 110 with the input/output edges being formed in the shapes described above may be created, for example, by injection molding or precision cutting techniques.

The communication system using the sheet-type optical conductors with the input/output edges being formed in the shapes described above may have a lens portion or portions formed in the sheet-type optical conductors as shown in FIGS. 29 and 30. In addition, it may employ the tapered optical conductors shown in FIGS. 27 and 28, changed angle optical conductors shown in FIGS. 24 to 26, and demultiplexers shown in FIG. 23. Further, the protective layers illustrated in FIGS. 19 to 22 may be applied to the sheet-type optical conductors.

What is claimed is:

1. A communication system using a sheet-type optical conductor comprising a sheet-type optical medium containing particles for reflecting light, and propagating an optical signal injected from one edge of said medium to the other having an optical receiver connected thereto by scattering said optical signal by means of said particles, wherein said sheet conductor is designed such that the value of $\Phi \cdot Np \cdot L_G \cdot K_C$ is less than or equal to 0.9 where $\Phi$ is the scattering cross-sectional area of said particles, $L_G$ is the length of said optical medium in the direction in which the light is propagated, Np is the density of said particles, and $K_C$ is a correction coefficient.

2. The communication system according to claim 1, wherein said system satisfies the relationship of:

$$Pr(\text{Noise}(\text{System\_rms}) \cdot Q) \leq \text{BER}(\text{accept})$$

where Noise (system_rms) is the rms (root mean square) noise of said system, BER (accept) is the acceptable bit error rate of said system, Pr(Noise(System_rms)) is the probability of Noise (System_rms) of said system, and Q is a proportionality constant.

3. The communication system according to claim 1, wherein said system satisfies the relationship of:

$$\{S(PR\text{min})v - V(\text{Thresh})\} > \text{Noise}(\text{System\_rms}) \cdot Q$$

where, S(PRmin)v is the signal output voltage of said optical receiver which is determined by the minimum optical power received by said receiver P(Receiver_min)$_{dBm}$ and load resistance, V(Thresh) is any predetermined threshold level for digitization, Noise(System_rms) is the rms noise of said system, and Q is a proportionality constant, and wherein said minimum optical power P(Receiver_min)$_{dBm}$ is defined as:

$$P(\text{Receiver\_min})_{dBm} = -10\text{Log}\{P\text{in} \cdot E\text{out} \cdot (NPi(\text{min})/\Sigma NPi) \cdot \pi/4\} \cdot KT$$

where Pin is the input optical power of said sheet conductor, Eout is the light-extraction efficiency, NPi (min) is the optical power of the segment having the minimum optical power, ΣNPi is the sum of the optical power of the segments, KT is the total coupling loss of the light-emitting device, optical fiber, optical receiver, and wherein said light-extraction efficiency Eout is defined as:

$$E\text{out} = \exp\{-(\Phi \cdot Np \cdot L_G \cdot K_C)\} \cdot K_L$$

where $K_L$ is the total loss factor including the internal transmission factor of said sheet-type optical conductor.

4. The communication system according to claim 2, wherein said system satisfies the relationship of:

$$\{S(PR\text{min})v - V(\text{Thresh})\} > \text{Noise}(\text{System\_rms}) \cdot Q$$

where S(PRmin)v is the signal output voltage of said optical receiver which is determined by the minimum optical power received by said receiver P (Receiver_min)$_{dBm}$ and load resistance, and V(Thresh) is any predetermined threshold level for digitization, and wherein said minimum optical power P(Receiver_min)$_{dBm}$ is defined as:

$$P(\text{Receiver\_min})_{dBm} = -10\text{Log}\{P\text{in} \cdot E\text{out} \cdot (NPi(\text{min})/\Sigma NPi) \cdot \pi/4\} \cdot KT$$

where Pin is the input optical power of said sheet conductor, Eout is the light-extraction efficiency, NPi (min) is the optical power of the segment having minimum optical power, ΣNPi is the sum of the optical power of the segments, KT is the total coupling loss of the light-emitting device, optical fiber, optical receiver, and wherein, said light-extraction efficiency Eout is defined as:

$$E\text{out} = \exp\{-(\Phi \cdot Np \cdot L_G \cdot K_C)\} \cdot K_L$$

where $K_L$ is the total loss factor including the internal transmission factor of said sheet-type optical conductor and the like.

5. The communication system according to claim 1, wherein the optical signal injected into said sheet-type optical conductor is reflected in succession at the edges other than the input/output edges in accordance with Snell's Law, and said sheet-type optical conductor is made of an optical medium having a shape that satisfies the condition of sin θs>1, if Nm·sin θm=Ns·sin θs when no particles are contained therein, where Ns is the index of refraction of the surrounding medium; and Nm, θm, and θs are the index of refraction, angle of incidence, and angle of refraction of the base material of said optical medium respectively.

6. The communication system according to claim 2, wherein the optical signal injected into said sheet-type optical conductor is reflected in succession at the edges other than the input/output edges in accordance with Snell's Law, and said sheet-type optical conductor is made of an optical medium having a shape that satisfies the condition of sin θs>1, if Nm·sin θm=Ns·sin θs when no particles are contained therein, where Ns is the index of refraction of the surrounding medium; and Nm, θm, and θs are the index of refraction, angle of incidence, and angle of refraction of the base material of said optical medium respectively.

7. The communication system according to claim 3, wherein the optical signal injected into said sheet-type optical conductor is reflected in succession at the edges other than the input/output edges in accordance with Snell's Law, and said sheet-type optical conductor is made of an optical medium having a shape that satisfies the condition of sin $\theta s>1$, if $Nm\cdot\sin\theta m=Ns\cdot\sin\theta s$ when no particles are contained therein, where Ns is the index of refraction of the surrounding medium; and Nm, $\theta m$, and $\theta s$ are the index of refraction, angle of incidence, and angle of refraction of the base material of said optical medium respectively.

8. The communication system according to claim 4, wherein the optical signal injected into said sheet-type optical conductor is reflected in succession at the edges other than the input/output edges in accordance with Snell's Law, and said sheet-type optical conductor is made of an optical medium having a shape that satisfies the condition of sin $\theta s>1$, if $Nm\cdot\sin\theta m=Ns\cdot\sin\theta s$ when no particles are contained therein, where Ns is the index of refraction of the surrounding medium; and Nm, $\theta m$, and $\theta s$ are the index of refraction, angle of incidence, and angle of refraction of the base material of said optical medium respectively.

9. The communication system according to claim 1, wherein the light beam exiting from at least one output edge of said sheet-type optical conductor follows Snell's Law in the reflection and refraction at said output edge, and said sheet-type optical conductor is made of an optical medium having a shape that satisfies the relationship of sin $\theta s<1$, if $Nm\cdot\sin\theta m=Ns\cdot\sin\theta s$ when no particles are contained in said medium, where Ns is the index of refraction of the surrounding medium; and Nm, $\theta m$, and $\theta s$ are the index of refraction, angle of incidence, and angle of refraction of the base material of the optical medium respectively.

10. The communication system according to claim 2, wherein the light beam exiting from at least one output edge of said sheet-type optical conductor follows Snell's Law in the reflection and refraction at said output edge, and said sheet-type optical conductor is made of an optical medium having a shape that satisfies the relationship of sin $\theta s<1$, if $Nm\cdot\sin\theta m=Ns\cdot\sin\theta s$ when no particles are contained in said medium, where Ns is the index of refraction of the surrounding medium; and Nm, $\theta m$, and $\theta s$ are the index of refraction, angle of incidence, and angle of refraction of the base material of the optical medium respectively.

11. The communication system according to claim 3, wherein the light beam exiting from at least one output edge of said sheet-type optical conductor follows Snell's Law in the reflection and refraction at said output edge, and said sheet-type optical conductor is made of an optical medium having a shape that satisfies the relationship of sin $\theta s<1$, if $Nm\cdot\sin\theta m=Ns\cdot\sin\theta s$ when no particles are contained in said medium, where Ns is the index of refraction of the surrounding medium; and Nm, $\theta m$, and $\theta s$ are the index of refraction, angle of incidence, and angle of refraction of the base material of the optical medium respectively.

12. The communication system according to claim 4, wherein the light beam exiting from at least one output edge of said sheet-type optical conductor follows Snell's Law in the reflection and refraction at said output edge, and said sheet-type optical conductor is made of an optical medium having a shape that satisfies the relationship of sin $\theta s<1$, if $Nm\cdot\sin\theta m=Ns\cdot\sin\theta s$ when no particles are contained in said medium, where Ns is the index of refraction of the surrounding medium; and Nm, $\theta m$, and $\theta s$ are the index of refraction, angle of incidence, and angle of refraction of the base material of the optical medium respectively.

13. The communication system according to claim 1, wherein said particles contained in said optical medium are nonmagnetic conductive particles that follow Mie scattering theory.

14. The communication system according to claim 1, wherein said optical medium has an inclined density distribution of said particles.

15. The sheet-type optical conductor to be used in the communication system according to claim 1, wherein said optical conductor is provided with a protective layer that covers the surface of the body of said optical conductor.

16. The sheet-type optical conductor to be used in the communication system according to claim 2, wherein said optical conductor is provided with a protective layer that covers the surface of the body of said optical conductor.

17. The sheet-type optical conductor to be used in the communication system according to claim 3, wherein said optical conductor is provided with a protective layer that covers the surface of the body of said optical conductor.

18. The sheet-type optical conductor to be used in the communication system according to claim 4, wherein said optical conductor is provided with a protective layer that covers the surface of the body of said optical conductor.

19. The sheet-type optical conductor according to claim 15, wherein said optical conductor is further provided with a cladding layer having a smaller index of refraction than that of said optical conductor body between the surface of said optical conductor body and said protective layer.

20. The sheet-type optical conductor according to claim 16, wherein said optical conductor is further provided with a cladding layer having a smaller index of refraction than that of said optical conductor body between the surface of said optical conductor body and said protective layer.

21. The sheet-type optical conductor according to claim 17, wherein said optical conductor is further provided with a cladding layer having a smaller index of refraction than that of said optical conductor body between the surface of said optical conductor body and said protective layer.

22. The sheet-type optical conductor according to claim 18, wherein said optical conductor is further provided with a cladding layer having a smaller index of refraction than that of said optical conductor body between the surface of said optical conductor body and said protective layer.

* * * * *